(12) United States Patent
Ono et al.

(10) Patent No.: US 10,214,021 B2
(45) Date of Patent: Feb. 26, 2019

(54) LIQUID CARTRIDGE PROVIDED WITH CONNECTING CHANNEL PROVIDING COMMUNICATION BETWEEN LIQUID SUPPLY CHAMBER AND LIQUID STORAGE CHAMBER

(71) Applicant: BROTHER KOGYO KABUSHIKI KAISHA, Nagoya-shi, Aichi-ken (JP)

(72) Inventors: Akihito Ono, Nagoya (JP); Naoya Okazaki, Gifu-ken (JP); Tetsuro Kobayashi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/869,472

(22) Filed: Jan. 12, 2018

(65) Prior Publication Data
US 2018/0134040 A1     May 17, 2018

Related U.S. Application Data

(62) Division of application No. 15/169,856, filed on Jun. 1, 2016, now Pat. No. 9,878,552.

(30) Foreign Application Priority Data

Jun. 18, 2015  (JP) .................................. 2015-122780
Jun. 18, 2015  (JP) .................................. 2015-122782

(51) Int. Cl.
   *B41J 2/175*     (2006.01)
   *G01F 23/30*     (2006.01)
   *B41J 29/38*     (2006.01)

(52) U.S. Cl.
   CPC ........... *B41J 2/17566* (2013.01); *B41J 2/175* (2013.01); *B41J 2/1752* (2013.01);
   (Continued)

(58) Field of Classification Search
   CPC .................. B41J 2/17566; B41J 2002/17576
   (Continued)

(56) References Cited

U.S. PATENT DOCUMENTS 5,771,053 A      6/1998 Merrill
2005/0088497 A1  4/2005 Katayama
(Continued)

FOREIGN PATENT DOCUMENTS

JP     2005145126 A  *  6/2005
JP     2011-140128 A     7/2011
JP     2012-000860 A     1/2012

*Primary Examiner* — Shelby L Fidler
(74) *Attorney, Agent, or Firm* — Merchant & Gould P.C.

(57) ABSTRACT

A liquid cartridge includes: a liquid container including a liquid storage chamber; a liquid supply portion including a liquid supply chamber and first and second openings; a movable member; a sealing member; and a connecting channel. The first opening provides communication between the supply chamber and an exterior of the cartridge. The second opening provides communication between the supply chamber and the storage chamber. The movable member extends in the storage chamber and the supply chamber. The sealing member intimately contacts the movable member and the liquid supply portion continuously in a circumferential direction. The connecting channel is formed in the movable member and provides communication between a space in the supply chamber and the storage chamber so that liquid can flow therebetween. The connecting channel opens into the storage chamber at a position further downward than the second opening when the cartridge is in an attached posture.

10 Claims, 23 Drawing Sheets

(52) U.S. Cl.
CPC ....... *B41J 2/17513* (2013.01); *B41J 2/17523* (2013.01); *B41J 2/17536* (2013.01); *B41J 2/17596* (2013.01); *B41J 29/38* (2013.01); *G01F 23/30* (2013.01); *B41J 2002/17576* (2013.01)

(58) Field of Classification Search
USPC .......................................................... 73/315
See application file for complete search history.

(56) References Cited

U.S. PATENT DOCUMENTS

| | | | |
|---|---|---|---|
| 2008/0284834 A1 | 11/2008 | Lee | |
| 2010/0103231 A1* | 4/2010 | Iwamura | B41J 2/17566 347/86 |
| 2011/0310194 A1 | 12/2011 | Takagi | |
| 2015/0224779 A1 | 8/2015 | Okazaki | |
| 2015/0224780 A1 | 8/2015 | Ono | |
| 2016/0039209 A1* | 2/2016 | Sugahara | B41J 2/17566 347/86 |
| 2016/0059570 A1 | 3/2016 | Kobayashi | |
| 2016/0279954 A1 | 9/2016 | Ono | |

* cited by examiner

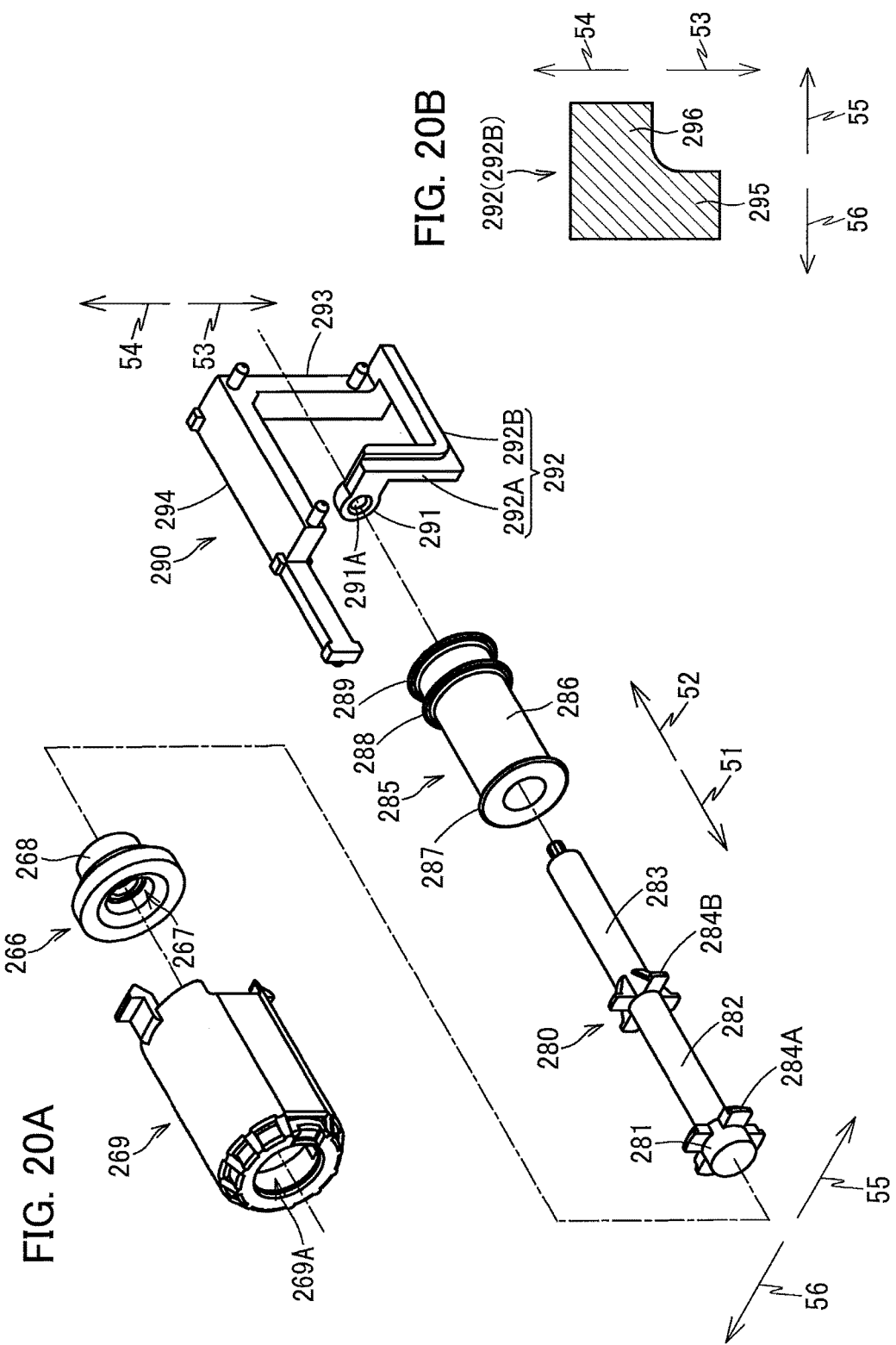

LIQUID CARTRIDGE PROVIDED WITH CONNECTING CHANNEL PROVIDING COMMUNICATION BETWEEN LIQUID SUPPLY CHAMBER AND LIQUID STORAGE CHAMBER

CROSS REFERENCE TO RELATED APPLICATION

This application is a divisional of U.S. patent application Ser. No. 15/169,856, filed Jun. 1, 2016, and further claims priority from Japanese Patent Application Nos. 2015-122780 filed Jun. 18, 2015 and 2015-122782 filed Jun. 18, 2015. The entire contents of all of which are incorporated herein by reference.

TECHNICAL FIELD

The present disclosure relates to a liquid cartridge provided with a movable member that moves from a first position for preventing liquid from flowing out of a liquid supply chamber to a second position for allowing liquid to flow out of the liquid supply chamber, and to a liquid consuming device provided with the liquid cartridge.

Further, the present disclosure relates to a liquid cartridge provided with a detector that moves within a liquid storage chamber while being detected from outside the liquid storage chamber, and to a liquid consuming device provided with the liquid cartridge.

BACKGROUND

There are conventional inkjet recording devices known in the art that record images on a recording medium by ejecting ink stored in an ink storage chamber of an ink cartridge through nozzles.

One ink cartridge known in the art (hereinafter referred to as a first conventional ink cartridge) is provided with an ink storage chamber for storing ink, a valve accommodation chamber through which ink can flow from the ink storage chamber, and a valve body that prevents or allows the outflow of ink from the valve accommodation chamber.

Another ink cartridge known in the art (hereinafter referred to as a second conventional ink cartridge) is provided with a detector that moves between a non-detection position at which the detector is not detected externally, and a detection position at which the detector is detectable externally. An inkjet recording device employing an ink cartridge with the structure described above can detect a state of ink in the ink cartridge based on changes in position of the detector.

SUMMARY

In the first conventional ink cartridge described above, the ink storage chamber and the valve accommodation chamber communicate with each other through a communication hole. Further, the valve accommodation chamber is positioned higher than a bottom surface of the ink storage chamber. Consequently, when the surface level of ink stored in the ink storage chamber drops below the position of the communication hole, air in the ink storage chamber is introduced into the valve accommodation chamber through the communication hole. This introduction of air has the potential to prevent ink from flowing out of the valve accommodation chamber and also to become mixed with ink in channels leading from the ink cartridge to the nozzles, thereby degrading the image-recording quality.

In view of the foregoing, it is an object of the disclosure to provide a liquid cartridge that reduces the amount of residual liquid in a liquid container while restricting air in a liquid storage chamber from entering a liquid supply chamber.

If an inkjet recording device employing the second conventional ink cartridge is configured to detect a state of ink in the ink cartridge when the ink cartridge is attached to the inkjet recording device, the ink cartridge must be configured to maintain the detector in the non-detection position while the ink cartridge is not attached to the inkjet recording device, and to move the detector when the ink cartridge is attached to the inkjet recording device. Hence, the second conventional ink cartridge described above is further provided with a movable member that can be moved between a restricting position for maintaining the detector in the non-detection position and a non-restricting position for releasing restriction on the detector, for example. This movable member may be configured to be movable by an external force applied from outside the ink cartridge through an ink supply portion that is configured to allow ink stored in an ink storage chamber to flow out of the ink cartridge, for example.

In the second conventional ink cartridge described above, a communication hole allowing communication between an internal space of the ink supply portion and the ink storage chamber is provided to enable transmission of the external force to the movable member in the ink storage chamber. With this configuration, when the surface level of ink stored in the ink storage chamber drops below the communication hole, air in the ink storage chamber is introduced into an internal space of the ink supply portion through the communication hole. This introduction of air has the potential to prevent ink from flowing out of the ink supply portion and also to become mixed with ink in channels leading from the ink cartridge to the nozzles, thereby degrading the image-recording quality.

In view of the foregoing, it is an object of the disclosure to provide a liquid cartridge provided with a detector configured to be movable by an external force applied from outside the liquid cartridge, the liquid cartridge being capable of reducing the amount of residual liquid in a liquid container while restricting air in a liquid storage chamber from entering a liquid supply chamber.

In order to attain the above and other objects, the disclosure provides a liquid cartridge including: a liquid container; a liquid supply portion; a movable member; a sealing member; and a connecting channel. The liquid container includes a liquid storage chamber configured to store liquid therein. The liquid supply portion includes a liquid supply chamber. The liquid supply portion has a first opening and a second opening. The first opening provides communication between the liquid supply chamber and an exterior of the liquid cartridge. The second opening provides communication between the liquid supply chamber and the liquid storage chamber. The movable member extends in the liquid storage chamber and the liquid supply chamber through the second opening. The sealing member intimately contacts an outer surface of the movable member and an inner surface of the liquid supply portion so that the intimate contact of the sealing member with the outer surface of the movable member and the inner surface of the liquid supply portion is continuous in a circumferential direction of the sealing member. The connecting channel is formed in an interior of the movable member. The connecting channel provides communication between a space in the liquid supply chamber and the liquid storage chamber so that the liquid can flow between the space in the liquid supply chamber and the liquid storage chamber. The space in the liquid supply chamber is positioned closer to the first opening than the sealing member to the first opening. The connecting channel opens into the liquid storage chamber at a position further downward than the second opening when the liquid cartridge is in an attached posture. The movable member is configured to move from a first position to a second position when an external force from the exterior of the ink cartridge is applied to the movable member. The movable member in the first position interrupts communication between the first opening and the connecting channel. The movable member in the second position provides communication between the first opening and the connecting channel.

According to another aspect, the disclosure provides a liquid cartridge including: a liquid container; a liquid supply portion; a connecting channel; a detector; and a movable member. The liquid container includes a liquid storage chamber configured to store liquid therein. The liquid supply portion includes a liquid supply chamber. The liquid supply portion has a first opening and a second opening. The first opening provides communication between the liquid supply chamber and an exterior of the liquid cartridge. The second opening provides communication between the liquid supply chamber and the liquid storage chamber. The connecting channel is formed in the liquid container. The connecting channel provides communication between the liquid storage chamber and the second opening. The connecting channel has a part positioned further downward than the second opening when the liquid cartridge is in an attached posture. The detector is disposed in the liquid storage chamber and configured to move between a detection position at which the detector is detectable from the exterior of the ink cartridge and a non-detection position at which the detector is undetectable from the exterior of the ink cartridge. The movable member extends in the liquid storage chamber and the liquid supply chamber through the connecting channel and the second opening. The movable member is configured to move from a restricting position to a non-restricting position when an external force from the exterior of the ink cartridge is applied to the movable member. The movable member in the restricting position restricts the movement of the detector and maintains the detector in the non-detection position. The movable member in the non-restricting position releases restriction on the movement of the detector.

Note that the attached posture of the liquid cartridge implies a posture of the liquid cartridge when the liquid cartridge is completely attached to a liquid consuming device or a posture of the liquid cartridge when movement of the detector is inspected in a process of manufacturing the liquid cartridge, for example.

BRIEF DESCRIPTION OF THE DRAWINGS

The particular features and advantages of the embodiment(s) as well as other objects will become apparent from the following description taken in connection with the accompanying drawings, in which:

FIG. 20A is an exploded perspective view illustrating a cap 269, a first sealing member 266, a valve 280, a second sealing member 285, and an arm locker 290 provided at the ink container 232;

FIG. 20B is a cross-sectional view of a horizontal part 292B of a channel filling part 292 of the arm locker 290 taken along a plane perpendicular to an insertion direction 51 and a removal direction 52;

FIGS. 21A and 21B are cross-sectional views illustrating an internal configuration of the ink cartridge 230, in which the sensor arm 270 is in a non-detection position, and the valve 280 and the arm locker 290 are in a restricting position, in which FIG. 21A is a cross-section taken along a plane passing the center of the valve 280; and FIG. 21B is a cross-section taken along a plane passing a second part 296 of the channel filling part 292;

FIGS. 22A and 22B are cross-sectional views illustrating the internal configuration of the ink cartridge 230, in which the sensor arm 270 is in a detection position, and the valve 280 and the arm locker 290 are in a non-restricting position, in which FIG. 22A is a cross-section taken along a plane passing the center of the valve 280; and FIG. 22B is a cross-section taken along a plane passing the second part 296 of the channel filling part 292; and FIGS. 23A and 23B are cross-sectional views illustrating the internal configuration of the ink cartridge 230, in which the sensor arm 270 is in the non-detection position, and the valve 280 and the arm locker 290 are in the non-restricting position, in which FIG. 23A is a cross-section taken along a plane passing the center of the valve 280; and FIG. 23B is a cross-section taken along a plane passing the second part 296 of the channel filling part 292.

DETAILED DESCRIPTION

Figure 1:
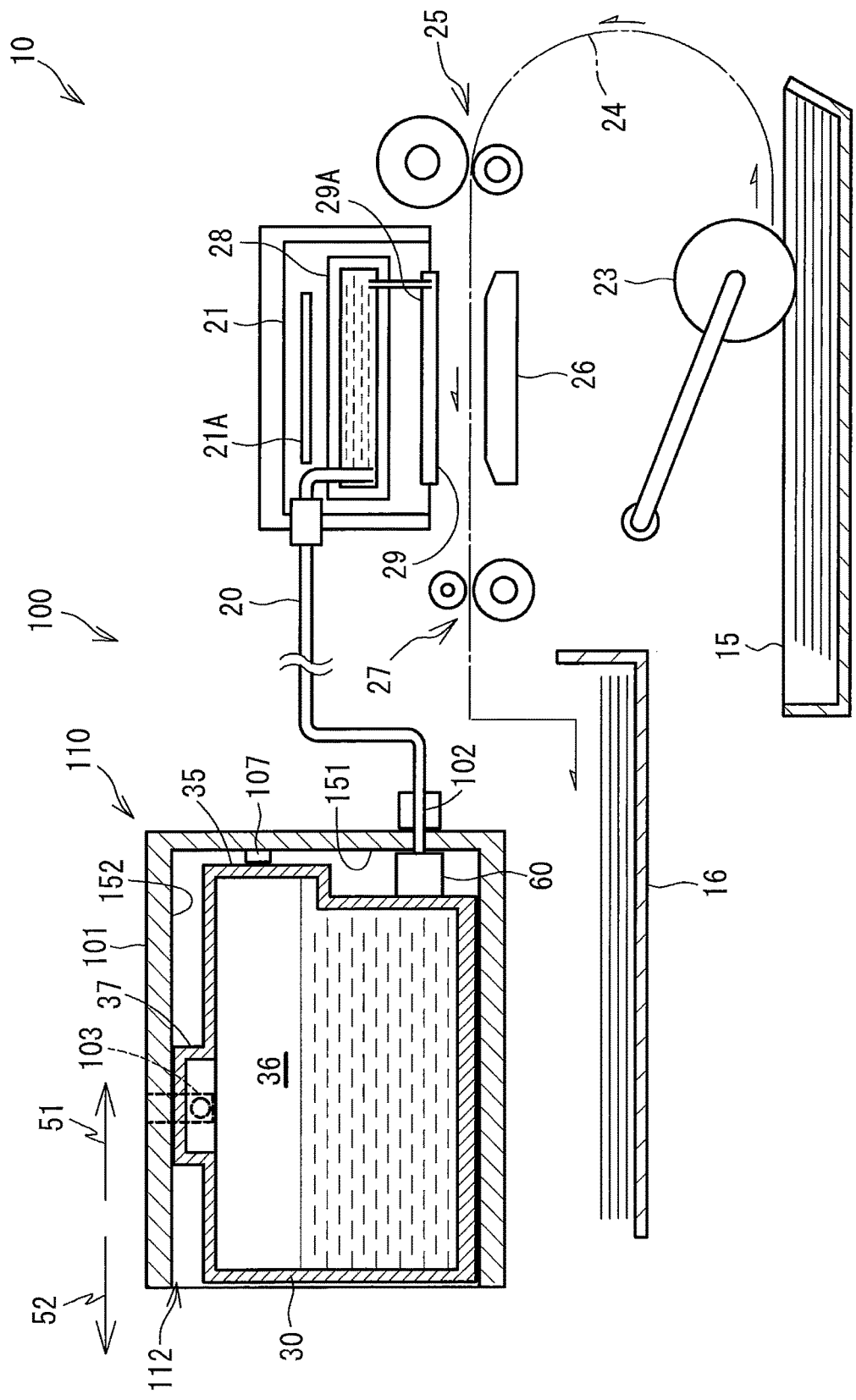
FIG. 1 is a schematic cross-sectional diagram illustrating an internal structure of a printer 10 provided with a cartridge attachment section 110 according to a first embodiment.

An ink cartridge 30 as an example of a liquid cartridge according to a first embodiment and a printer 10 as an example of a liquid consuming device configured to accommodate the ink cartridge 30 will be described with reference to FIGS. 1 through 14, wherein like parts and components are designated by the same reference numerals to avoid duplicating description.

In the following description, an insertion direction 51 is defined as a direction that an ink cartridge 30 is inserted into a cartridge attachment section 110, and a removal direction 52 is defined as a direction in which the ink cartridge 30 is removed from the cartridge attachment section 110. In other words, the insertion direction 51 and the removal direction 52 are opposite to each other. In the embodiment, the insertion direction 51 and the removal direction 52 are parallel to a horizontal direction, but the insertion direction 51 and the removal direction 52 may not necessarily be parallel to the horizontal direction. The insertion direction 51 may be a horizontal frontward direction, while the removal direction 52 may be a horizontal rearward direction. The insertion direction 51 is an example of a first direction, and the removal direction 52 is an example of a second direction.

Further, a downward direction 53 is defined as a direction of a gravitational force acting on the ink cartridge 30 and an upward direction 54 is defined as a direction opposite the gravitational direction when the ink cartridge 30 has been inserted into the cartridge attachment section 110, i.e., when the ink cartridge 30 is in an operational posture (an example of an attached posture). Further, a rightward direction 55 (an example of a third direction) and a leftward direction 56 (an example of a fourth direction) are defined as directions orthogonal to the insertion direction 51 and the downward direction 53 when the ink cartridge 30 is viewed in the removal direction 52. Unless otherwise stated, the following description will assume that the ink cartridge 30 is in its operational posture.

<Overall Structure of Printer 10>

The printer 10 is configured to selectively eject ink droplets onto recording sheets to record images thereon based on an inkjet recording method. As illustrated in FIG. 1, the printer 10 includes a recording head 21 (an example of a liquid consuming portion), an ink supply device 100, and ink tubes 20 connecting the recording head 21 to the ink supply device 100. The ink supply device 100 includes a cartridge attachment section 110 (an example of an attachment section). A plurality of ink cartridges 30 is attachable to and detachable from the cartridge attachment section 110. The cartridge attachment section 110 has one surface in which an opening 112 is formed. The ink cartridges 30 can be inserted into the cartridge attachment section 110 through the opening 112 in the insertion direction 51, or can be removed from the cartridge attachment section 110 through the opening 112 in the removal direction 52.

Figure 2:
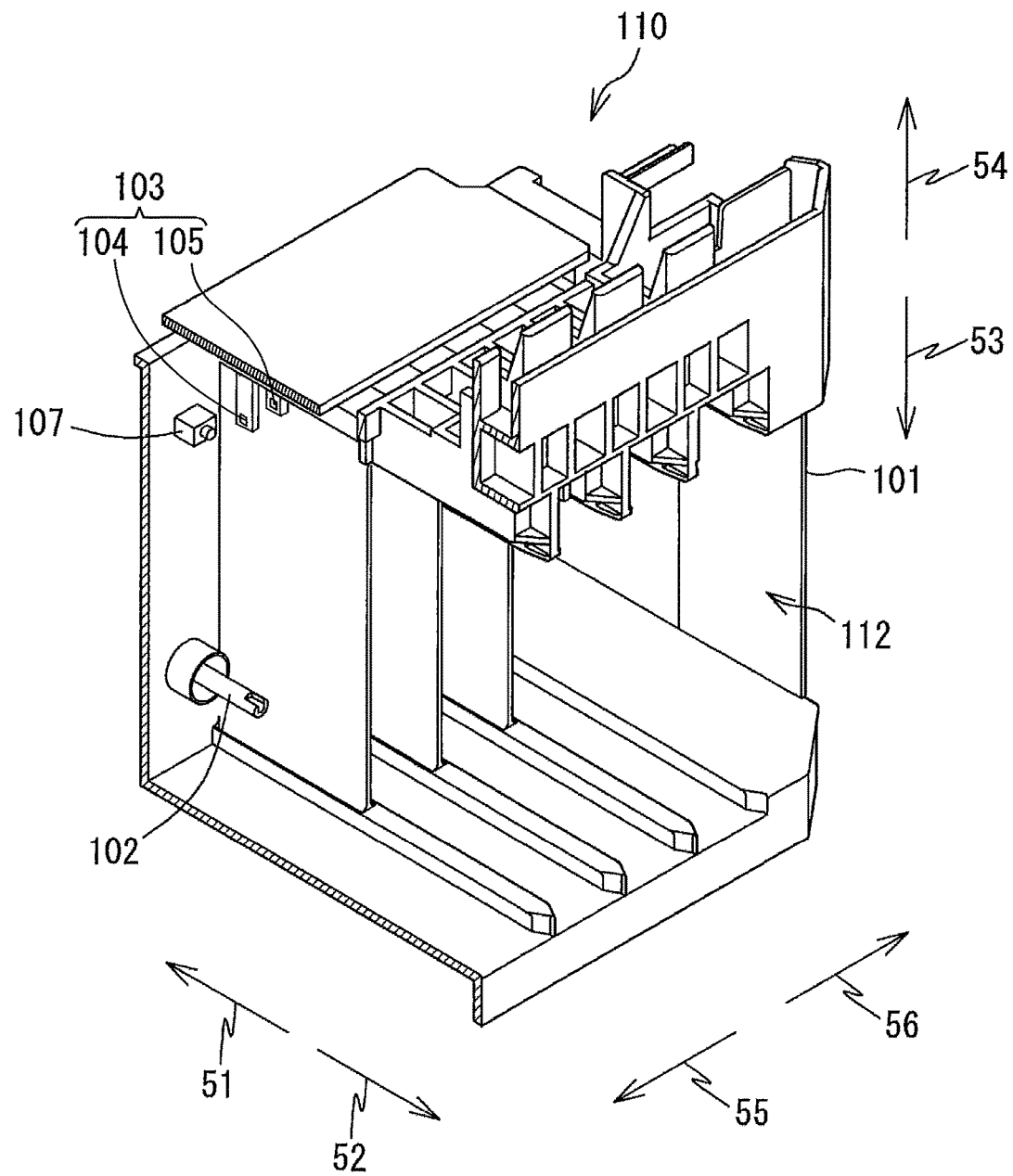
FIG. 2 is a perspective view illustrating a structure of the cartridge attachment section 110.

Incidentally, FIG. 1 illustrates a state where the ink cartridge 30 is completely attached to the cartridge attachment section 110. As illustrated in FIG. 2, four ink cartridges 30 corresponding to respective colors of cyan, magenta, yellow, and black can be accommodated in the cartridge attachment section 110. Hereinafter, for an explanatory purpose, only one ink cartridge 30 is assumed to be attached to the cartridge attachment section 110 wherever necessary.

The ink cartridge 30 stores ink (an example of a liquid) that can be used in the printer 10. When the ink cartridge 30 is completely attached to the cartridge attachment section 110, the ink cartridge 30 and the recording head 21 are connected by corresponding one of the ink tubes 20. The recording head 21 is provided with a plurality of (four in the embodiment) sub-tanks 28 corresponding to the plurality of ink cartridges 30. Each sub-tank 28 is configured to temporarily store the ink supplied from the corresponding ink cartridge 30 through the corresponding ink tube 20. The recording head 21 is configured to selectively eject the ink supplied from the respective sub-tanks 28 through nozzles 29 according to an inkjet recording method. More specifically, the recording head 21 is provided with a head control board 21A, and piezoelectric elements 29A (an example of an actuator) corresponding one-on-one to the nozzles 29. The head control board 21A selectively applies drive voltages to the piezoelectric elements 29A to eject ink selectively from the nozzles 29.

The printer 10 has a recording sheet conveying mechanism that includes a sheet feeding tray 15, a sheet feeding roller 23, a conveying path 24, a pair of conveying rollers 25, a platen 26, a pair of discharge rollers 27, and a sheet discharge tray 16. The sheet feeding roller 23 feeds recording sheets from the sheet feeding tray 15 onto the conveying path 24, and the conveying rollers 25 convey the recording sheets over the platen 26. The recording head 21 selectively ejects ink onto the recording sheets as the recording sheets passes over the platen 26, whereby images are recorded on the recording sheets. The discharge rollers 27 receive the recording sheets that have passed over the platen 26 and discharge the recoding sheets onto the sheet discharge tray 16 provided at a position most downstream in the conveying path 24.

<Ink Supply Device 100>

As illustrated in FIG. 1, the ink supply device 100 is provided in the printer 10. The ink supply device 100 is configured to supply ink to the recording head 21 provided in the printer 10. The ink supply device 100 includes the cartridge attachment section 110 to which the ink cartridges 30 can be detachably attached. The cartridge attachment section 110 includes a case 101, a plurality of ink needles 102, a plurality of sensors 103 (an example of a detecting portion), and a plurality of attachment sensors 107 (an example of an attachment detecting portion).

Specifically, four ink needles 102, four sensors 103, and four attachment sensors 107 are provided in the cartridge attachment section 110, corresponding to the four ink cartridges 30.

<Ink Needle 102>

The opening 112 is formed in the case 101. The case 101 has an inner back surface 151 positioned on an opposite side of the case 101 from the opening 112. As illustrated in FIGS. 1 and 2, the ink needles 102 protrude in the removal direction 52 from the inner back surface 151 of the case 101. The ink needles 102 are arranged at positions on the inner back surface 151 of the case 101 for confronting ink supply portions 60 (an example of a liquid supply portion) of the corresponding ink cartridges 30. The ink needles 102 are tube-like needles formed of resin. Each of the ink needles 102 has a liquid channel formed in the center of the tube that runs along a longitudinal dimension of the ink needle 102. The ink needle 102 has a protruding end (an end that protrudes in the removal direction 52 farthest from the inner back surface of the cartridge attachment section 110) formed with an opening, and a base end (opposite to the protruding end) connected to the corresponding ink tube 20. When the corresponding ink needle 102 is inserted into the ink supply portion 60 of the ink cartridge 30, ink stored in an ink chamber 36 (described later) of the ink cartridge 30 flows into the corresponding ink tube 20 through the ink needle 102 inserted into the ink supply portion 60. Note that the definition of "needle" in this specification is a generic term that should include the meaning of a narrow tube-like member and need not be a member with a pointed tip.

The printer 10 further includes a cover (not illustrated) for covering or exposing the opening 112 formed in the cartridge attachment section 110. The cover is supported at the case 101 or at a casing (not illustrated) of the printer 10 so as to be capable of opening and closing the opening 112. When the cover is opened, the opening 112 is exposed to an outside of the printer 10. In this state, a user can insert the ink cartridge 30 into the cartridge attachment section 110 through the opening 112, or can remove the ink cartridge 30 from the cartridge attachment section 110 through the opening 112. When the cover is closed, the opening 112 is covered and not exposed to the outside of the printer 10. In this state, the ink cartridge 30 cannot be inserted into or removed from the cartridge attachment section 110.

In this specification, the phrase "the ink cartridge 30 attached to the cartridge attachment section 110" means that at least part of the ink cartridge 30 is positioned inside the cartridge attachment section 110 (and more accurately, inside the case 101). Consequently, the ink cartridge 30 that is in the process of being inserted into the cartridge attachment section 110 is also considered attached to the cartridge attachment section 110.

However, when a state of the ink cartridge 30 is described as "completely attached to the cartridge attachment section 110" in this specification, the ink cartridge 30 is at least in a state capable of supplying ink to the recording head 21. For example, this state may denote a state in which the ink cartridge 30 is locked in the cartridge attachment section 110 and immovable relative to the cartridge attachment section 110, a state in which the ink cartridge 30 is positioned in the cartridge attachment section 110 with the cover closed over the opening 112, or any such state in which the ink cartridge 30 is capable of being operated by the printer 10 to record images. Thus, the ink cartridge 30 that is completely attached to the cartridge attachment section 110 is in its operational posture.

<Sensor 103>

The case 101 has an inner top surface 152 that extends from a top edge of the inner back surface 151 to the opening 112. The sensors 103 protrude in the downward direction 53 from the inner top surface 152 of the case 101. Each sensor 103 includes a light emitting part 104 and a light receiving part 105. The light emitting part 104 and the light receiving part 105 are arranged in confrontation with each other in the rightward direction 55 and the leftward direction 56. When the ink cartridge 30 is completely attached to the cartridge attachment section 110, a protruding part 37 of the ink cartridge 30 (see FIG. 3) is positioned between the light emitting part 104 and the light receiving part 105 of the corresponding sensor 103. In other words, the light emitting part 104 and the light receiving part 105 are arranged in confrontation with each other with the protruding part 37 interposed therebetween when the ink cartridge 30 is completely attached to the cartridge attachment section 110.

A position in an interior space of the ink cartridge 30 (and more precisely in an interior space of the protruding part 37 described later) that falls on an imaginary line connecting the light emitting part 104 and the light receiving part 105 when the ink cartridge 30 is completely attached to the cartridge attachment section 110 will be defined as a detected position. Thus, the detected position is a position that overlaps a path of light travelling from the light emitting part 104 to the light receiving part 105. Put another way, the sensor 103 is arranged to face the detected position. Note that the path of light outputted from the light emitting part 104 in the embodiment is coincident with the rightward direction 55 and the leftward direction 56.

The sensor 103 according to the embodiment is arranged at a position confronting the corresponding ink cartridge 30 when the ink cartridge 30 is completely attached to the cartridge attachment section 110, but the position of the sensor 103 is not limited to this example. For example, the sensor 103 may be disposed at a position that confronts the ink cartridge 30 as the ink cartridge 30 is in the process of being attached to the cartridge attachment section 110. In other words, the sensor 103 should be disposed at a position for confronting the ink cartridge 30 attached to the cartridge attachment section 110.

The sensors 103 are configured to output signals that differ according to whether their respective light receiving parts 105 receive the light outputted from the corresponding light emitting parts 104. For example, each sensor 103 outputs a low level signal (i.e., a signal having a level smaller than a threshold level) to a control unit 130 (described later, see FIG. 8) when the light receiving part 105 cannot receive light outputted from the light emitting part 104 (i.e., when the received light has an intensity less than a prescribed intensity). On the other hand, each sensor 103 outputs a high level signal (i.e., a signal having a level greater than or equal to the threshold level) to the control unit 130 when the light receiving part 105 receives light outputted from the light emitting part 104 (i.e., when the received light has an intensity greater than or equal to the prescribed intensity). Incidentally, the light emitting part 104 according to the embodiment outputs visible or infrared light, for example, that is transmitted through walls of the ink cartridge 30 (and more specifically the protruding part 37) but is not transmitted through a shutter 75 (described later, see FIG. 6).

<Attachment Sensor 107>

As illustrated in FIGS. 1 and 2, the attachment sensors 107 are provided at the inner back surface 151 of the case 101 above the ink needles 102 in a vertical direction. Each attachment sensor 107 is disposed at an attachment detection position in the cartridge attachment section 110 along an insertion path of the corresponding ink cartridge 30. The attachment sensors 107 according to the embodiment are mechanical sensors, for example, and are configured to output different signals to the control unit 130 according to whether the corresponding ink cartridges 30 are present in the attachment detection position. In the embodiment, the attachment sensors 107 are arranged so that the corresponding ink cartridges 30 reach the attachment detection positions when completely attached to the cartridge attachment section 110.

More specifically, each attachment sensor 107 outputs a low level signal to the control unit 130 while not pressed by a front wall of the corresponding ink cartridge 30 (and more specifically a front wall 35 of a cartridge cover 33 described later). On the other hand, each attachment sensor 107 outputs a high level signal to the control unit 130 when pressed by the front wall of the corresponding ink cartridge 30 once the ink cartridge 30 has been completely attached to the cartridge attachment section 110. Incidentally, the attachment sensors 107 according to the embodiment are mechanical sensors that output different signals depending on whether the attachment sensors 107 are pressed by the front walls of the corresponding ink cartridges 30. However, the attachment sensors 107 are not limited to this example. The attachment sensors 107 may be optical sensors or the like.

<Ink Cartridge 30>

Figure 3:
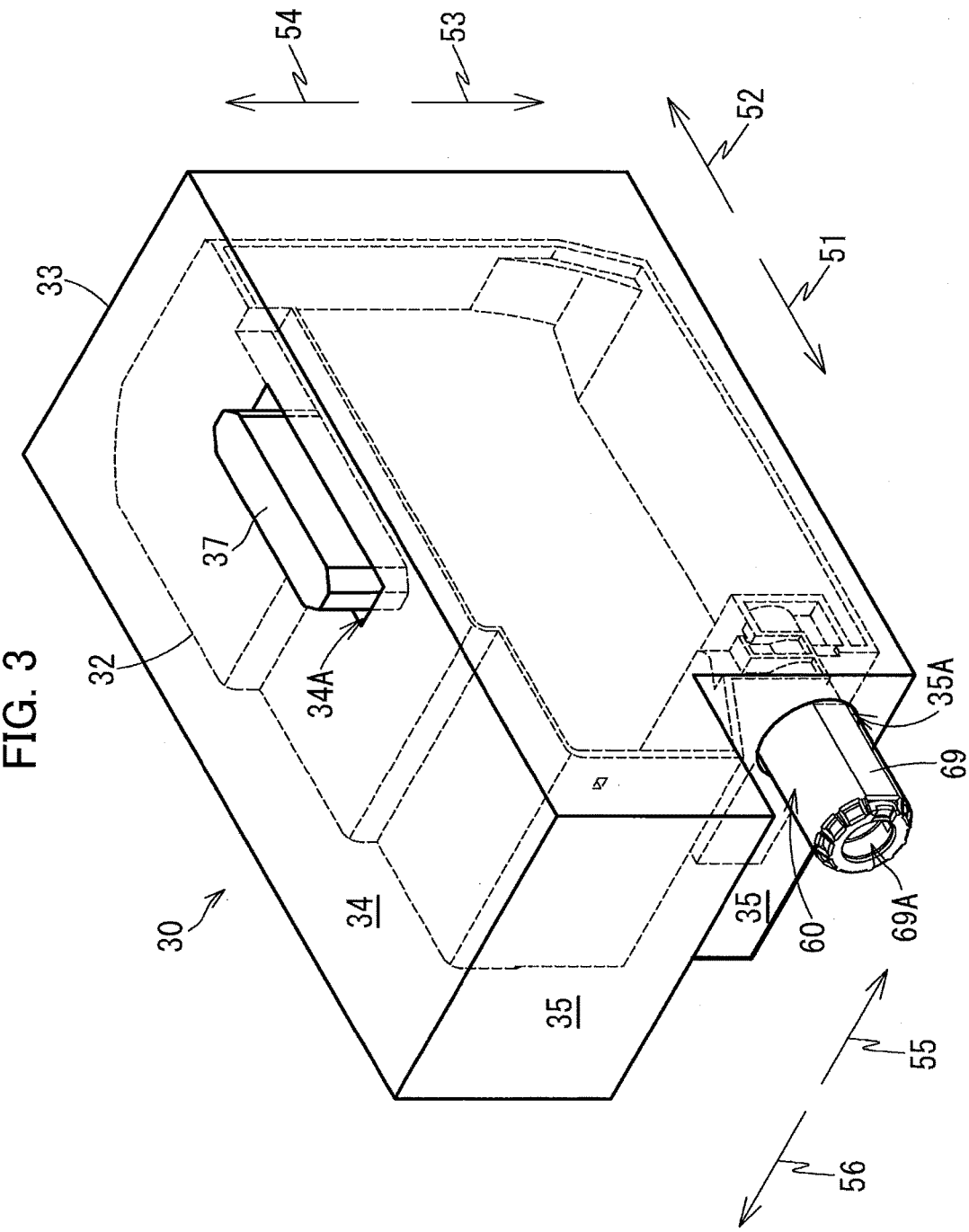
FIG. 3 is a perspective view illustrating an external configuration of an ink cartridge 30 according to the first embodiment.

As illustrated in FIG. 3, the ink cartridge 30 includes an ink container 32 (an example of a liquid container), and the cartridge cover 33. The cartridge cover 33 covers most part of the ink container 32, with only a part of the ink container 32 (a part of the protruding part 37 and a part of the ink supply portion 60) exposed outside the cartridge cover 33. More specifically, the cartridge cover 33 includes a top wall 34 having an opening 34A through which the protruding part 37 protrudes out of the cartridge cover 33, and the front wall 35 having an opening 35A through which the ink supply portion 60 protrudes out of the cartridge cover 33.

When inserting the ink cartridge 30 into the cartridge attachment section 110 in the insertion direction 51 or removing the ink cartridge 30 from the cartridge attachment section 110 in the removal direction 52, the ink cartridge 30 is in the operational posture illustrated in FIG. 3, i.e., with a surface of the ink cartridge 30 facing downward in FIG. 3 as a bottom surface and a surface of the ink cartridge 30 facing upward in FIG. 3 as a top surface.

Figure 4:
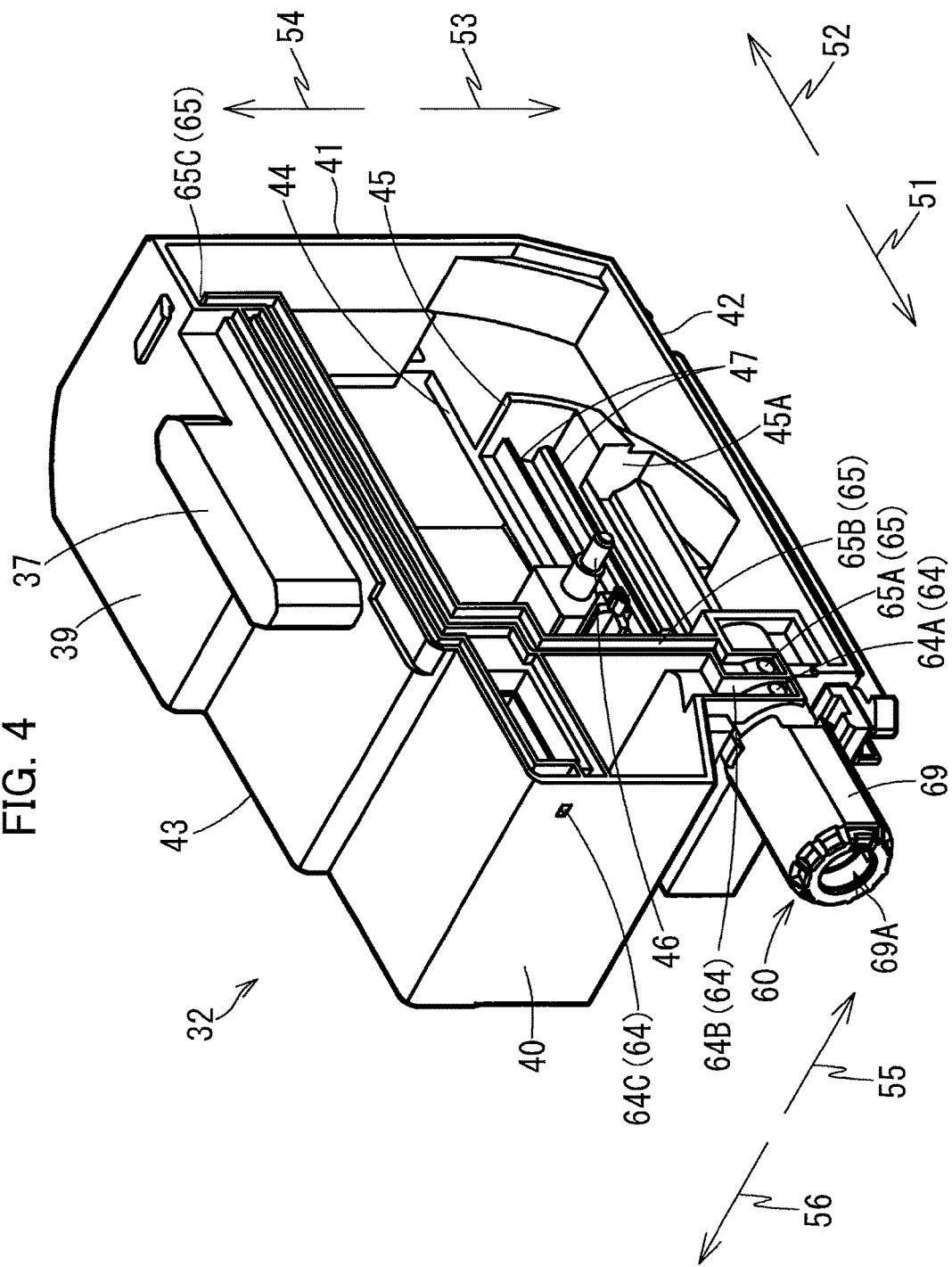
FIG. 4 is a perspective view of an ink container 32 of the ink cartridge 30 as viewed from a front side thereof.
Figure 5:
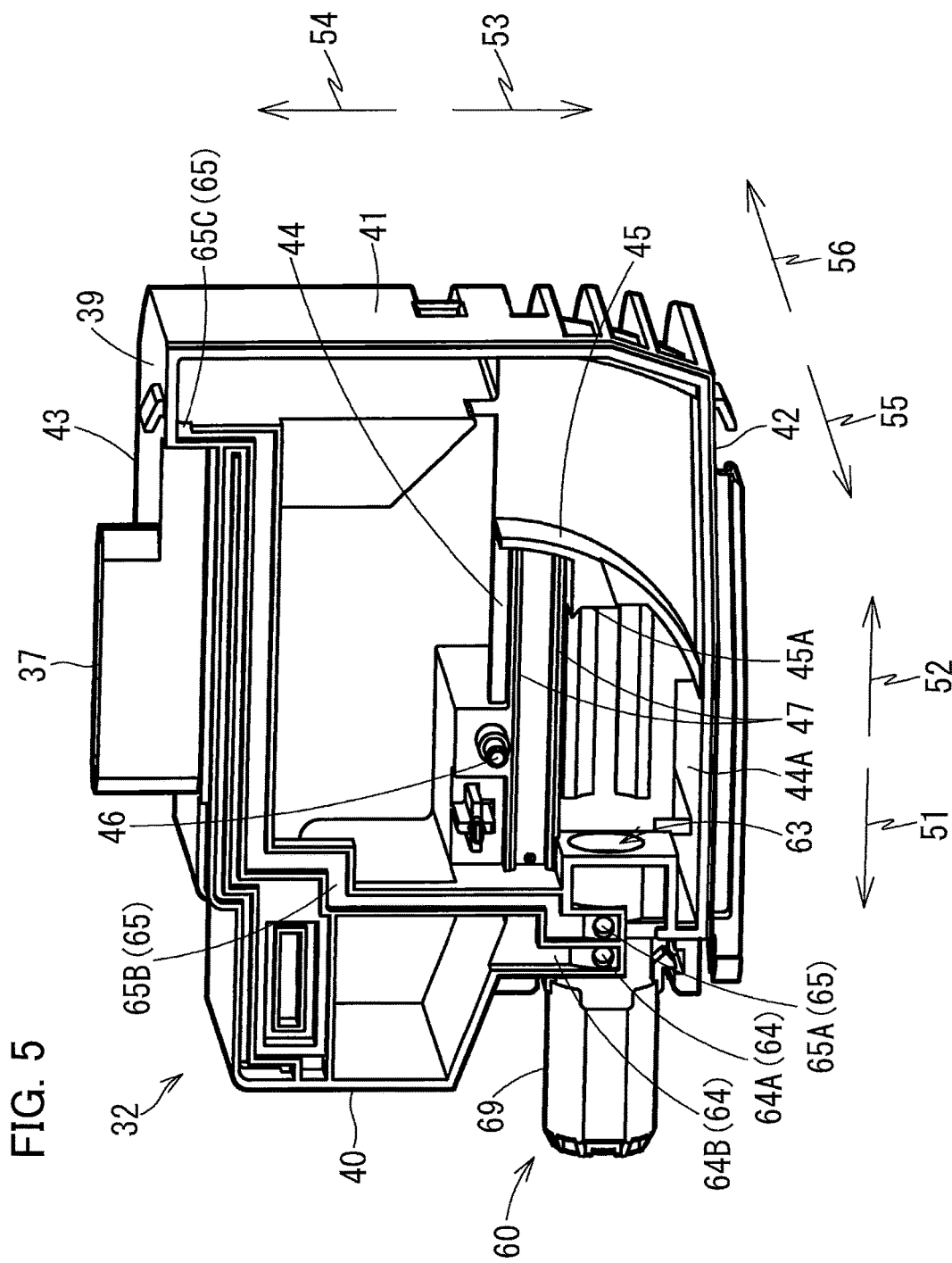
FIG. 5 is a perspective view of the ink container 32 as viewed from a rear side thereof.

As illustrated in FIGS. 4 and 5, the ink container 32 has an external shape that is similar to a flattened rectangular parallelepiped so that a dimension of the ink container 32 in the rightward direction 55 and the leftward direction 56 is smaller than a dimension of the ink container 32 in the downward direction 53 and the upward direction 54 and a dimension of the ink container 32 in the insertion direction 51 and the removal direction 52. The ink container 32 includes the ink chamber 36, the protruding part 37, and the ink supply portion 60. The ink container 32 is primarily formed of resin. The protruding part 37 in particular is formed of a material that transmits light outputted from the light emitting part 104.

The ink container 32 includes a front wall 40 and a rear wall 41 that at least partially overlap each other when viewed in the insertion direction 51 or the removal direction 52, a top wall 39 and a bottom wall 42 that at least partially overlap each other when viewed in the downward direction 53 or the upward direction 54, and a left wall 43 facing in the leftward direction 56, i.e., disposed on a left side of the ink container 32 when viewing the ink container 32 from a front side thereof (when facing the front wall 40). A side of the ink container 32 that faces in the rightward direction 55, i.e., a right side of the ink container 32, is open. A film (not illustrated) seals this open right side of the ink container 32.

When the side of the ink container 32 facing in the rightward direction 55 is viewed in a plan view, an outer shape of the film sealing the right side of the ink container 32 substantially conforms to the external shape of the ink container 32. This film is thermally melt-bonded to right edges of the top wall 39, the front wall 40, the rear wall 41, and the bottom wall 42 to configure a right wall of the ink chamber 36.

<Ink Chamber 36>

The ink chamber 36 (an example of a liquid storage chamber) is a space formed in the ink container 32 for storing ink. The ink chamber 36 is defined by the top wall 39, the front wall 40, the rear wall 41, the bottom wall 42, the left wall 43, and the film. The ink chamber 36 is maintained at negative pressure prior to the ink cartridge 30 being attached to the cartridge attachment section 110. When the ink cartridge 30 is attached to the cartridge attachment section 110, the ink chamber 36 can communicate with ambient air (atmosphere) through a first air passage 64 and a second air passage 65 described later. A first inner wall 44 and a second inner wall 45 are formed inside the ink chamber 36.

As illustrated in FIGS. 4 and 5, the first inner wall 44 is disposed in a lower portion of the ink chamber 36 between the left wall 43 and the film. The first inner wall 44 extends in the insertion direction 51, the removal direction 52, the downward direction 53, and the upward direction 54. More specifically, the first inner wall 44 is positioned offset in the leftward direction 56 relative to the ink supply portion 60. The first inner wall 44 is connected to inner surfaces of the front wall 40, the rear wall 41, and the bottom wall 42 but is separated from the top wall 39. A through-hole 44A is formed in the first inner wall 44 at a position contacting the bottom wall 42. Hence, the first inner wall 44 partially partitions the ink chamber 36 in the rightward direction 55 and the leftward direction 56. Put another way, areas of the ink chamber 36 divided by the first inner wall 44 in the rightward direction 55 and the leftward direction 56 are in communication with each other through the through-hole 44A and through an area of the ink chamber 36 above the first inner wall 44.

A pivot shaft 46 and a pair of guide rails 47 are provided at the first inner wall 44. The pivot shaft 46 is disposed on the first inner wall 44 at a position offset in the removal direction 52 and the upward direction 54 relative to an opening 63 (described later) formed in the ink supply portion 60 and also at a position offset in the insertion direction 51 relative to the second inner wall 45. The pivot shaft 46 protrudes in the rightward direction 55 from the first inner wall 44. The pivot shaft 46 pivotally movably supports a sensor arm 70 (described later, see FIG. 6). The pair of guide rails 47 is disposed on the first inner wall 44 at a position offset in the downward direction 53 relative to the pivot shaft 46 and also at a position offset in the upward direction 54 relative to the opening 63. The pair of guide rails 47 is separated from each other in the downward direction 53 and the upward direction 54. The pair of guide rails 47 is each elongated in the insertion direction 51 and the removal direction 52. The pair of guide rails 47 guides a third part 93 of an arm locker 90 described later (see FIG. 7) to move in the insertion direction 51 and the removal direction 52.

The second inner wall 45 is disposed at a position offset in the removal direction 52 relative to the opening 63, the pivot shaft 46, and rear edges of the guide rails 47. The second inner wall 45 is also disposed at a position separated from the rear wall 41 in the insertion direction 51. Further, the second inner wall 45 protrudes from the first inner wall 44 in the rightward direction 55 and curves while extending approximately in the downward direction 53 and the upward direction 54. A gap is formed between the second inner wall 45 and the film. A spring seat 45A is provided on a front surface of the second inner wall 45 facing in the insertion direction 51. The spring seat 45A is provided on a straight line that passes through an opening 62 and the opening 63 (described later, see FIG. 9). The spring seat 45A supports a rear end of a coil spring 97 (described later). A rear surface of the second inner wall 45 facing in the removal direction 52 has an arc shape that is approximately centered on the pivot shaft 46. The rear surface of the second inner wall 45 guides a float 76 (described later) that is pivotally movable about the pivot shaft 46.

<Protruding Part 37>

As illustrated in FIGS. 3 through 5, the protruding part 37 protrudes in the upward direction 54 from the top wall 39. The protruding part 37 has a box shape with a hollow interior forming space therein. This interior space is in communication with the ink chamber 36. When the ink cartridge 30 is in its attached posture, ink in the ink chamber 36 is at a level below (i.e., in the downward direction 53 from) the protruding part 37. When the ink container 32 is accommodated in the cartridge cover 33, the protruding part 37 protrudes out from the cartridge cover 33 through the opening 34A formed in the top wall 34 of the cartridge cover 33. In other words, at least part of the protruding part 37 is exposed to an outside of the ink cartridge 30. The protruding part 37 allows transmission of light outputted from the light emitting part 104.

<Ink Supply Portion 60>

As illustrated in FIGS. 3 through 5, the ink supply portion 60 has an external shape that is generally cylindrical. The ink supply portion 60 is disposed adjacent to a bottom edge of the front wall 40 of the ink container 32. The ink supply portion 60 is positioned offset in the rightward direction 55 relative to the center portion of the ink cartridge 30. The ink supply portion 60 extends from the interior of the ink chamber 36 to the exterior of the ink chamber 36. When the ink container 32 is accommodated in the cartridge cover 33, the ink supply portion 60 protrudes out from the cartridge cover 33 through the opening 35A formed in the front wall 35 of the cartridge cover 33. In other words, at least part of the ink supply portion 60 is exposed to the outside of the ink cartridge 30. A first sealing member 66 and a cap 69 are attached to the portion of the ink supply portion 60 exposed to the outside of the ink cartridge 30.

Figure 9:
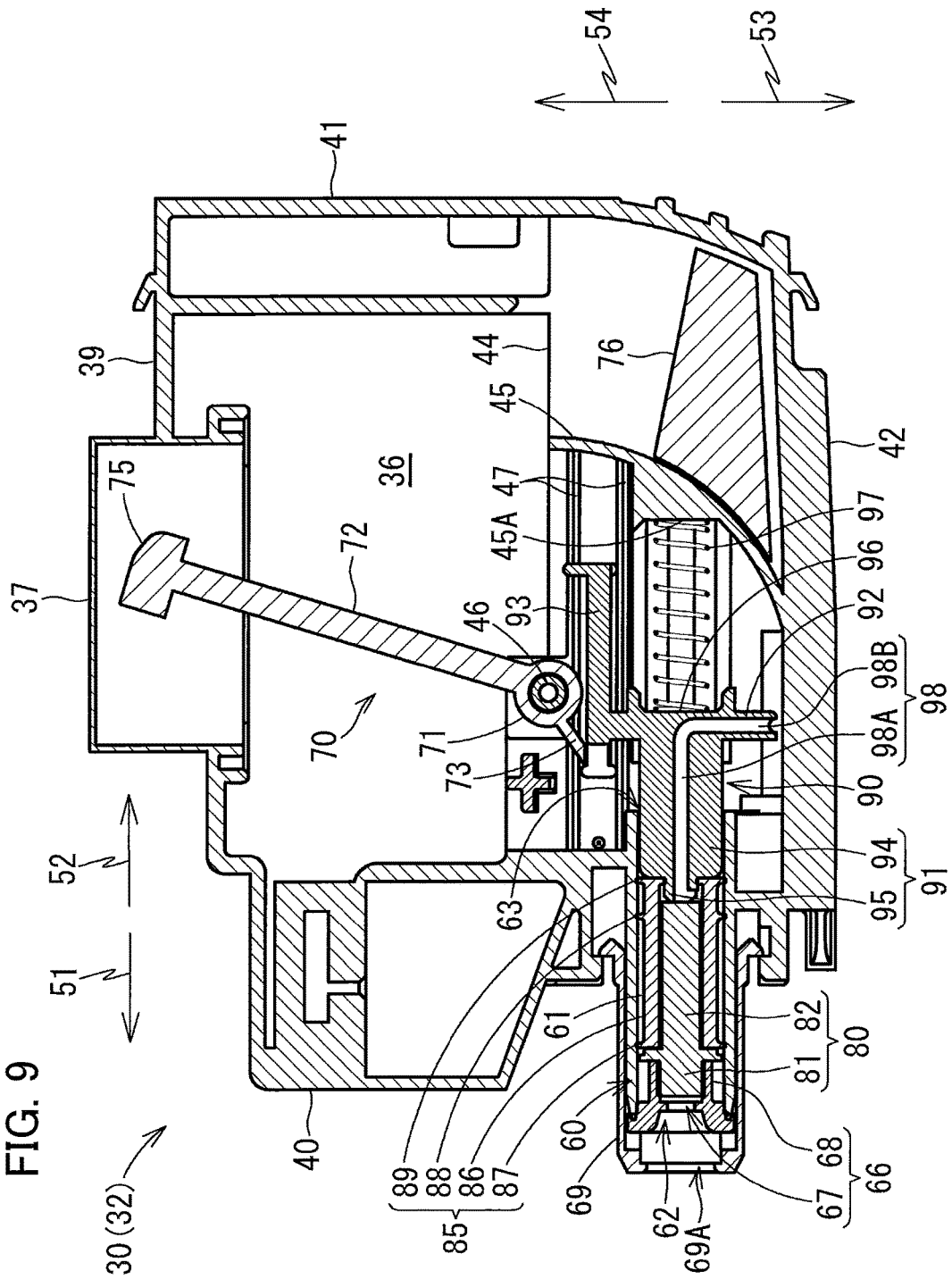
FIG. 9 is a cross-sectional view illustrating an internal configuration of the ink cartridge 30, in which the sensor arm 70 is in a non-detection position, and the valve 80 and the arm locker 90 are in a first position.

The ink stored in the ink chamber 36 can flow out of the ink cartridge 30 through the ink supply portion 60. As illustrated in FIG. 9, a valve chamber 61 (an example of a liquid supply chamber) is formed inside the ink supply portion 60. The valve chamber 61 is in communication with the exterior of the ink cartridge 30 through the opening 62 (an example of a first opening) formed in an end of the ink supply portion 60 facing in the insertion direction 51 (hereinafter referred to as a "distal end"). The valve chamber 61 is also in communication with the ink chamber 36 through the opening 63 (an example of a second opening) formed in an end of the ink supply portion 60 facing in the removal direction 52 (hereinafter referred to as a "proximal end").

As illustrated in FIGS. 4 and 5, the first air passage 64 and the second air passage 65 are in communication with the valve chamber 61. The first air passage 64 is a channel that allows air to flow between the valve chamber 61 and the exterior of the ink cartridge 30. That is, the first air passage 64 allows the valve chamber 61 to communicate with atmospheric air. The first air passage 64 is configured of a hole 64A that provides communication between an inner surface of the ink supply portion 60 and an outer surface of the ink supply portion 60, a groove 64B that communicates with the hole 64A on one end, and a hole 64C that provides communication between the other end of the groove 64B and the exterior of the ink cartridge 30.

The second air passage 65 is a channel that allows air to flow between the valve chamber 61 and the ink chamber 36. The second air passage 65 is configured of a hole 65A that provides communication between the inner surface of the ink supply portion 60 and the outer surface of the ink supply portion 60, a groove 65B that communicates with the hole 65A on one end, and a hole 65C that provides communication between the other end of the groove 65B and the ink chamber 36. The hole 65A is formed at a position offset in the removal direction 52 relative to the hole 64A. The hole 65C is formed at a position above a surface level of the ink stored in the ink chamber 36 when the ink cartridge 30 is at an unused state. In other words, the hole 65C is positioned above a surface of the ink in the ink chamber 36 when the ink chamber 36 stores its maximum volume of ink therein. The first air passage 64 and the second air passage 65 are hermetically (i.e. liquid-tightly) sealed by the film constituting the right wall of the ink cartridge 30.

<First Sealing Member 66 and Cap 69>

Figure 7:
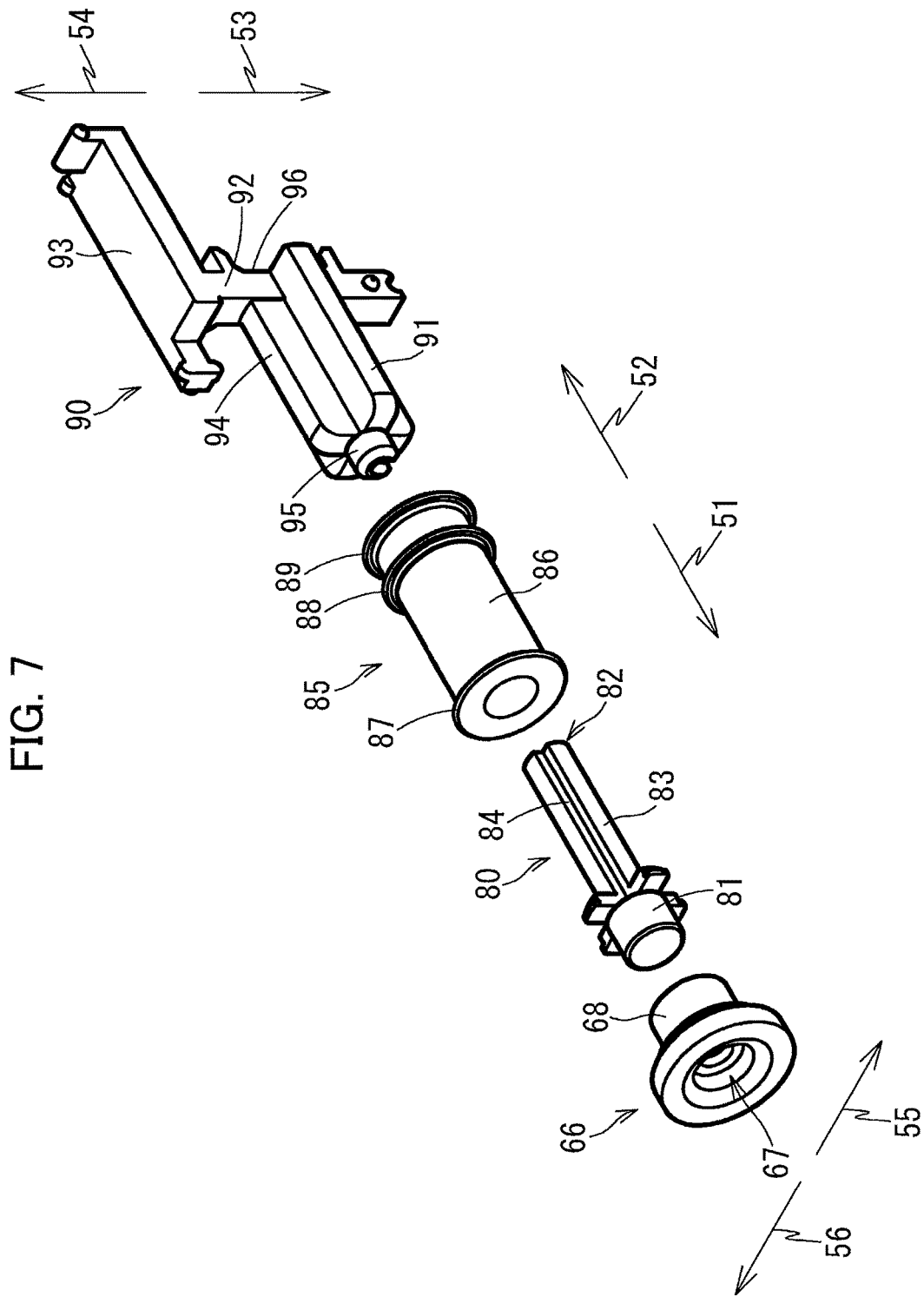
FIG. 7 is an exploded perspective view illustrating a first sealing member 66, a valve 80, a second sealing member 85, and an arm locker 90 provided at the ink container 32.

As illustrated in FIG. 7, the first sealing member 66 has a disc shape with an outer diameter substantially equivalent to an outer diameter of the ink supply portion 60. The first sealing member 66 is attached to the distal end of the ink supply portion 60 at which the opening 62 is formed so as to provide a liquid-tight seal with the distal end of the ink supply portion 60. A through-hole 67 is formed in the first sealing member 66 and penetrates a center region of the first sealing member 66 in its thickness direction (i.e. in the insertion direction 51 and the removal direction 52). In other words, a portion of the opening 62 formed in the valve chamber 61 is closed by the first sealing member 66, while the remainder of the opening 62 is open through the through-hole 67. The first sealing member 66 also has a cylindrical part 68 that protrudes in the removal direction 52 and is arranged to surround the through-hole 67. The cylindrical part 68 has an external shape that is generally cylindrical. The cylindrical part 68 has an inner diameter that is slightly smaller than an outer diameter of a closing part 81 of a valve 80 (described later). The first sealing member 66 is formed of an elastic material such as a rubber.

As illustrated in FIG. 4, the cap 69 is attached to the cartridge cover 33 so as to cover the outer surface of the ink supply portion 60 exposed to an outside of the cartridge cover 33. The first sealing member 66 is interposed between the cap 69 and the distal end of the ink supply portion 60 with respect to the insertion direction 51 and the removal direction 52. A through-hole 69A is formed in the cap 69. The through-hole 67 and the through-hole 69A allow the valve chamber 61 to communicate with the exterior of the ink cartridge 30. Incidentally, an outer diameter of the ink needle 102 is slightly larger than a diameter of the through-hole 67 and slightly smaller than a diameter of the through-hole 69A.

<Sensor Arm 70>

Figure 6:
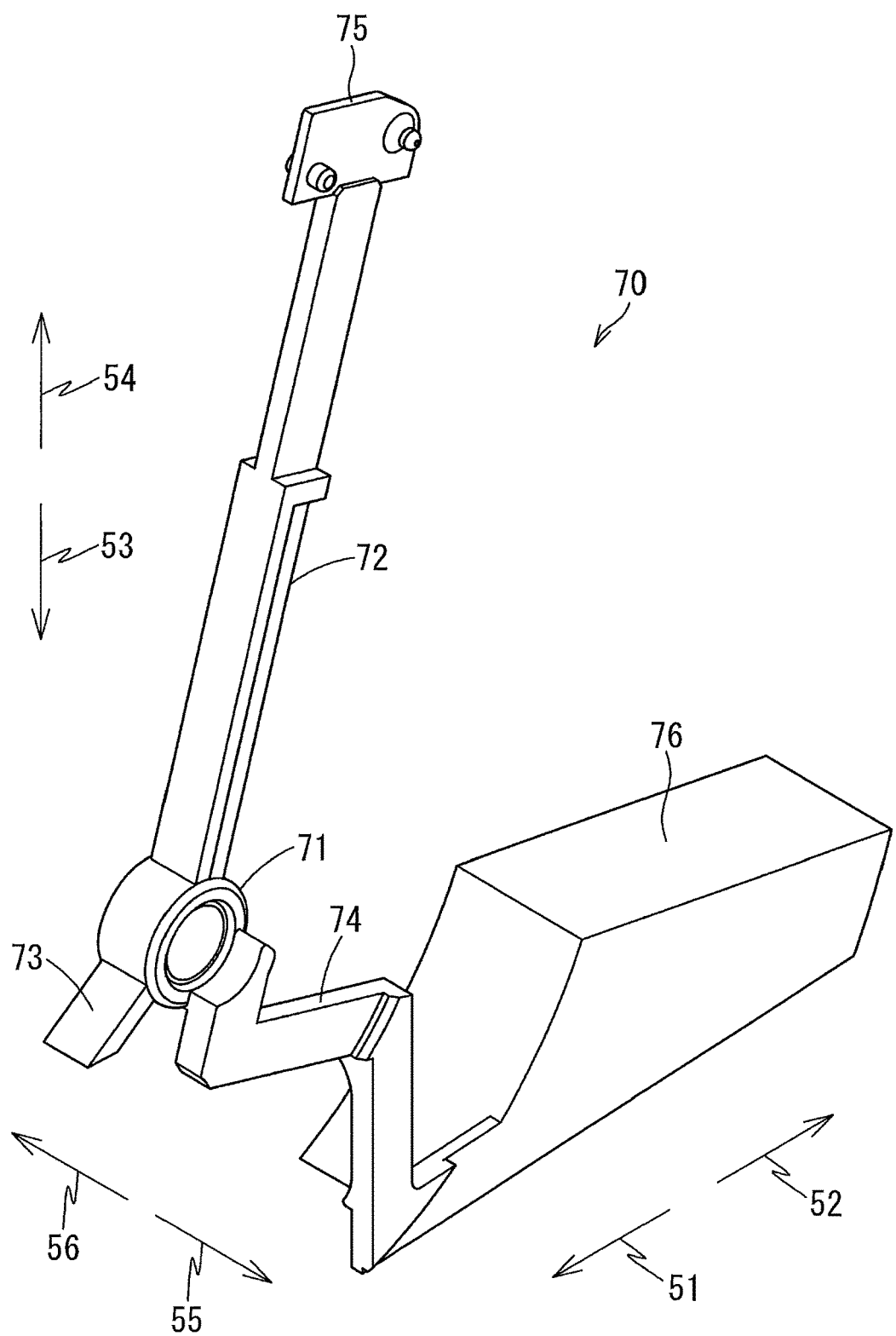
FIG. 6 is a perspective view of a sensor arm 70 provided in the ink container 32.
Figure 10:
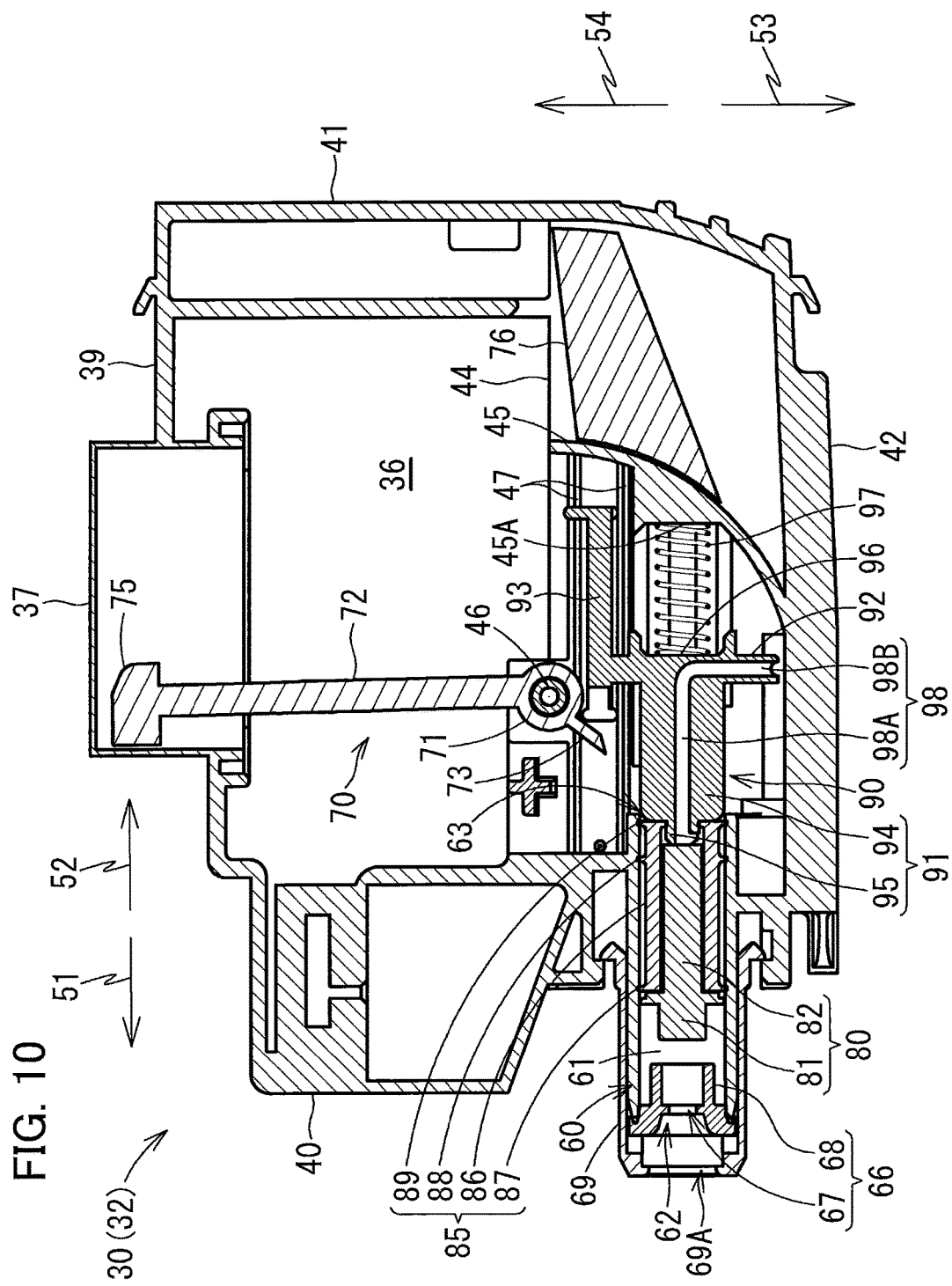
FIG. 10 is a cross-sectional view illustrating the internal configuration of the ink cartridge 30, in which the sensor arm 70 is in a detection position, and the valve 80 and the arm locker 90 are in a second position.
Figure 11:
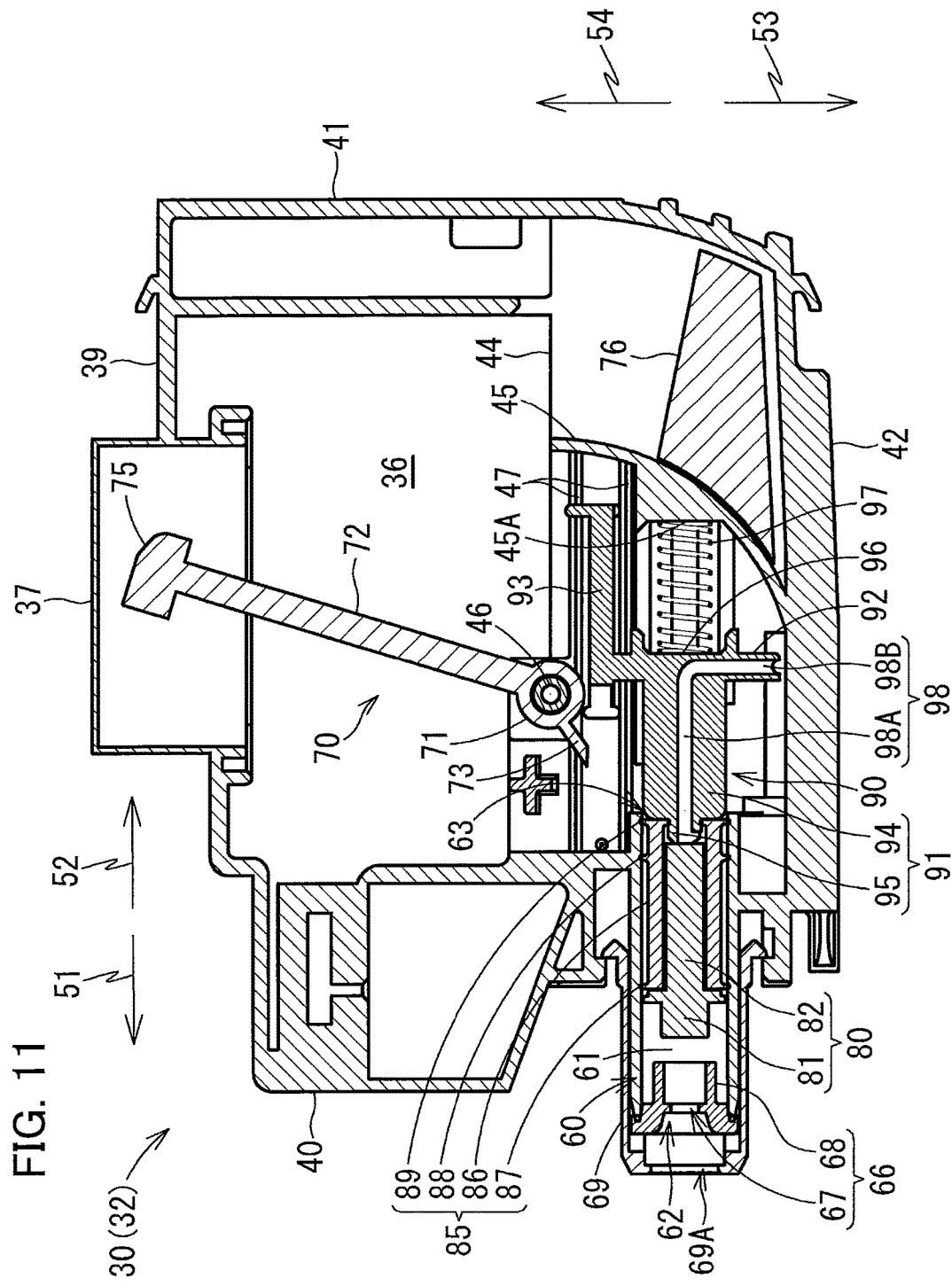
FIG. 11 is a cross-sectional view illustrating the internal configuration of the ink cartridge 30, in which the sensor arm 70 is in the non-detection position, and the valve 80 and the arm locker 90 are in the second position.

As illustrated in FIGS. 9 through 11, the sensor arm 70 (an example of a detector) is accommodated inside the ink chamber 36. The sensor arm 70 is pivotally movably supported by the pivot shaft 46. The sensor arm 70 is pivotally movable about the pivot shaft 46 between a non-detection position (see FIGS. 9 and 11) and a detection position (see FIG. 10). In the following description, the pivotally-moving direction of the sensor arm 70 will be denoted as clockwise or counterclockwise based on directions viewed in FIGS. 9 through 11 (i.e., when viewing the ink cartridge 30 in the leftward direction 56). As illustrated in FIG. 6, the sensor arm 70 includes a bearing part 71, a first arm 72, a second arm 73, a third arm 74, the shutter 75 (an example of a detection part), and the float 76.

The bearing part 71 has an annular shape for receiving the pivot shaft 46. By inserting the pivot shaft 46 into the bearing part 71, the sensor arm 70 can pivotally move about the pivot shaft 46. The first arm 72 extends approximately in the upward direction 54 from an outer surface of the bearing part 71. The second arm 73 extends approximately in the insertion direction 51 and the downward direction 53 from the outer surface of the bearing part 71. The third arm 74 extends approximately in the removal direction 52 and the downward direction 53 from the outer surface of the bearing part 71. The second arm 73 has a length shorter than those of the first arm 72 and the third arm 74.

The shutter 75 is provided at a distal end (i.e. an end farthest from the bearing part 71) of the first arm 72. However, the shutter 75 may be provided at a location other than the distal end of the first arm 72. The shutter 75 is inserted into the interior space formed in the protruding part 37. When the sensor arm 70 is in the non-detection position, the shutter 75 is disposed in a non-detected position that is positioned offset relative to the path of light traveling from the light emitting part 104 to the light receiving part 105. When the sensor arm 70 is in the detection position, the shutter 75 is disposed in the detected position that is positioned higher than the non-detected position and that overlaps the path of light. The shutter 75 has a general flat plate shape that extends in the insertion direction 51, the removal direction 52, the downward direction 53, and the upward direction 54. The shutter 75 has a surface area larger than a diameter of the light outputted from the light emitting part 104.

When the shutter 75 is in the detected position, the light outputted from the light emitting part 104 is blocked by the shutter 75. Hence, the light outputted from the light emitting part 104 does not reach the light receiving part 105. The shutter 75 may prevent the light outputted from the light emitting part 104 from reaching the light receiving part 105 by absorbing, reflecting, or deflecting the light, for example. The shutter 75 may be a member formed of a resin containing a pigment, a member whose surface is coated with a reflective film such as an aluminum film, or a member formed of a transparent or translucent material having a different index of refraction from that of air. Hence, the light outputted from the light emitting part 104 is received by the light receiving part 105 when the sensor arm 70 is in the non-detection position and interrupted by the shutter 75 when the sensor arm 70 is in the detection position.

The float 76 is provided at a distal end of the third arm 74. However, the float 76 may be provided at a location other than the distal end of the third arm 74. The float 76 is disposed in the ink chamber 36 at a position between the rear wall 41 and the second inner wall 45. That is, the third arm 74 connects the bearing part 71 and the float 76, while passing a gap between the second inner wall 45 and the film. The float 76 is formed of a material having a smaller specific gravity than the ink stored in the ink chamber 36.

As illustrated in FIGS. 9 through 11, when the sensor arm 70 pivotally moves counterclockwise from the position shown in FIG. 9, the shutter 75 moves approximately in the insertion direction 51, the float 76 moves approximately in the upward direction 54, and the second arm 73 moves approximately in the downward direction 53. When the sensor arm 70 pivotally moves clockwise from the position shown in FIG. 10, the shutter 75 moves approximately in the removal direction 52, the float 76 moves approximately in the downward direction 53, and the second arm 73 moves approximately in the upward direction 54.

<Valve 80, Second Sealing Member 85, Arm Locker 90, and Coil Spring 97>

As illustrated in FIGS. 9 through 11, the valve 80, a second sealing member 85 (an example of a sealing member), the arm locker 90 (an example of a main body), and the coil spring 97 (an example of an urging member) are accommodated inside the ink cartridge 30. More specifically, the valve 80 and the second sealing member 85 are accommodated in the valve chamber 61. The arm locker 90 extends in the ink chamber 36 and the valve chamber 61, passing through the opening 63. The coil spring 97 is accommodated in the ink chamber 36. The valve 80 and the arm locker 90 constitute an example of a movable member.

The valve 80, the second sealing member 85, and the arm locker 90 (hereinafter also referred to as the "movable member and the like") are configured to move integrally (i.e. as a unit) in the insertion direction 51 and the removal direction 52. A position of the movable member and the like (i.e. the valve 80, the second sealing member 85, and the arm locker 90) illustrated in FIG. 9 is an example of a first position. A position of the movable member and the like (i.e. the valve 80, the second sealing member 85, and the arm locker 90) illustrated in FIGS. 10 and 11 is an example of a second position. The second position is positioned offset in the removal direction 52 relative to the first position. The movable member and the like move from the first position toward the second position when pushed by the ink needle 102 advancing into the valve chamber 61 through the through-holes 69A and 67. When the ink needle 102 is retracted from the valve chamber 61, the movable member and the like move from the second position toward the first position by an urging force of the coil spring 97. A connecting channel 98 is formed inside the movable member and the like.

As illustrated in FIG. 7, the valve 80 is configured of the closing part 81 and an insertion part 82. When the valve 80 is moved to the first position, the closing part 81 is inserted into the cylindrical part 68 to close the through-hole 67. When the closing part 81 is inserted into the cylindrical part 68, the cylindrical part 68 expands radially outward to form a liquid-tight seal with an outer circumferential surface of the closing part 81. When the valve 80 is moved to the second position, the closing part 81 is separated from the cylindrical part 68, opening the through-hole 67.

The insertion part 82 is inserted into the second sealing member 85. The insertion part 82 is configured of a contact part 83 and a grooved part 84. The contact part 83 and the grooved part 84 both extend in the insertion direction 51 and the removal direction 52. The contact part 83 and the grooved part 84 are positioned adjacent to each other in a circumferential direction of the insertion part 82. An outer diameter of the contact part 83 is greater than an outer diameter of the grooved part 84. Accordingly, when the insertion part 82 is inserted into the second sealing member 85, an outer surface of the contact part 83 intimately contacts an inner surface of the second sealing member 85, while a space is formed between an outer surface of the grooved part 84 and the inner surface of the second sealing member 85.

The second sealing member 85 is formed of an elastic material, such as a rubber. The second sealing member 85 is configured of a tubular part 86 having an external shape that is generally cylindrical, and sealing parts 87, 88, and 89 formed on an outer circumferential surface of the tubular part 86. An outer diameter of the tubular part 86 is smaller than an inner diameter of the valve chamber 61. An inner diameter of the tubular part 86 is slightly smaller than or equal to the outer diameter of the contact part 83 and a distal end part 95 of the arm locker 90 described later. Further, the inner diameter of the tubular part 86 is greater than the outer diameter of the grooved part 84. The insertion part 82 of the valve 80 is inserted into an internal space of the tubular part 86 through an opening formed in an endface of the tubular part 86 facing in the insertion direction 51. The distal end part 95 of the arm locker 90 is inserted into the internal space of the tubular part 86 through an opening formed in an endface of the tubular part 86 facing in the removal direction 52. The outer surface of the contact part 83 and an outer surface of the distal end part 95 of the arm locker 90 form liquid-tight seals with an inner surface of the tubular part 86. A space between the inner surface of the tubular part 86 and the outer surface of the grooved part 84 constitutes part of a first channel 98A. The first channel 98A is part of the connecting channel 98.

The sealing parts 87, 88, and 89 protrude radially outward from the outer circumferential surface of the tubular part 86 and extend continuously in a circumferential direction of the tubular part 86. The sealing parts 87, 88, and 89 are arranged spaced apart from each other in the insertion direction 51 and the removal direction 52. Outer diameters of the sealing parts 87, 88, and 89 prior to being inserted into the valve chamber 61 are larger than an inner diameter of the ink supply portion 60 (i.e., the inner diameter of the valve chamber 61). Thus, the sealing parts 87, 88, and 89 are diametrically compressed when disposed in the valve chamber 61 to make intimate contact with the inner surface of the ink supply portion 60 that is continuous in the circumferential direction. Accordingly, each of the sealing parts 87, 88, and 89 isolates a space on its opening 62 side from a space on its opening 63 side within an area formed between the inner surface of the ink supply portion 60 and the outer surface of the second sealing member 85.

As illustrated in FIG. 7, the arm locker 90 is configured of a first part 91, a second part 92, and the third part 93. The first through third parts 91-93 are each elongated bar-like members. The first part 91 extends in the insertion direction 51 and the removal direction 52. The second part 92 extends in the downward direction 53 and the upward direction 54 from a rear end of the first part 91. The third part 93 extends in the insertion direction 51 and the removal direction 52 from a top end of the second part 92. A remaining part of the connecting channel 98 is formed inside the arm locker 90, as illustrated in FIGS. 9 through 11.

The first part 91 is configured of a proximal end part 94 connected to the second part 92, and the distal end part 95 that protrudes in the insertion direction 51 from the proximal end part 94. Inside the first part 91, a remaining part of the first channel 98A that extends in the insertion direction 51 and the removal direction 52 is formed. One end of the first channel 98A in the first part 91 communicates with an exterior of the arm locker 90 through an opening formed in the distal end part 95 of the arm locker 90. The opening formed in the distal end part 95 of the arm locker 90 has an open part facing in the insertion direction 51 and an open part facing in the downward direction 53. The other end of the first channel 98A in the first part 91 connects to a second channel 98B formed inside the second part 92.

As illustrated in FIGS. 9 through 11, at least a portion of the proximal end part 94 of the arm locker 90 is disposed inside the ink chamber 36. A top surface of the proximal end part 94 (an example of a liquid guide) slopes downward from the center of the arm locker 90 in both the rightward direction 55 and the leftward direction 56. The distal end part 95 of the arm locker 90 advances into the tubular part 86 of the second sealing member 85 and intimately contacts the inner surface of the tubular part 86. By inserting the distal end part 95 into the tubular part 86, the opening formed in the distal end part 95 is in communication with a space between the grooved part 84 and the second sealing member 85. In this way, the first channel 98A extends from the inside of the first part 91 to the space between the inner surface of the tubular part 86 and the grooved part 84 through the opening formed in the distal end part 95.

As illustrated in FIGS. 9 through 11, the second channel 98B that extends in the downward direction 53 and the upward direction 54 (i.e., in a vertical direction) is formed inside the second part 92. A top end of the second channel 98B is connected to an end of the first channel 98A facing in the removal direction 52, while a bottom end opens into the ink chamber 36. A spring seat 96 is provided on a rear surface of the second part 92, i.e., a surface facing in the removal direction 52. The spring seat 96 is provided on a straight line that passes through the opening 62 and the opening 63. The spring seat 96 supports a front end of the coil spring 97. As illustrated in FIGS. 9 through 11, the coil spring 97 is disposed between the spring seat 45A and the spring seat 96. The coil spring 97 urges the arm locker 90, and the valve 80 and the second sealing member 85 connected to the arm locker 90, in the insertion direction 51.

When the arm locker 90 is in the first position as illustrated in FIG. 9, the third part 93 of the arm locker 90 contacts the second arm 73 of the sensor arm 70 in the non-detection position to maintain the sensor arm 70 in the non-detection position. More specifically, when arm locker 90 is in the first position, the third part 93 is disposed below the second arm 73 of the sensor arm 70 in the non-detection position and restricts movement of the second arm 73 in the downward direction 53 (and thus restricts counterclockwise movement of the sensor arm 70). When the arm locker 90 is in the second position as illustrated in FIGS. 10 and 11, the third part 93 is separated from the second arm 73 in the removal direction 52 and no longer restrains the sensor arm 70.

In other words, when the arm locker 90 is in the first position, the third part 93 is disposed at a position at which the second arm 73 should be present when the sensor arm 70 is in the detection position. However, when the arm locker 90 is in the second position, the third part 93 is positioned offset relative to the position at which the second arm 73 should be present when the sensor arm 70 is in the detection position.

Further, an edge portion of the third part 93 facing in the leftward direction 56 is disposed between the pair of guide rails 47. Thus, the third part 93 disposed between the pair of guide rails 47 restricts movement of the arm locker 90 in the downward direction 53 and the upward direction 54 and guides movement of the arm locker 90 in the insertion direction 51 and the removal direction 52.

<Connecting Channel 98>

The connecting channel 98 provides communication between a space in the valve chamber 61 on the opening 62 side relative to the second sealing member 85 (that is, a space near the through-holes 67 and 69A) and the ink chamber 36 so that liquid can flow therebetween. In other words, the space in the valve chamber 61 is positioned in an area closer to the opening 62 than the second sealing member 85 to the opening 62. Thus, the connecting channel 98 is the only passage through which the ink stored in the ink chamber 36 can flow out of the ink cartridge 30. As described earlier, the connecting channel 98 is configured of the first channel 98A and the second channel 98B.

The first channel 98A extends approximately in the insertion direction 51 and the removal direction 52. More specifically, the first channel 98A is formed across a region that includes the space between the outer surface of the grooved part 84 and the inner surface of the tubular part 86 and the internal space in the first part 91 of the arm locker 90. Thus, the first channel 98A is formed substantially in the valve chamber 61.

The second channel 98B is formed in the internal space in the second part 92 of the arm locker 90, and extends approximately in the downward direction 53 and the upward direction 54. When the ink cartridge 30 is in the attached posture, the second channel 98B opens into the ink chamber 36 at a position offset relative to the opening 63 in the downward direction 53. In this embodiment, the opening of the second channel 98B that opens into the ink chamber 36 confronts but is separated from the bottom wall 42 of the ink chamber 36 in the downward direction 53 and the upward direction 54. The opening of the second channel 98B that opens into the ink chamber 36 is positioned farther in the downward direction 53 than a bottom end of the valve chamber 61.

<Controller 130>

Figure 8:
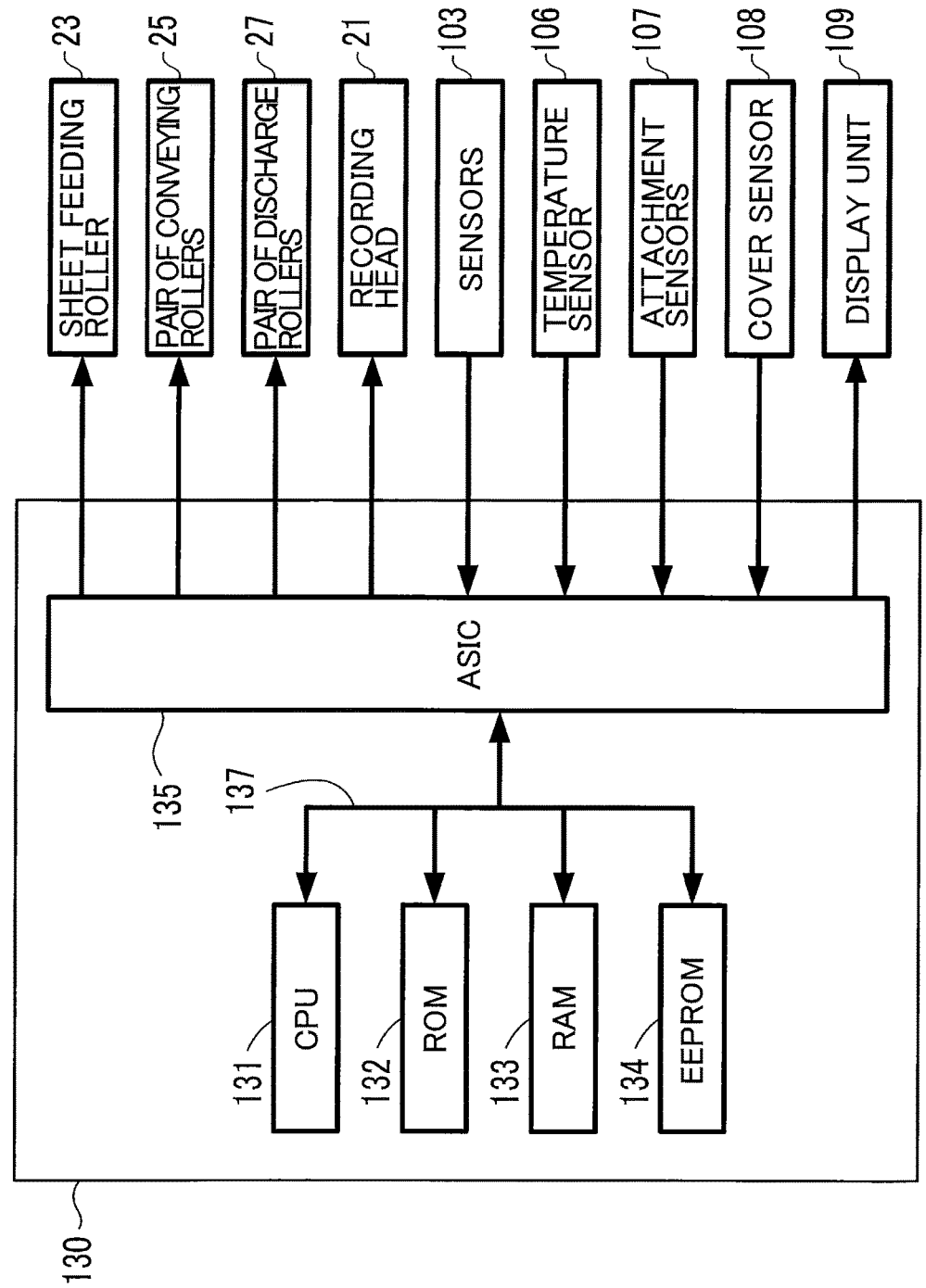
FIG. 8 is a functional block diagram of the printer 10.

The printer 10 includes the control unit 130. As illustrated in FIG. 8, the control unit 130 includes a CPU 131, a ROM 132, a RAM 133, a EEPROM 134, and an ASIC 135, all of which components are connected via an internal bus 137. The ROM 132 stores programs and the like by which the CPU 131 can control various operations. The RAM 133 is used as a storage area for temporarily storing data, signals, and the like used when the CPU 131 executes the programs, or as a work area for data processes. The EEPROM 134 stores settings, flags, and the like that must be preserved after the printer 10 has been turned off. All or some of the CPU 131, the ROM 132, the RAM 133, the EEPROM 134, and the ASIC 135 may be configured of a single chip or may be spread over a plurality of chips.

The control unit 130 drives a motor (not illustrated) to rotate the sheet feeding roller 23, the conveying rollers 25, and the discharge rollers 27. The control unit 130 also controls the recording head 21 to eject ink from the nozzles 29. More specifically, the control unit 130 outputs control signals, to the head control board 21A, indicative of the magnitude of drive voltages to be applied to the piezoelectric elements 29A. The head control board 21A applies drive voltages to the piezoelectric elements 29A provided for the nozzles 29 at the magnitudes specified in the control signals acquired from the control unit 130 in order to eject ink from the corresponding nozzles 29. The control unit 130 displays information related to the printer 10 and the ink cartridge 30 and various messages on a display unit 109.

The control unit 130 is configured to acquire detection signals outputted from the sensors 103, detection signals outputted from the attachment sensors 107, signals outputted from a temperature sensor 106, and signals outputted from a cover sensor 108.

The temperature sensor 106 is configured to output signals indicative of a detected temperature. A position at which the temperature sensor 106 measures the temperature is not particularly limited. The position may be inside the cartridge attachment section 110 or on a surface of the printer 10, for example.

The cover sensor 108 is configured to output signals that differ according to whether the cover over the opening 112 formed in the cartridge attachment section 110 is open or closed.

<Movement of Sensor Arm 70, Valve 80, Second Sealing Member 85, and Arm Locker 90>

Next, movements of the sensor arm 70, the valve 80, the second sealing member 85, and the arm locker 90 when the ink cartridge 30 is being attached to the cartridge attachment section 110 will be described. In the following description, it will be assumed that the amount of ink stored in the ink chamber 36 is greater than an amount considered to be a near-empty condition described later. That is, the float 76 is submerged in the ink stored in the ink chamber 36 and receives a buoyant force from the ink that acts to pivotally move the sensor arm 70 counterclockwise.

Prior to the ink cartridge 30 being attached to the cartridge attachment section 110, the valve 80, the second sealing member 85, and the arm locker 90 are disposed in the first position illustrated in FIG. 9 owing to the urging force of the coil spring 97. The valve 80 in the first position is inserted into the cylindrical part 68 of the first sealing member 66 and closes the through-hole 67, thereby interrupting communication between the opening 62 (i.e., the through-holes 67 and 69A) and the connecting channel 98. Further, when the second sealing member 85 is in the first position, the sealing part 88 of the second sealing member 85 is disposed between the hole 64A and the hole 65A, thereby interrupting communication between the first air passage 64 and the second air passage 65.

Further, the third part 93 of the arm locker 90 in the first position contacts the second arm 73 of the sensor arm 70 in the non-detection position and maintains the sensor arm 70 in the non-detection position. When the sensor arm 70 is restrained in the non-detection position, the shutter 75 is positioned offset relative to the detected position. Thus, when the ink cartridge 30 is in a state illustrated in FIG. 9, the sensor 103 outputs a high level signal to the control unit 130. Further, since the ink cartridge 30 illustrated in FIG. 9 has not yet been attached to the cartridge attachment section 110, the attachment sensor 107 outputs a low level signal to the control unit 130.

At this time, by opening the cover that covers the opening 112 in the cartridge attachment section 110, the user can insert the ink cartridge 30 into the cartridge attachment section 110. When the ink cartridge 30 is inserted to a position adjacent to the inner back surface 151 of the case 101 of the cartridge attachment section 110, the front wall 35 of the cartridge cover 33 of the ink cartridge 30 presses against the attachment sensor 107, causing the attachment sensor 107 to output a high level signal to the control unit 130. In other words, the detection signal outputted from the attachment sensor 107 switches from a low level signal to a high level signal in response to the ink cartridge 30 being attached to the cartridge attachment section 110.

In addition, when the ink cartridge 30 has been inserted to a position adjacent to the inner back surface 151 of the cartridge attachment section 110, the ink needle 102 is inserted into the valve chamber 61 through the through-holes 69A and 67 and contacts the closing part 81 of the valve 80. When the ink cartridge 30 is further moved in the insertion direction 51 from this state, the valve 80 is pushed in the removal direction 52 by a reaction force received from the ink needle 102. Consequently, the valve 80, the second sealing member 85, and the arm locker 90 move in the removal direction 52 from the first position toward the second position against the urging force of the coil spring 97.

The reaction force received from the ink needle 102 by the valve 80, the second sealing member 85, and the arm locker 90 is an example of an external force applied from outside the ink cartridge 30.

As illustrated in FIG. 10, the valve 80 in the second position is separated from the cylindrical part 68 of the first sealing member 66, opening the through-hole 67 to allow communication between the opening 62 (i.e., the through-holes 67 and 69A) and the connecting channel 98. Further, when the second sealing member 85 is in the second position, the holes 64A and 65A are positioned between the sealing part 87 and the sealing part 88, enabling the ink chamber 36 to communicate with the ambient air through the first air passage 64 and the second air passage 65. Further, when the arm locker 90 is in the second position, the third part 93 of the arm locker 90 is separated from the second arm 73 of the sensor arm 70. Hence, the third part 93 no longer restrains the sensor arm 70 in the non-detection position. As a result, the sensor arm 70 pivotally moves counterclockwise due to the buoyant force applied by the ink to the float 76.

Due to the sensor arm 70 pivotally moving counterclockwise, the shutter 75 is moved to the detected position and blocks light outputted from the light emitting part 104 from reaching the light receiving part 105. As a result, the sensor 103 outputs a low level signal to the control unit 130. That is, the detection signal outputted from the sensor 103 switches from a high level signal to a low level signal when the shutter 75 is moved to the detected position. Through the process described above, the ink cartridge 30 is completely attached to the cartridge attachment section 110.

Incidentally, the shutter 75 of the sensor arm 70 may be defined in the following way. Take two points A and B that face each other in the rightward direction 55 and the leftward direction 56, and assume that light emitted from Point A travels in either the rightward direction 55 or the leftward direction 56 toward Point B. The light may be visible or infrared light, for example. Here, the intensity of the light that reaches Point B will be represented by I. A light emitting part of the sensor 103 may be disposed at Point A, and a light receiving part of the sensor 103 may be disposed at Point B. If the light receiving part is configured of a phototransistor, a value C will denote a collector current in the phototransistor when the intensity of light reaching the phototransistor is I.

When the amount of ink in the ink chamber 36 is equal to or more than a prescribed amount, the shutter 75 is positioned between Point A and Point B in the rightward direction 55 and the leftward direction 56. Thus, light emitted from Point A traveling in the rightward direction 55 or the leftward direction 56 is incident on either one of a left surface and a right surface of the sensor arm 70. Consequently, the amount of light exiting the other of the left surface and the right surface of the sensor arm 70 and reaching Point B has an intensity less than half the intensity I, such as 0. At this time, the collector current in the phototransistor is less than half the value C, such as 0. When the amount of ink in the ink chamber 36 is less than the prescribed amount, the sensor arm 70 becomes offset from the position between Point A and Point B in the rightward direction 55 and the leftward direction 56. At this time, the light emitted from Point A that reaches Point B has an intensity equal to or more than half the intensity I, and the collector current in the phototransistor is equal to or more than half the value C.

Next, movements of the sensor arm 70, the valve 80, the second sealing member 85, and the arm locker 90 when the ink cartridge 30 is being removed from the cartridge attachment section 110 will be described. In the following description, it will be assumed that the amount of ink stored in the ink chamber 36 is greater than an amount considered to be the near-empty condition described later. That is, it will be assumed that the sensor arm 70 is disposed in its detection position at the time the ink cartridge 30 is about to be removed from the cartridge attachment section 110.

When the user starts to remove the ink cartridge 30 from the cartridge attachment section 110 (i.e., starts to move the ink cartridge 30 in the removal direction 52), the ink needle 102 is gradually retracted from the valve chamber 61 through the through-holes 67 and 69A. Consequently, the valve 80, the second sealing member 85, and the arm locker 90 are moved from the second position to the first position by the urging force of the coil spring 97. When the ink needle 102 has been completely removed from the valve chamber 61, the valve 80, the second sealing member 85, and the arm locker 90 are in the first position illustrated in FIG. 9.

As described above, the valve 80 in the first position closes the through-hole 67. The sealing part 88 of the second sealing member 85 in the first position blocks communication between the first air passage 64 and the second air passage 65. Further, when the arm locker 90 moves from the second position to the first position, the third part 93 of the arm locker 90 contacts the second arm 73 of the sensor arm 70 in the detection position to push the second arm 73 upward. As a result of this contact from the arm locker 90, the sensor arm 70 pivotally moves clockwise from the detection position to the non-detection position. Hence, the sensor arm 70 is once again restrained in the non-detection position.

The shutter 75 is retracted from the detected position through this movement. Thus, light outputted from the light emitting part 104 is received by the light receiving part 105. As a result, the sensor 103 outputs a high level signal to the control unit 130. That is, the detection signal outputted from the sensor 103 switches from a low level signal to a high level signal as the shutter 75 is retracted from the detected position.

Further, the attachment sensor 107 outputs a low level signal to the control unit 130 in response to the ink cartridge 30 no longer pressing the attachment sensor 107. In other words, the detection signal outputted from the attachment sensor 107 switches from a high level signal to a low level signal in response to the ink cartridge 30 being removed from the cartridge attachment section 110.

Next, a movement of the sensor arm 70 will be described for a case in which the ink cartridge 30 is completely attached to the cartridge attachment section 110 and the ink stored in the ink chamber 36 of the ink cartridge 30 has been consumed through operations of the recording head 21. Note that the valve 80, the second sealing member 85, and the arm locker 90 do not move in response to a reduction of ink stored in the ink chamber 36.

The surface level of the ink stored in the ink chamber 36 drops as ink is ejected from the nozzles 29 of the recording head 21. When most part of the float 76 becomes exposed above the surface of the ink in the ink chamber 36 as the surface level drops, the buoyant force acting on the float 76 is lost, allowing the sensor arm 70 to pivotally move clockwise. Since the shutter 75 is retracted from the detected position as the sensor arm 70 pivotally moves clockwise, light outputted from the light emitting part 104 reaches the light receiving part 105. As a result, the sensor 103 outputs a high level signal to the control unit 130. In other words, the detection signal outputted from the sensor 103 switches from a low level signal to a high level signal when the amount of ink stored in the ink chamber 36 drops below a threshold value.

<Determination of Abnormal Ink Viscosity Executed by Control Unit 130>

Next, a process executed by the control unit 130 for determining whether the viscosity of ink stored in the ink chamber 36 is abnormal will be described with reference to the flowcharts in FIGS. 12, 13, and 14.

Figure 12:
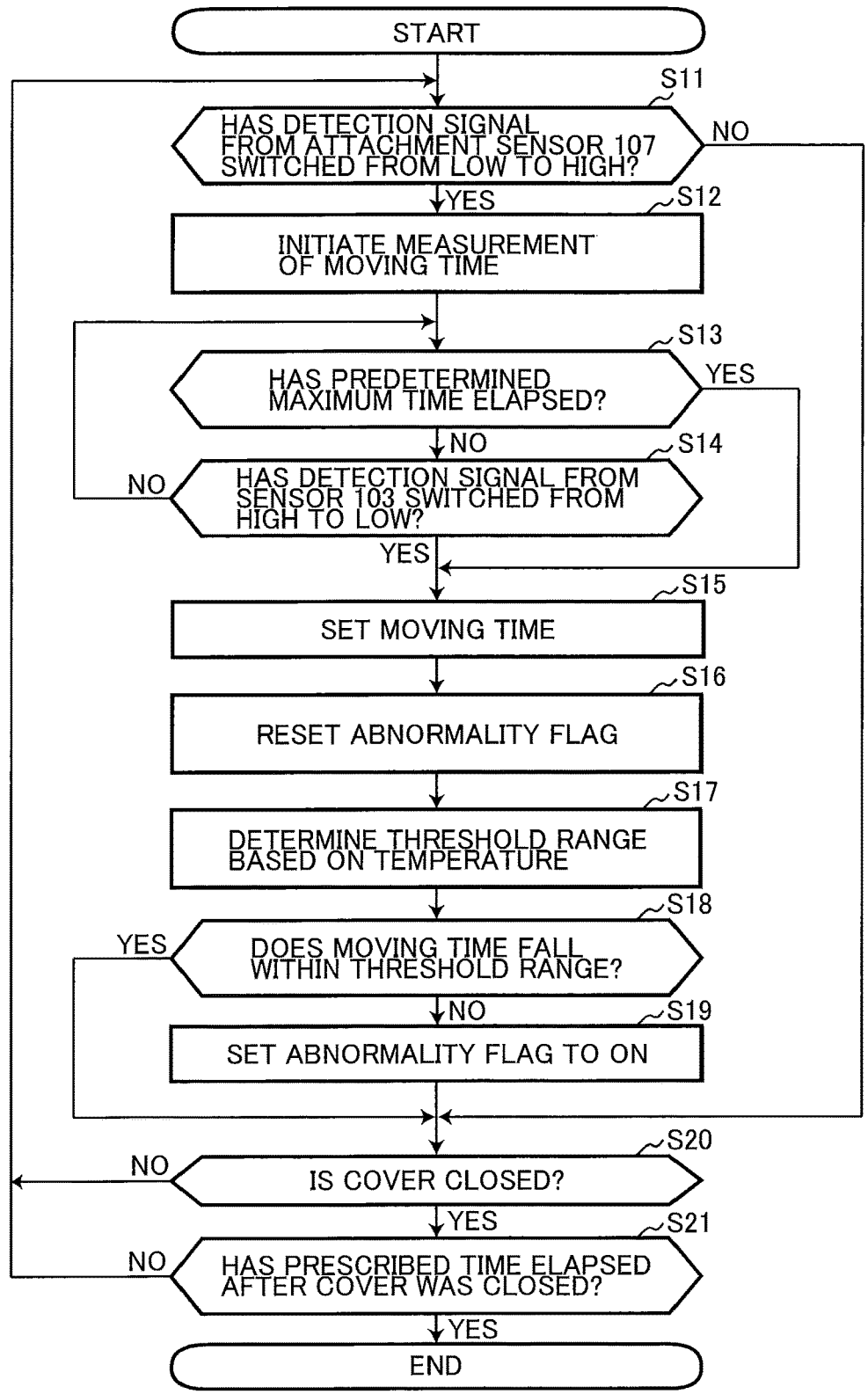
FIG. 12 is a flowchart illustrating steps in a process executed by a control unit 130 for determining whether the viscosity of ink stored in an ink chamber 36 of the ink cartridge 30 is abnormal.

In S11 of FIG. 12, the control unit 130 determines whether the detection signal outputted from the attachment sensor 107 has switched from a low level signal to a high level signal. When the detection signal has switched to a high level signal (S11: YES), in S12 the control unit 130 initiates a count for measuring a moving time of the sensor arm 70. In the process of S11, the control unit 130 references the detection signal at prescribed intervals. Accordingly, the control unit 130 determines that the detection signal has switched when the level of the most recent detection signal differs from the level of the detection signal preceding the most recent detection signal.

If the detection signal outputted from the attachment sensor 107 has not switched from a low level signal to a high level signal (S11: NO), the control unit 130 advances to step S20 to execute a process described later. Here, the reason that the detection signal outputted from the attachment sensor 107 does not switch from a low level signal to a high level signal may be because a new ink cartridge 30 has not yet been attached to the cartridge attachment section 110, for example.

After initiating the count for measuring the moving time of the sensor arm 70 in S12, in S13 the control unit 130 determines whether the amount of time elapsed after the count was initiated exceeds a predetermined maximum time. If the maximum time has already elapsed (S13: YES), the control unit 130 advances to S15 and executes a process described later. Here, the maximum time may elapse before the detection signal outputted from the sensor 103 has switched from a high level signal to a low level signal (S14: YES) when the viscosity of ink stored in the ink chamber 36 is very high.

If the maximum time has not yet elapsed (S13: NO), in S14 the control unit 130 determines whether the detection signal outputted from the sensor 103 has switched from a high level signal to a low level signal. While the detection signal outputted from the sensor 103 has not switched (S14: NO), the control unit 130 repeats the determination in S13. When the control unit 130 determines that the detection signal outputted from the sensor 103 has switched to a low level signal (S14: YES), the control unit 130 halts the count for measuring the moving time of the sensor arm 70 and in S15 sets the counted time as the moving time of the sensor arm 70. If the control unit 130 advances to S15 because the maximum time has elapsed (S13: YES), the control unit 130 then sets the moving time of the sensor arm 70 to this maximum time.

The moving time denotes the time required for the detection signal outputted from the sensor 103 to switch from a high level signal to a low level signal (S14: YES) after determining that the detection signal outputted from the attachment sensor 107 has switched from a low level signal to a high level signal (S11: YES). Strictly speaking, the timing at which the detection signal outputted from the attachment sensor 107 switches from a low level signal to a high level signal might not be synchronous with the timing at which the sensor arm 70 is allowed to pivotally move from the non-detection position to the detection position when no longer restrained by the arm locker 90. However, since the former timing and the latter timing occur very close together, the latter timing may be treated as the former timing. Therefore, the control unit 130 calculates the time from the moment a high level signal is acquired from the attachment sensor 107 to the moment a low level signal is acquired from the sensor 103 to be the moving time of the sensor arm 70, i.e., the time required for the sensor arm 70 to move from its non-detection position to its detection position.

In S16 the control unit 130 resets an abnormality flag (i.e., sets the abnormality flag to OFF). The abnormality flag may be later set to ON after determining in S18 described later that the moving time does not fall within a threshold range (S18: NO). An abnormality flag is set for each of the ink cartridges 30. The control unit 130 stores the abnormality flags in the EEPROM 134.

In S17 the control unit 130 determines a threshold range based on the signal outputted from the temperature sensor 106. The threshold range is used for comparison with the moving time measured in S15 in order to estimate the viscosity of ink stored in the ink chamber 36. The control unit 130 reduces at least one of the upper limit and the lower limit of the threshold range for higher temperatures identified by the signal outputted from the temperature sensor 106. In other words, the control unit 130 increases at least one of the upper limit and the lower limit of the threshold range for lower temperatures identified by the signal outputted from the temperature sensor 106.

In S18 the control unit 130 determines whether the moving time of the sensor arm 70 measured in S15 falls within the threshold range set in S17. Here, the viscosity of ink stored in the ink chamber 36 is considered too low compared with the viscosity of ink suitable for performing an image-recording process when the moving time falls below the lower limit of the threshold range, and is considered too high compared with the viscosity of ink suitable for performing an image-recording process when the moving time exceeds the upper limit of the threshold range. If the moving time falls outside the threshold range (S18: NO), in S19 the control unit 130 sets the abnormality flag to ON. However, if the moving time falls within the threshold range (S18: YES), the control unit 130 skips the process in S19.

In S20 the control unit 130 determines whether the signal outputted from the cover sensor 108 indicates that the cover over the opening 112 formed in the cartridge attachment section 110 is closed. If the control unit 130 determines that the cover is open (S20: NO), the control unit 130 repeats the above process from S11. However, if the control unit 130 determines that the cover is closed (S20: YES), in S21 the control unit 130 determines whether a prescribed time has elapsed after determining in S20 that the cover was closed.

If the control unit 130 determines that the prescribed time has elapsed (S21: YES), the control unit 130 ends the process of FIG. 12. However, if the prescribed time has not yet elapsed (S21: NO), the control unit 130 repeats the above process from S11. Note that if the control unit 130 subsequently determines in S20 that the cover has been opened after repeating the above process from S11 (S20: NO), the control unit 130 halts the time measurement initiated when the cover was determined to be closed (S20: YES).

Figure 13:
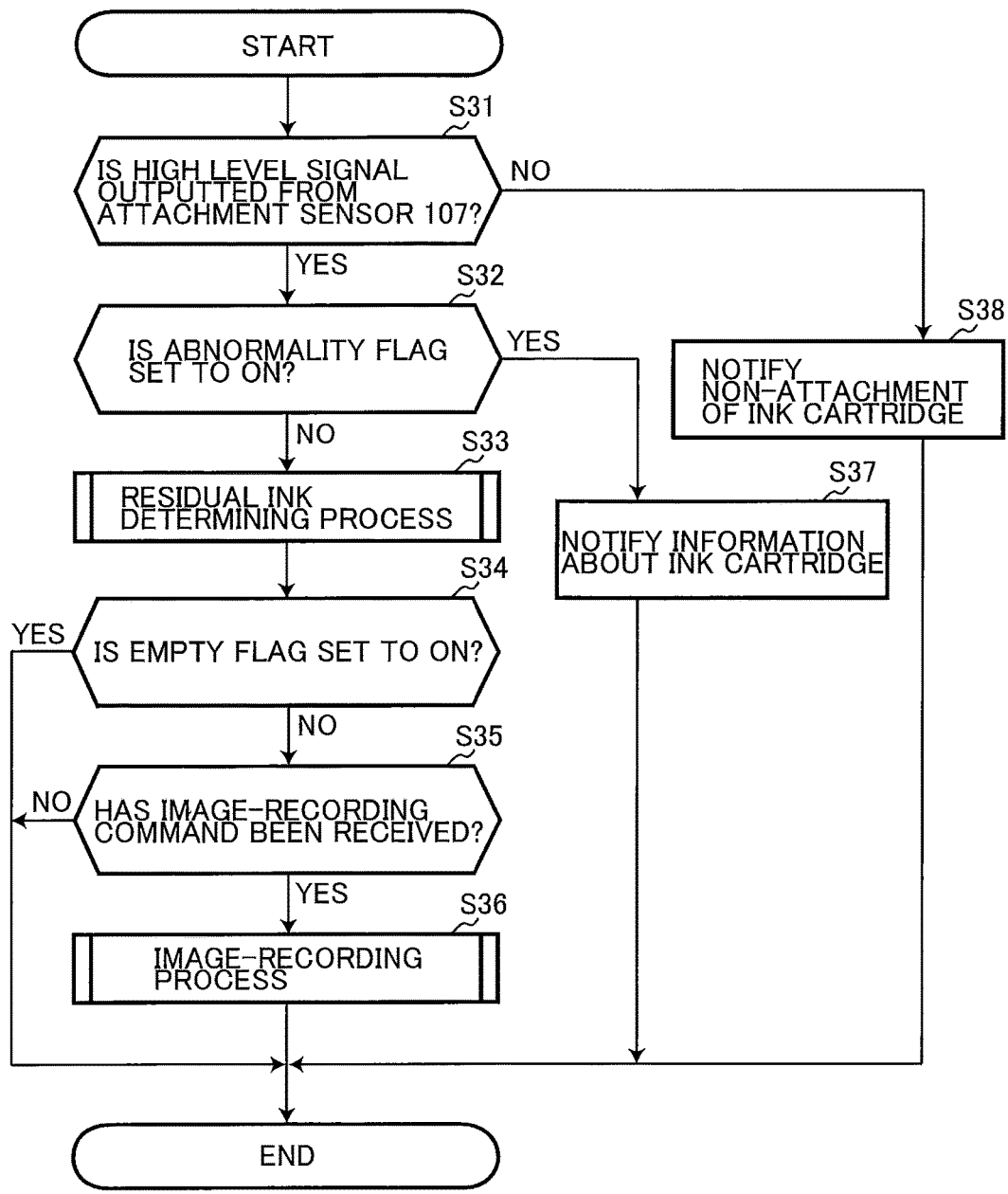
FIG. 13 is a flowchart illustrating steps in a process executed by the control unit 130 after completing the process illustrated in FIG. 12 and as long as a cover of the cartridge attachment section 110 is closed.

After completing the process illustrated in FIG. 12, the control unit 130 repeatedly executes the process illustrated in FIG. 13 at prescribed intervals as long as the cover sensor 108 is outputting a signal indicating that the cover is closed over the opening 112 formed in the cartridge attachment section 110.

In S31 of FIG. 13, the control unit 130 first determines whether the detection signal outputted from the attachment sensor 107 is a high level signal. If the detection signal is a low level signal (S31: NO), in S38 the control unit 130 notifies the user that the ink cartridge 30 is not attached to the cartridge attachment section 110 and subsequently ends the process of FIG. 13. There are no particular limitations on the specific method of notification in this case, but the control unit 130 may display a message on the display unit 109 provided in the printer 10 or may output an instructional voice message from a speaker (not illustrated) provided in the printer 10, for example. Similar methods of notification may be used in steps S37, S44, and S47 described later.

However, if the detection signal outputted from the attachment sensor 107 is a high level signal (S31: YES), in S32 the control unit 130 determines whether the abnormality flag is set to ON. If the abnormality flag is set to ON (S32: YES), in S37 the control unit 130 provides the user with information about the ink cartridge 30, and subsequently ends the process of FIG. 13. While there are no particular limitations on the specific content of the notification, the control unit 130 may provide the user with information related to the degradation of ink in the ink chamber 36 or may recommend that the user replace the ink cartridge 30, for example.

On the other hand, if the abnormality flag is set to OFF (S32: NO), in S33 the control unit 130 executes a residual ink determining process described later with reference to FIG. 14. After completing the residual ink determining process, in S34 the control unit 130 determines whether an empty flag has been set to ON. The empty flag is set to ON when it has been determined that the amount of ink stored in the ink chamber 36 has decreased to a level that is insufficient for executing an image-recording process.

If the empty flag is set to ON (S34: YES), the control unit 130 ends the process of FIG. 13. However, if the empty flag is set to OFF (S34: NO), in S35 the control unit 130 determines whether an image-recording command has been received. If an image-recording command has not been received (S35: NO), the control unit 130 ends the process of FIG. 13. However, if an image-recording command has been received (S35: YES), in S36 the control unit 130 controls the recording head 21, the sheet feeding roller 23, the conveying rollers 25, the discharge rollers 27, and the like directly or indirectly to record images on recording sheets, and subsequently ends the process of FIG. 13. Note that the process of step S36 may be considered complete after an image-recording process has been performed for one recording sheet or after an image-recording process has been performed for all acquired image data.

As described above, the control unit 130 does not execute the image-recording process of S36 when the abnormality flag is set to ON (S32: YES). In other words, the control unit 130 skips step S36 when the viscosity of ink stored in the ink chamber 36 is determined to be abnormal so as not to eject ink from the recording head 21.

Next, the residual ink determining process will be described with reference to FIG. 14. In S41 of FIG. 14, the control unit 130 determines whether a near-empty flag is set to ON. The near-empty flag is set to ON when it has been determined that the amount of ink stored in the ink chamber 36 is getting low but is still sufficient for executing an image-recording process. In other words, the amount of ink stored in the ink chamber 36 when the near-empty flag is set to ON is greater than the amount of ink stored in the ink chamber 36 when the empty flag is set to ON.

If the near-empty flag is set to OFF (S41: NO), in S42 the control unit 130 determines whether the detection signal outputted from the sensor 103 has switched from a low level signal to a high level signal. If the control unit 130 determines that the detection signal has not switched from a low level signal to a high level signal (S42: NO), the control unit 130 ends the residual ink determining process and returns to S34 of FIG. 13. However, if the detection signal outputted from the sensor 103 has switched from a low level signal to a high level signal (S42: YES), in S43 the control unit 130 sets the near-empty flag to ON. In S44 the control unit 130 notifies the user that the ink cartridge 30 is in a near-empty condition and subsequently ends the process of FIG. 14. Next, the control unit 130 returns to S34 of FIG. 13. The near-empty condition described above is a condition in which the amount of ink stored in the ink chamber 36 is getting low but is still sufficient for executing an image-recording process.

If the control unit 130 determines in S41 that the near-empty flag is set to ON (S41: YES), in S45 the control unit 130 determines whether a count value counted through a software program after the near-empty flag was set to ON has exceeded a prescribed value. The count value is calculated based on data at the timing at which the control unit 130 outputted ink ejection commands to the recording head 21. More specifically, the count value is obtained by calculating the product of the number of ink droplets ejected from the recording head 21 in response to a command from the control unit 130 and the amount of ink in each ink droplet specified by the control unit 130 and by accumulating these products for all commands. The count value may be reset at the time a new ink cartridge 30 is attached to the cartridge attachment section 110, for example. The prescribed value is a value used for comparison with the count value.

If the count value from the moment the near-empty flag was set to ON is less than the prescribed value (S45: NO), i.e., if the amount of ink consumed by the recording head 21 after the near-empty flag was set to ON is less than a prescribed amount, the control unit 130 executes the process in S44 described above.

However, if the count value counted after the near-empty flag was set to ON is greater than or equal to the prescribed value (S45: YES), i.e., if the amount of ink consumed by the recording head 21 after the near-empty flag was set to ON is greater than or equal to the prescribed amount, in S46 the control unit 130 sets the empty flag to ON. In S47 the control unit 130 notifies the user that the ink cartridge 30 is in an empty condition, and subsequently ends the process of FIG. 14. Thereafter, the control unit 130 executes the process in S34 of FIG. 13. The empty condition described above is a condition in which the amount of ink stored in the ink chamber 36 has dropped to a level insufficient for executing an image-recording process.

Operational Advantages of First Embodiment

According to the above-described first embodiment, ink stored in the ink chamber 36 flows into the valve chamber 61 through the opening 63 by traveling in the connecting channel 98 and flows out of the ink cartridge 30 through the opening 62. Since the connecting channel 98 opens into the ink chamber 36 at a position further downward than the opening 63 when the ink cartridge 30 is in the attached posture, air in the ink chamber 36 does not instantly enter the valve chamber 61 even when the surface level of ink in the ink chamber 36 is below the position of the opening 63. Thus, this arrangement allows for a lower surface level of ink in the ink chamber 36 before air in the ink chamber 36 is introduced into the valve chamber 61. Put another way, this arrangement can reduce the amount of ink remaining in a spent ink cartridge 30.

More specifically, the prescribed value compared to the count value counted through a software program in S45 described above is preset so that the count value reaches the prescribed value when the surface level of ink stored in the ink chamber 36 reaches a position offset in the upward direction 54 relative to the bottom end of the second part 92 of the arm locker 90 (a position just above the opening in the second part 92 through which the connecting channel 98 communicates with the ink chamber 36). Accordingly, air in the ink chamber 36 has not yet entered the connecting channel 98 when the empty condition is notified in S47. That is, the user can be prompted to replace the ink cartridge 30 before air in the ink chamber 36 enters the connecting channel 98. Hence, this configuration avoids degradation in image-recording quality caused by air becoming mixed in ink in the channels leading from the ink cartridge 30 to the nozzles 29.

Note that the attached posture of the ink cartridge 30 implies a posture of the ink cartridge 30 when the ink cartridge 30 is completely attached to the cartridge attachment section 110 or a posture of the ink cartridge 30 when movement of the shutter 75 is inspected in a process of manufacturing the ink cartridge 30, for example.

As described above in the first embodiment, the valve 80 constituting part of the movable member may open or close the opening 62 formed in the valve chamber 61. Here, the coil spring 97 is provided in the ink chamber 36 for urging the valve 80 and the like toward the first position. Since it is not necessary to provide the coil spring 97 in the valve chamber 61, the volume of the valve chamber 61 can be reduced.

Further, as described above in the first embodiment, the arm locker 90 constituting part of the movable member may restrain or release the sensor arm 70. Note that the coil spring 97 may be omitted. In this case, the valve 80 and the arm locker 90 can only move in one direction from the first position toward the second position when the ink needle 102 is inserted into the valve chamber 61.

Further, as described above in the first embodiment, the sensor arm 70 may be provided with the float 76 that is formed of a material having a specific gravity smaller than the ink stored in the ink chamber 36. Hence, the sensor arm 70 can be moved between the detection position and the non-detection position using the buoyant force applied by the ink to the float 76 when the arm locker 90 releases the sensor arm 70.

Further, as described above in the first embodiment, the size of the connecting channel 98 formed inside the arm locker 90 can be reduced by configuring the connecting channel 98 in the space between the valve 80 and the second sealing member 85 and the internal space in the arm locker 90. Further, the sealing part 89 is provided on the rear end of the second sealing member 85 to be fitted with the arm locker 90 in order to close the valve chamber 61 at a position near the opening 63. Accordingly, this arrangement can reduce the amount of ink that enters between the outer surface of the arm locker 90 and the inner surface of the ink supply portion 60.

In the embodiment described above, the top surface of the first part 91 of the arm locker 90 slopes downward to facilitate ink in flowing downward from the top surface of the first part 91. This configuration further reduces the amount of ink remaining in the ink cartridge 30. While there are no particular limitations on the specific structure of the liquid guide, grooves extending in the rightward direction 55 and the leftward direction 56 may be formed in the top surface of the arm locker 90, for example.

Modifications of First Embodiment

While the description has been made in detail with reference to the first embodiment thereof, it would be apparent to those skilled in the art that various changes and modifications may be made therein without departing from the spirit of the disclosure.

Figure 15A:
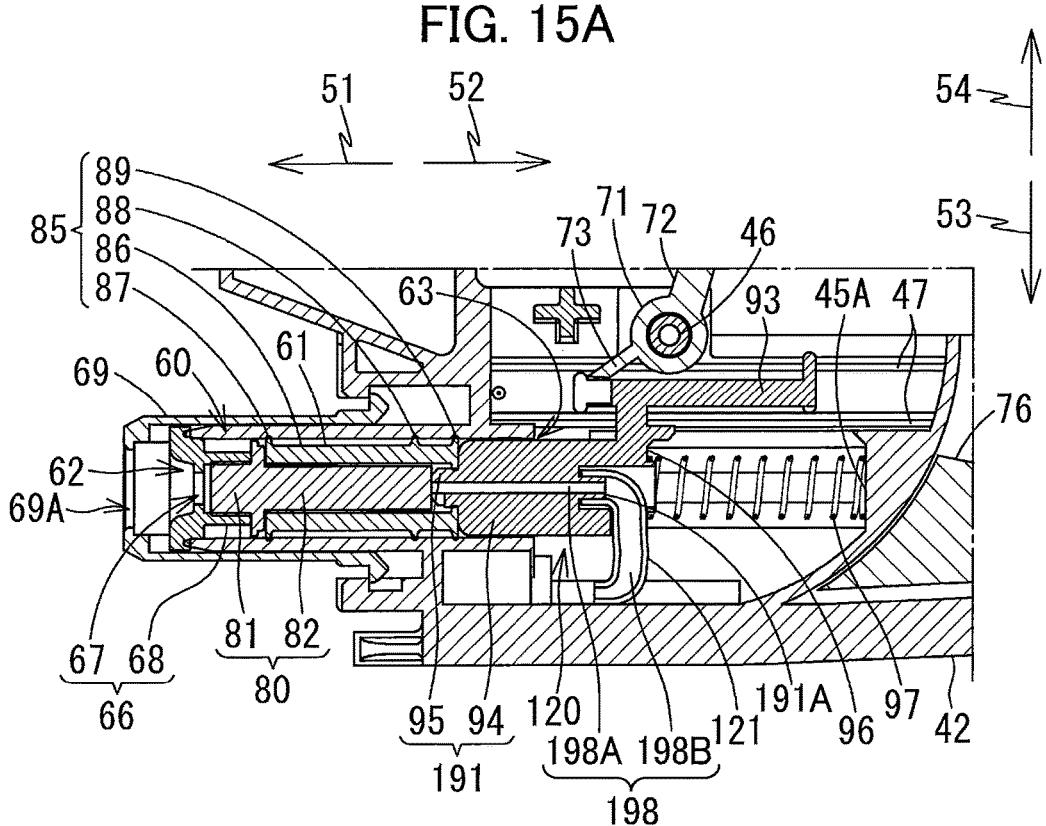
FIG. 15A is a partial cross-sectional view illustrating an internal configuration of an ink cartridge 30 according to one modification of the first embodiment, in which an arm locker 120 and components around thereof are particularly illustrated.
Figure 15B:
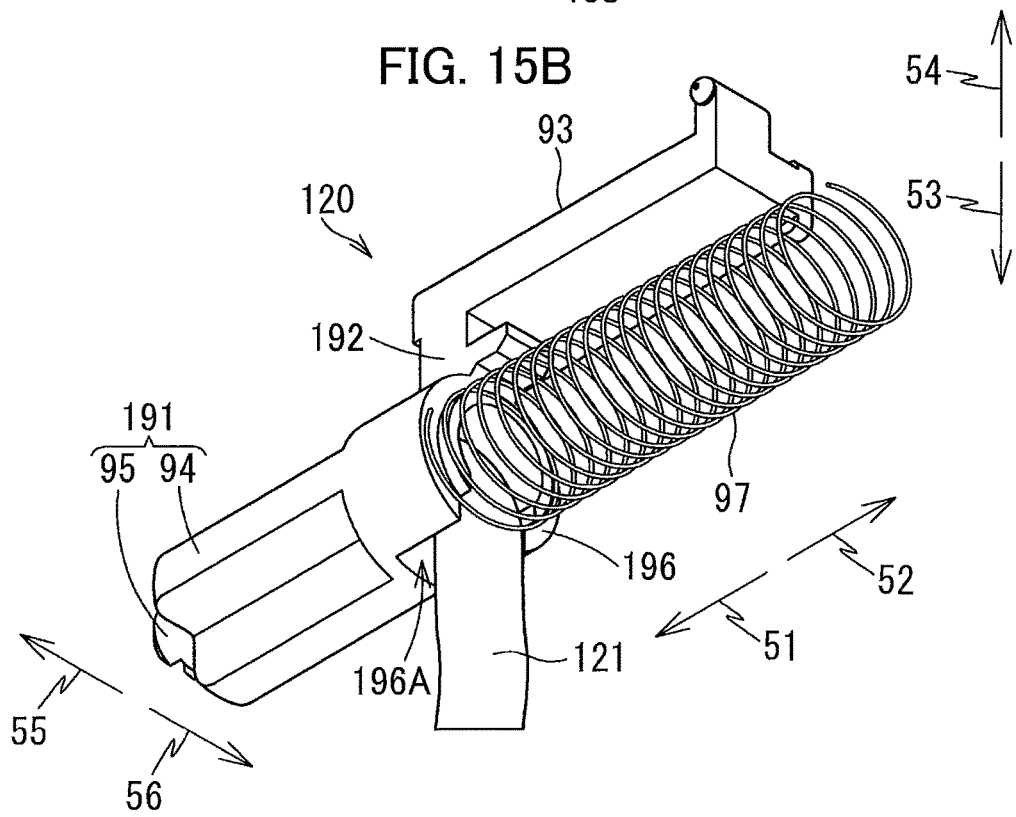
FIG. 15B is a perspective view of the arm locker 120 as viewed from a rear side thereof.

With reference to FIGS. 15A and 15B, one modification of the above-described first embodiment will be described, wherein like parts and components are designated with the same reference numerals to avoid duplicating description. In the following description, only parts differing from those of the above-described first embodiment will be described in detail.

In the first embodiment, a portion of the first channel 98A extending in the insertion direction 51 and the removal direction 52 and the entirety of the second channel 98B extending in the downward direction 53 and the upward direction 54 are formed inside the arm locker 90. However, the configuration of the connecting channel 98 is not limited to this example. Here, an arm locker 120 according to the one modification of the first embodiment will be described.

As illustrated in FIGS. 15A and 15B, the arm locker 120 includes a first part 191, a second part 192, the third part 93, and a tube 121. The first part 191 has a similar configuration to the first part 91 in the first embodiment, but a connecting part 191A is formed on the rear end of the first part 191. The connecting part 191A protrudes in the removal direction 52 and surrounds a rear end portion of a first channel 198A. The first channel 198A has a similar configuration to the first channel 98A in the first embodiment. The second part 192 also has a similar configuration to the second part 92 in the first embodiment, but a spring seat 196 on which the coil spring 97 is seated is formed with a cutout 196A. The tube 121 is configured of a flexible tubular member. An internal space of the tube 121 constitutes a second channel 198B.

More specifically, one end of the tube 121 (an example of a first opening) is connected to the connecting part 191A, while the other end of the tube 121 (an example of a second opening) allows communication between the second channel 198B and the ink chamber 36. As illustrated in FIG. 15B, the tube 121 extends in the downward direction 53 and the upward direction 54, passing through the cutout 196A formed in a portion of the spring seat 196. Further, the other end of the tube 121 that communicates with the ink chamber 36 is disposed at a position offset in the downward direction 53 relative to the opening 63 and offset in the insertion direction 51 relative to the end of the tube 121 connected to the connecting part 191A. The first channel 198A and the second channel 198B constitute a connecting channel 198 in this modification.

The above-described modification of the first embodiment can simplify the configuration of the connecting channel 198 by not requiring the connecting channel 198 to be formed in a curved shape inside the arm locker 120, unlike the arm locker 90 according to the first embodiment. Here, the expression of "extending in the downward direction 53 and the upward direction 54" does not necessarily mean a vertically linear extension. For example, the tube 121 may be configured to extend vertically while bending, as illustrated in FIG. 15A, or may be configured to have a degree of slope relative to the vertical direction.

Further, following modifications are also conceivable.

In the first embodiment described above, the sensor arm 70 moves between the non-detection position and the detection position by pivotally moving, but the sensor arm 70 may move between the non-detection position and the detection position by a type of motion other than pivotal motion. For example, the sensor arm 70 may move linearly in the downward direction 53 and the upward direction 54 between the non-detection position and the detection position.

The sensor arm 70 according to the first embodiment described above is moved from the non-detection position to the detection position by a force of buoyancy acting on the float 76. However, the sensor arm 70 may be provided with a weight in place of the float 76 and may be moved from the non-detection position to the detection position by a force of gravity acting on the weight.

In the first embodiment described above, the shutter 75 is positioned inside the ink chamber 36 irrespective of the position of the sensor arm 70. However, the shutter 75 may have an alternative configuration, provided that the shutter 75 can interrupt light traveling from the light emitting part 104 to the light receiving part 105 in the sensor 103 when the sensor arm 70 is in the detection position. For example, the shutter 75 may be disposed outside the ink chamber 36 when the sensor arm 70 is in the non-detection position and may be advanced into the ink chamber 36 as the sensor arm 70 moves from the non-detection position to the detection position. Further, the shutter 75 may be disposed outside the ink chamber 36 irrespective of the position of the sensor arm 70.

In the first embodiment described above, the control unit 130 starts measuring the moving time of the sensor arm 70 when the ink cartridge 30 is completely attached to the cartridge attachment section 110 (that is, when the attachment sensor 107 outputs a high level signal). In this way, the control unit 130 can execute a process for estimating the viscosity of ink stored in the ink chamber 36 using the existing attachment sensor 107 without greatly altering the configuration of the ink supply device 100. However, the method of estimating the viscosity of ink is not limited to the method described in the first embodiment and may be performed at any timing that can be recognized by the control unit 130.

In the first embodiment described above, the operations of the recording head 21 are restricted, i.e., the control unit 130 skips the process in S36, when the moving time of the sensor arm 70 falls outside the threshold range (S18: NO). In this way, the control unit 130 can prevent occurrence of problems caused by the recording head 21 ejecting ink whose viscosity has changed greatly. However, it is not essential to skip step S36. In other words, the control unit 130 may execute only the process for notifying the user of an abnormality with the ink viscosity (S37) and may leave it up to the user's discretion to decide whether or not to allow operations of the recording head 21. While the flow of control by the control unit 130 would differ from that illustrated in FIGS. 12 through 14 in this case, a detailed description of this flow will not be provided here.

Further, when the control unit 130 determines that the abnormality flag has been set to ON (S32: YES), the control unit 130 may control the head control board 21A to adjust the magnitude of drive voltages applied to the piezoelectric elements 29A of the nozzles 29 in the image-recording process of S36 rather than skipping the processes in S35 and S36.

More specifically, the control unit 130 may control the head control board 21A to adjust the magnitude of drive voltages to be applied to the piezoelectric elements 29A in order that the amount of ink ejected from the nozzles 29 is approximately the same whether the moving time of the sensor arm 70 falls within the threshold range or outside the threshold range. Specifically, when the moving time of the sensor arm 70 drops below the lower limit of the threshold range (i.e., when the viscosity of ink is too low), the control unit 130 may apply smaller drive voltages to the piezoelectric elements 29A than when the moving time of the sensor arm 70 falls within the threshold range. Conversely, when the moving time of the sensor arm 70 exceeds the upper limit of the threshold range (i.e., when the viscosity of ink is too high), the control unit 130 may apply larger drive voltages to the piezoelectric elements 29A than when the moving time of the sensor arm 70 falls within the threshold range.

This configuration enables the control unit 130 to drive the piezoelectric elements 29A using drive voltages suited to the type of ink when a plurality of types of ink cartridges 30 storing ink of differing viscosities may be attached to the cartridge attachment section 110, for example. Note that the piezoelectric elements 29A are used as examples of the actuators, but piezoelectric elements are not necessarily used as actuators. For example, thermal actuators may be used to generate air bubbles in the ink with heat in order to eject ink from the nozzles 29.

The viscosity of ink also varies according to ambient temperature. That is, viscosity tends to decrease when the temperature rises and to increase when the temperature drops. The control unit 130 may control the head control board 21A to adjust the magnitude of drive voltages applied to the piezoelectric elements 29A based on temperature. Specifically, the control unit 130 outputs a control signal to the head control board 21A to apply lower drive voltages to the piezoelectric elements 29A when the temperature is high, and outputs a control signal to the head control board 21A to apply higher drive voltages to the piezoelectric elements 29A when the temperature is low.

Further, there are suitable threshold values for the viscosity of ink associated with drive voltages applied to the piezoelectric elements 29A. Therefore, it is preferable to set a threshold range for the viscosity of ink based on ambient temperature. Accordingly, a suitable threshold range for the viscosity of ink is set based on ambient temperature in the first embodiment described above. While there are no particular limitations on the method of setting the threshold range, a threshold range corresponding to ambient temperature may be selected from a plurality of threshold ranges pre-stored in the ROM 132 or the like, or the control unit 130 may calculate the upper limit or lower limit of the threshold range using a function that has temperature as an input parameter. Further, if the drive voltages applied to the piezoelectric elements 29A are not adjusted based on temperature, step S17 for setting the threshold range based on the signal outputted from the temperature sensor 106 may be omitted and a fixed threshold range may be used.

The control unit 130 according to the first embodiment measures the moving time of the sensor arm 70 as follows. The control unit 130 starts counting elapsed time in response to a high level signal being outputted from the attachment sensor 107, and halts the count in response to a low level signal being outputted from the sensor 103. The control unit 130 then sets the moving time of the sensor arm 70 to the elapsed time between the start and the end of the counting period. However, the control unit 130 may instead acquire the time at which the attachment sensor 107 outputs a high level signal in S12, acquire the time at which the sensor 103 outputs a low level signal in S15, and set the moving time of the sensor arm 70 to the difference between the two times.

The control unit 130 according to the first embodiment described above stores the abnormality flags in the EEPROM 134, but the control unit 130 may store these flags in memory on a chip provided in the ink cartridge 30. Further, while the control unit 130 is provided with the CPU 131 and the ASIC 135 in the first embodiment described above, the control unit 130 is not limited to this structure. For example, the ASIC 135 may be eliminated from the control unit 130, and the CPU 131 may execute all of the processes described in FIGS. 12, 13, and 14 by reading programs from the ROM 132. Conversely, the CPU 131 may be eliminated from the control unit 130, and the control unit 130 may be configured only of hardware, such as the ASIC 135 and a field-programmable gate array (FPGA). Alternatively, the control unit 130 may be provided with a plurality of CPUs 131 or a plurality of ASICs 135, for example.

Further, while ink serves as an example of a liquid in the first embodiment. However, for example, in place of ink, a pretreatment liquid that is ejected onto the recording paper prior to the ink during a printing operation may be used as a liquid.

Second Embodiment

Next, an ink cartridge 230 as a liquid cartridge according to a second embodiment will be described with reference to FIGS. 16 through 23B, wherein like parts and components are designated by the same reference numerals to avoid duplicating description. In the following description, only parts differing from those of the above-described first embodiment will be described in detail.

Similar to the first embodiment, the ink cartridge 230 according to the second embodiment can be detachably attached to the cartridge attachment section 110 of the ink supply device 100 in the printer 10.

Similar to the first embodiment, in the second embodiment, the insertion direction 51 (an example of a first direction) is a direction that the ink cartridge 230 is inserted into the cartridge attachment section 110, and the removal direction 52 (an example of a second direction) is a direction in which the ink cartridge 230 is removed from the cartridge attachment section 110. The downward direction 53 is a direction of a gravitational force acting on the ink cartridge 230 and the upward direction 54 is a direction opposite the gravitational direction when the ink cartridge 230 is in an operational posture (an example of an attached posture). The rightward direction 55 (an example of a third direction) and the leftward direction 56 (an example of a fourth direction) are directions orthogonal to the insertion direction 51 and the downward direction 53 when the ink cartridge 230 is viewed in the removal direction 52. Unless otherwise stated, the following description will assume that the ink cartridge 230 is in its operational posture.

Further, similar to the first embodiment, in the second embodiment, the phrase "the ink cartridge 230 attached to the cartridge attachment section 110" means that at least part of the ink cartridge 230 is positioned inside the cartridge attachment section 110 (and more accurately, inside the case 101). Consequently, the ink cartridge 230 that is in the process of being inserted into the cartridge attachment section 110 is also considered attached to the cartridge attachment section 110.

Further, when a state of the ink cartridge 230 is described as "completely attached to the cartridge attachment section 110", the ink cartridge 230 is at least capable of supplying ink to the recording head 21. This state may denote a state in which the ink cartridge 230 is locked in the cartridge attachment section 110 and immovable relative to the cartridge attachment section 110, a state in which the ink cartridge 230 is positioned in the cartridge attachment section 110 with the cover closed over the opening 112, or any such state in which the ink cartridge 230 is capable of being operated by the printer 10 to record images. Thus, the ink cartridge 230 that is completely attached to the cartridge attachment section 110 is in its operational posture.

Figure 16:
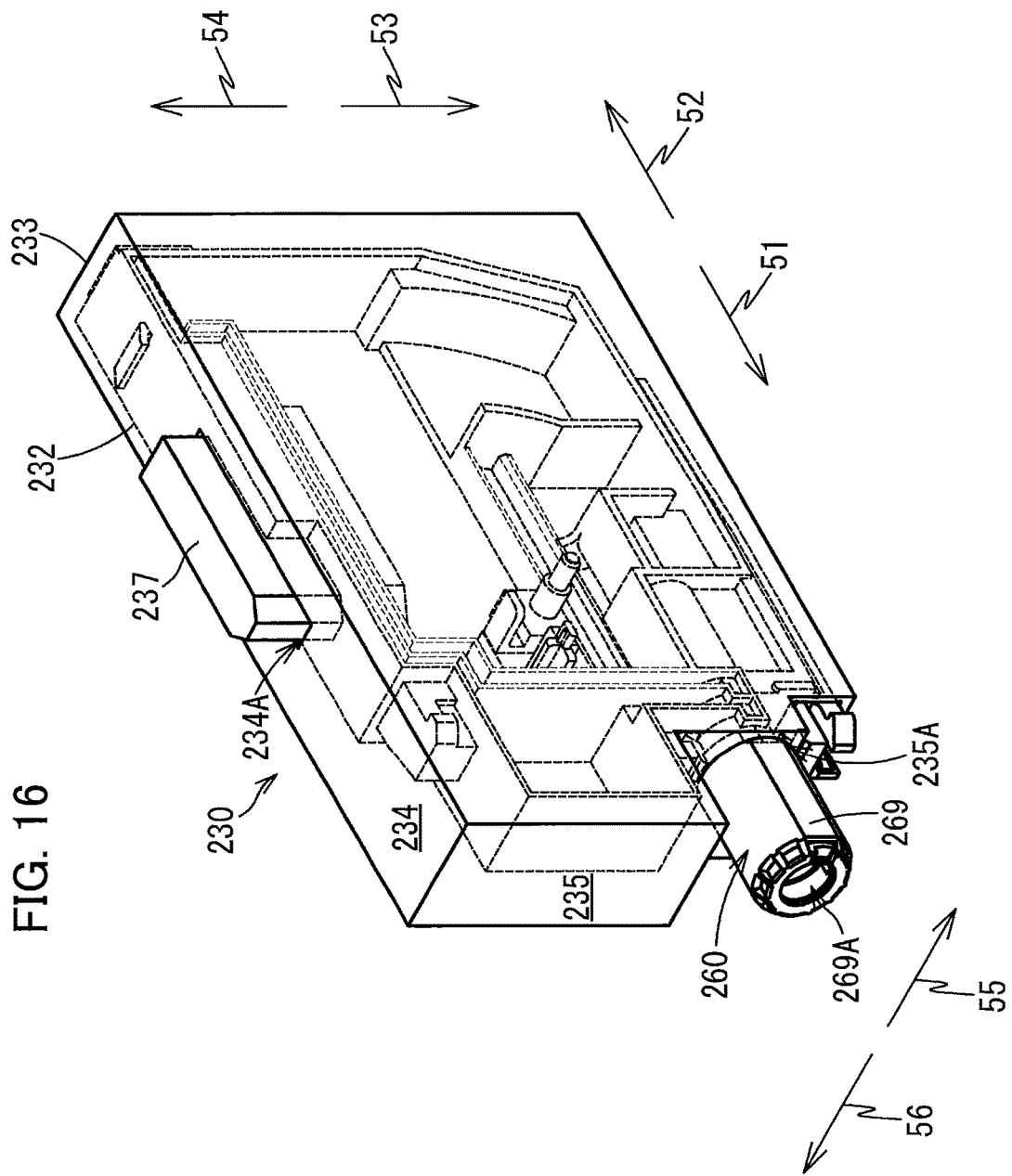
FIG. 16 is a perspective view illustrating an external configuration of an ink cartridge 230 according to a second embodiment.

As illustrated in FIG. 16, the ink cartridge 230 includes an ink container 232 (an example of a liquid container), and a cartridge cover 233. The cartridge cover 233 covers most part of the ink container 232, with only a part of the ink container 232 (a part of a protruding part 237 described later and a part of an ink supply portion 260 described later) exposed outside the cartridge cover 233. More specifically, the cartridge cover 233 includes a top wall 234 having an opening 234A through which the protruding part 237 protrudes out of the cartridge cover 233, and a front wall 235 having an opening 35A through which the ink supply portion 260 protrudes out of the cartridge cover 233.

When inserting the ink cartridge 230 into the cartridge attachment section 110 in the insertion direction 51 or removing the ink cartridge 230 from the cartridge attachment section 110 in the removal direction 52, the ink cartridge 230 is in the operational posture illustrated in FIG. 3, i.e., with a surface of the ink cartridge 230 facing downward in FIG. 16 as a bottom surface and a surface of the ink cartridge 230 facing upward in FIG. 16 as a top surface.

Figure 17:
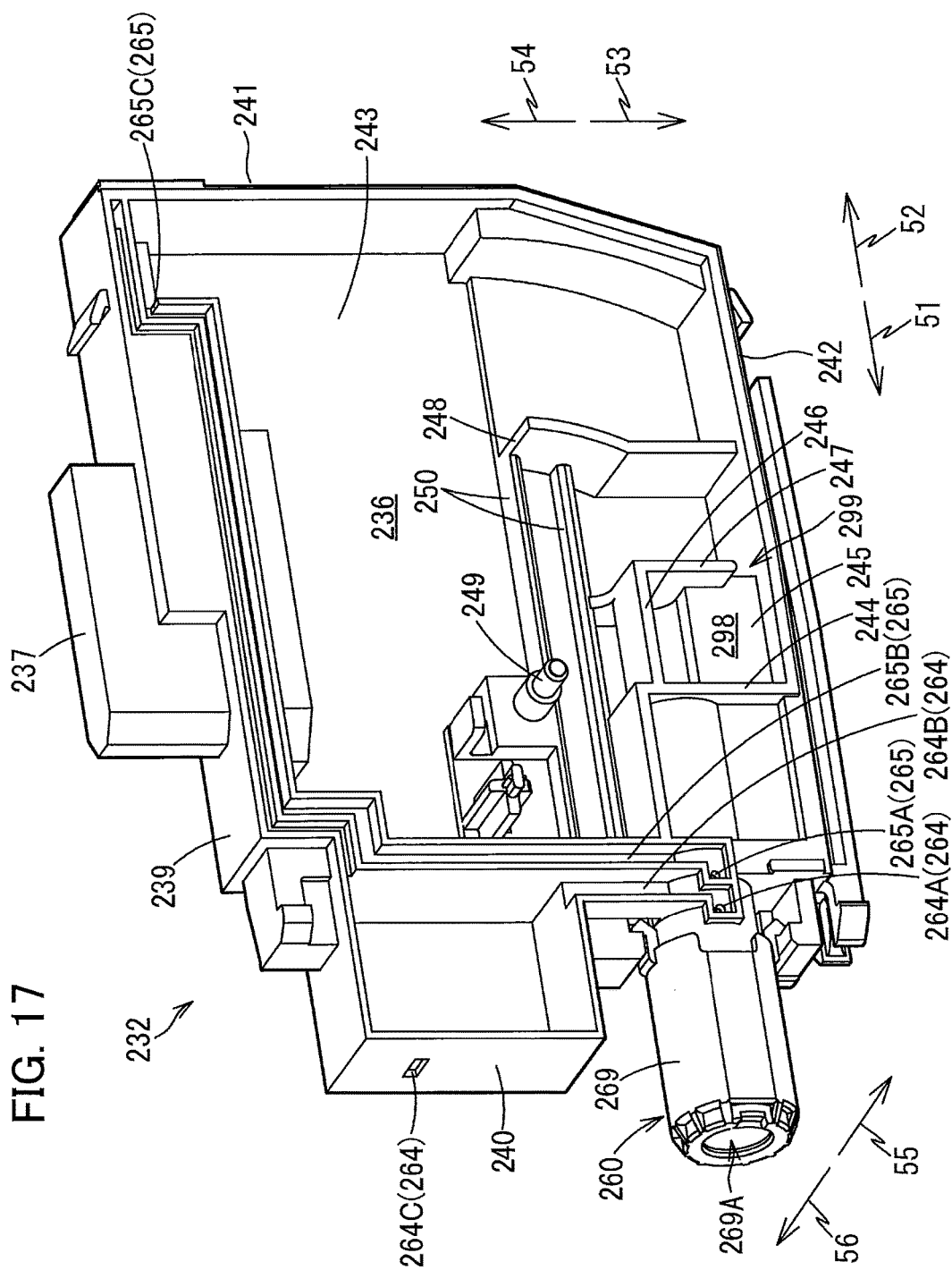
FIG. 17 is a perspective view of an ink container 232 of the ink cartridge 230 as viewed from a front side thereof.
Figure 18:
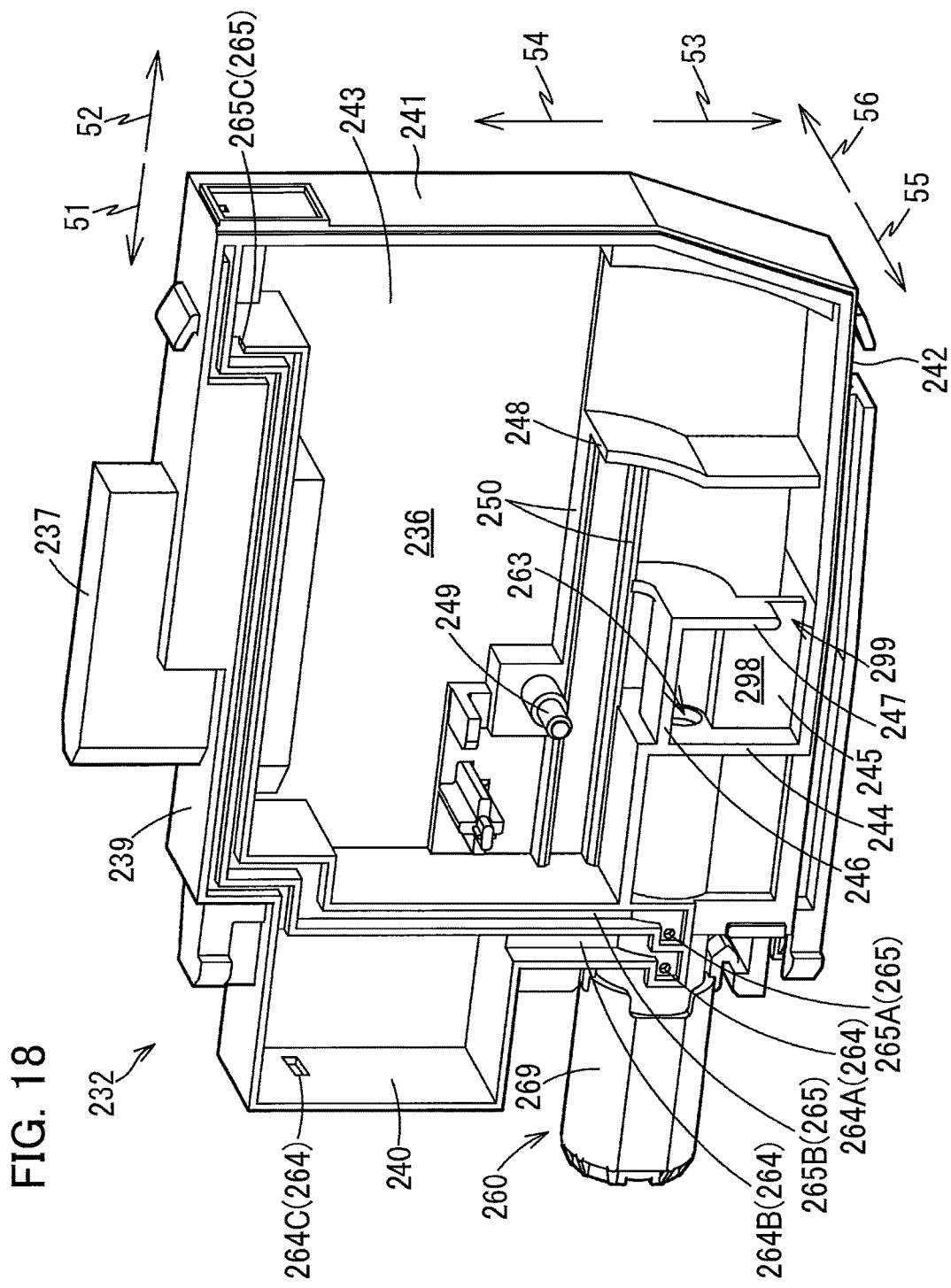
FIG. 18 is a perspective view of the ink container 232 as viewed from a rear side thereof.
Figure 19:
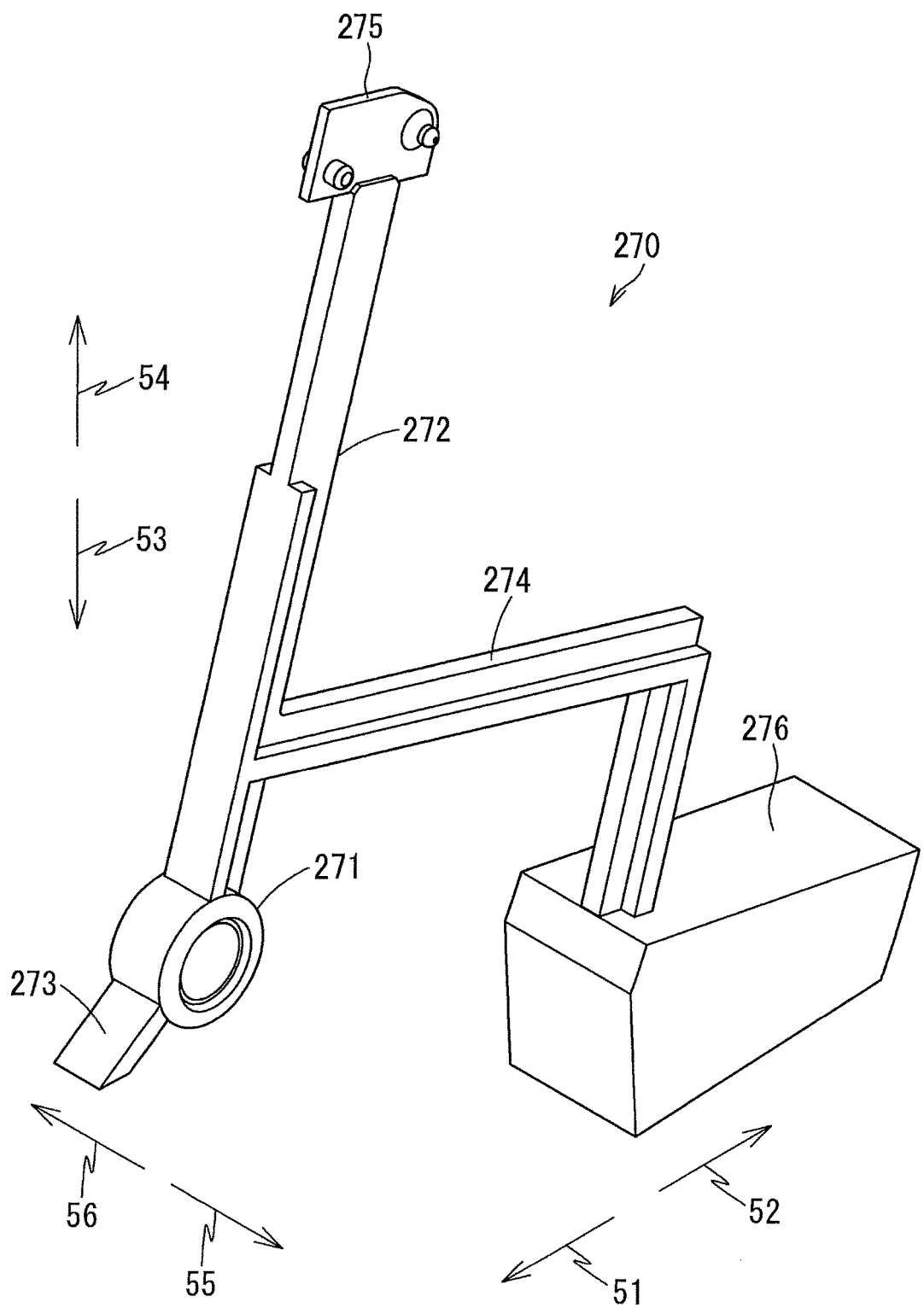
FIG. 19 is a perspective view of a sensor arm 270 provided in the ink container 232.

As illustrated in FIGS. 17 and 18, the ink container 232 has an external shape that is similar to a flattened rectangular parallelepiped so that a dimension of the ink container 232 in the rightward direction 55 and the leftward direction 56 is smaller than a dimension of the ink container 232 in the downward direction 53 and the upward direction 54 and a dimension of the ink container 232 in the insertion direction 51 and the removal direction 52. The ink container 232 includes an ink chamber 236, the protruding part 237, and the ink supply portion 260. The ink container 232 is primarily formed of resin. The protruding part 237 in particular is formed of a material that transmits light outputted from the light emitting part 104.

The ink container 232 includes a front wall 240 and a rear wall 241 that at least partially overlap each other when viewed in the insertion direction 51 or the removal direction 52, a top wall 239 and a bottom wall 242 that at least partially overlap each other when viewed in the downward direction 53 or the upward direction 54, and a left wall 243 facing in the leftward direction 56, i.e., disposed on a left side of the ink container 232 when viewing the ink container 232 from a front side thereof (when facing the front wall 240). A side of the ink container 232 that faces in the rightward direction 55, i.e., a right side of the ink container 232, is open. A film (not illustrated) seals this open right side of the ink container 232. When the side of the ink container 232 facing in the rightward direction 55 is viewed in a plan view, an outer shape of the film sealing the right side of the ink container 232 substantially conforms to the external shape of the ink container 232. This film is thermally melt-bonded to right edges of the top wall 239, the front wall 240, the rear wall 241, and the bottom wall 242 to configure a right wall of the ink chamber 236.

<Ink Chamber 236>

The ink chamber 236 (an example of a liquid storage chamber) is a space formed in the ink container 232 for storing ink. As illustrated in FIGS. 17 and 18, the ink chamber 236 is defined by the top wall 239, the front wall 240, the rear wall 241, the bottom wall 242, the left wall 243, and the film. The ink chamber 236 is maintained at negative pressure prior to the ink cartridge 230 being attached to the cartridge attachment section 110. When the ink cartridge 230 is attached to the cartridge attachment section 110, the ink chamber 236 can communicate with ambient air (atmosphere) through a first air passage 264 and a second air passage 265 described later. A first inner wall 244, a second inner wall 245, a third inner wall 246, a fourth inner wall 247, and a fifth inner wall 248 are formed inside the ink chamber 236.

The first inner wall 244 extends in the downward direction 53, the upward direction 54, the rightward direction 55, and the leftward direction 56 at a position contacting a proximal end of the ink supply portion 260. The first inner wall 244 is connected to the bottom wall 242, the left wall 243, the film, and the third inner wall 246. The first inner wall 244 is offset in the downward direction 53 relative to a pivot shaft 249 and a pair of guide rails 250 described later. An opening 263 is formed in the first inner wall 244 to allow a valve chamber 261 (described later) to communicate with the ink chamber 236 (and specifically a connecting channel 298 described later). A surface of the first inner wall 244 facing in the insertion direction 51 also functions as a spring seat for supporting a rear end of a coil spring 297 (described later).

The second inner wall 245 extends in the insertion direction 51, the removal direction 52, the downward direction 53, and the upward direction 54 at a position contacting a surface of the first inner wall 244 facing in the removal direction 52. The second inner wall 245 is connected to the bottom wall 242, the first inner wall 244, the third inner wall 246, and the fourth inner wall 247. The second inner wall 245 is separated from the left wall 243 in the rightward direction 55. Hence, the second inner wall 245 partially partitions the ink chamber 236 in the rightward direction 55 and the leftward direction 56. Further, the second inner wall 245 extends almost linearly in the upward direction 54 from the bottom wall 242 to a bottom edge of the opening 263 and curves along a left edge of the opening 263 while further extending in the upward direction 54. In other words, the opening 263 is formed in an area of the ink chamber 236 in the leftward direction 56 from the second inner wall 245 that partitions the area of the ink chamber 236 in the rightward direction 55 and the leftward direction 56. That is, the opening 263 is formed in the connecting channel 298 described later.

The third inner wall 246 extends in the insertion direction 51, the removal direction 52, the rightward direction 55, and the leftward direction 56 at a position offset in the upward direction 54 relative to the opening 263. The third inner wall 246 is connected to the first inner wall 244, the second inner wall 245, the fourth inner wall 247, and the film.

The fourth inner wall 247 extends in the downward direction 53, the upward direction 54, the rightward direction 55, and the leftward direction 56 at a position separated from the first inner wall 244 in the removal direction 52. The fourth inner wall 247 is connected to the film, a rear edge of the second inner wall 245, and a rear edge of the third inner wall 246. An opening 299 is defined by the bottom wall 242, the second inner wall 245, the fourth inner wall 247, and the film. The opening 299 is formed at a position offset in the downward direction 53 relative to the opening 263.

<Connecting Channel 298>

The bottom wall 242, the first inner wall 244, the second inner wall 245, the third inner wall 246, the fourth inner wall 247, and the film are formed so as to surround the opening 263. A space surrounded by the bottom wall 242, the first inner wall 244, the second inner wall 245, the third inner wall 246, the fourth inner wall 247, and the film constitutes the connecting channel 298 that connects the ink chamber 236 and the valve chamber 261. That is, a bottom end of the connecting channel 298 is defined by the bottom wall 242, a front end of the connecting channel 298 is defined by the first inner wall 244, a left end of the connecting channel 298 is defined by the second inner wall 245, a top end of the connecting channel 298 is defined by the third inner wall 246, a rear end of the connecting channel 298 is defined by the fourth inner wall 247, and a right end of the connecting channel 298 is defined by the film.

The connecting channel 298 is in communication with the ink chamber 236 only through the opening 299 and is in communication with the valve chamber 261 only through the opening 263. Hence, ink stored in the ink chamber 236 flows into the connecting channel 298 only through the opening 299 and flows into the valve chamber 261 only through the opening 263. Further, when the ink cartridge 230 is in the attached posture, the connecting channel 298 is in communication with the ink chamber 236 in an area downward further than the opening 263. A dimension of the connecting channel 298 in the rightward direction 55 and the leftward direction 56 (hereinafter referred to as a "width") is set shorter than a width of the ink chamber 236.

The fifth inner wall 248 is disposed at a position separated from the fourth inner wall 247 in the removal direction 52 and separated from the rear wall 241 in the insertion direction 51. The fifth inner wall 248 protrudes in the rightward direction 55 from the left wall 243 and curves while extending approximately in the downward direction 53 and the upward direction 54. A gap is formed between the fifth inner wall 248 and the film. A rear surface of the fifth inner wall 248 facing in the removal direction 52 has an arc shape that is approximately centered on the pivot shaft 249. The rear surface of the fifth inner wall 248 guides a float 276 (described later) that is pivotally movable about the pivot shaft 249.

The pivot shaft 249 and the pair of guide rails 250 (an example of a support part) are provided at the left wall 243. The pivot shaft 249 is disposed on the left wall 243 at a position offset in the removal direction 52 and the upward direction 54 relative to the opening 263 and also at a position offset in the insertion direction 51 relative to the fourth inner wall 247 and the fifth inner wall 248. The pivot shaft 249 protrudes in the rightward direction 55 from the left wall 243. The pivot shaft 249 pivotally movably supports a sensor arm 270 (see FIG. 19). The pair of guide rails 250 is disposed on the left wall 243 at a position offset in the downward direction 53 relative to the pivot shaft 249 and at a position offset in the upward direction 54 relative to the opening 263 and the third inner wall 246. The pair of guide rails 250 is separated from each other in the downward direction 53 and the upward direction 54. The pair of guide rails 250 is each elongated in the insertion direction 51 and the removal direction 52. The pair of guide rails 250 guides a restricting part 294 of an arm locker 290 described later (see FIG. 20A) to move in the insertion direction 51 and the removal direction 52.

<Protruding Part 237>

As illustrated in FIGS. 16 through 18, the protruding part 237 protrudes in the upward direction 54 from the top wall 239. The protruding part 237 has a box shape with a hollow interior forming space therein. This interior space is in communication with the ink chamber 236. When the ink cartridge 230 is in its attached posture, ink in the ink chamber 236 is at a level below (i.e., in the downward direction 53 from) the protruding part 237. When the ink container 232 is accommodated in the cartridge cover 233, the protruding part 237 protrudes out from the cartridge cover 233 through the opening 234A formed in the top wall 234 of the cartridge cover 233. In other words, at least part of the protruding part 237 is exposed to an outside of the ink cartridge 230. The protruding part 237 allows transmission of light outputted from the light emitting part 104.

<Ink Supply Portion 260>

As illustrated in FIGS. 16 through 18, the ink supply portion 260 (an example of a liquid supply portion) has an external shape that is generally cylindrical. The ink supply portion 260 is disposed adjacent to a bottom edge of the front wall 240 of the ink container 232. The ink supply portion 260 is positioned offset in the rightward direction 55 relative to the center of the ink cartridge 230. The ink supply portion 260 extends from the interior of the ink chamber 236 to the exterior of the ink chamber 236. When the ink container 232 is accommodated in the cartridge cover 233, the ink supply portion 260 protrudes out from the cartridge cover 233 through the opening 235A formed in the front wall 235 of the cartridge cover 233. In other words, at least part of the ink supply portion 260 is exposed to the outside of the ink cartridge 230. A first sealing member 266 and a cap 269 are attached to the portion of the ink supply portion 260 exposed to the outside of the ink cartridge 230.

Figure 21A:
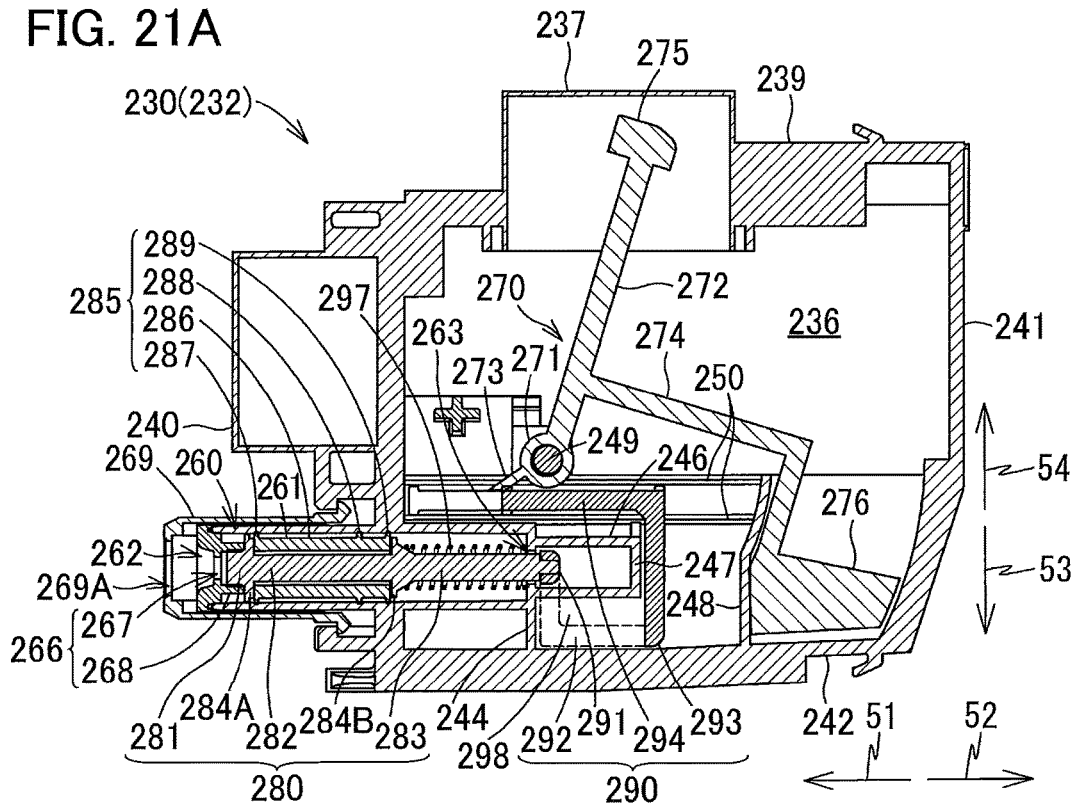

The ink stored in the ink chamber 236 can flow out of the ink cartridge 230 through the ink supply portion 260. As illustrated in FIG. 21A, the valve chamber 261 (an example of a liquid supply chamber) is formed inside the ink supply portion 260. The valve chamber 261 is in communication with the exterior of the ink cartridge 230 through an opening 262 (an example of a first opening) formed in an end of the ink supply portion 260 facing in the insertion direction 51 (hereinafter referred to as a "distal end"). The valve chamber 261 is also in communication with the ink chamber 236 through the opening 263 (an example of a second opening) formed in an end of the ink supply portion 260 facing in the removal direction 52 (hereinafter referred to as a "proximal end").

As illustrated in FIGS. 17 and 18, the first air passage 264 and the second air passage 265 are in communication with the valve chamber 261. The first air passage 264 is a channel that allows air to flow between the valve chamber 261 and the exterior of the ink cartridge 230. That is, the first air passage 264 allows the valve chamber 261 to communicate with atmospheric air. The first air passage 264 is configured of a hole 264A that provides communication between an inner surface of the ink supply portion 260 and an outer surface of the ink supply portion 260, a groove 264B that communicates with the hole 264A on one end, and a hole 264C that provides communication between the other end of the groove 264B and the exterior of the ink cartridge 230.

The second air passage 265 is a channel that allows air to flow between the valve chamber 261 and the ink chamber 236. The second air passage 265 is configured of a hole 265A that provides communication between the inner surface of the ink supply portion 260 and the outer surface of the ink supply portion 260, a groove 265B that communicates with the hole 265A on one end, and a hole 265C that provides communication between the other end of the groove 265B and the ink chamber 236. The hole 265A is formed at a position offset in the removal direction 52 relative to the hole 64A. The hole 265C is formed at a position above a surface level of the ink stored in the ink chamber 236 when the ink cartridge 230 is at an unused state. In other words, the hole 265C is positioned above a surface of the ink in the ink chamber 236 when the ink chamber 236 stores its maximum volume of ink therein. The first air passage 264 and the second air passage 265 are hermetically (i.e. liquid-tightly) sealed by the film constituting the right wall of the ink cartridge 230.

<First Sealing Member 266 and Cap 269>

As illustrated in FIG. 20A, the first sealing member 266 has a disc shape with an outer diameter substantially equivalent to an outer diameter of the ink supply portion 260. The first sealing member 266 is attached to the distal end of the ink supply portion 260 at which the opening 262 is formed so as to provide a liquid-tight seal with the distal end of the ink supply portion 260. A through-hole 267 is formed in the first sealing member 266 and penetrates a center region of the first sealing member 266 in its thickness direction (i.e. in the insertion direction 51 and the removal direction 52). In other words, a portion of the opening 262 formed in the valve chamber 261 is closed by the first sealing member 266, while the remainder of the opening 262 is open through the through-hole 267. The first sealing member 266 also has a cylindrical part 268 that protrudes in the removal direction 52 and is arranged to surround the through-hole 267. The cylindrical part 268 has an external shape that is generally cylindrical. The cylindrical part 268 has an inner diameter that is slightly smaller than an outer diameter of a distal end part 281 of a valve 280 (described later). The first sealing member 266 is formed of an elastic material such as a rubber.

As illustrated in FIG. 17, the cap 269 is attached to the cartridge cover 233 so as to cover the outer surface of the ink supply portion 260 exposed to an outside of the cartridge cover 233. The first sealing member 266 is interposed between the cap 269 and the distal end of the ink supply portion 260 with respect to the insertion direction 51 and the removal direction 52. A through-hole 269A is formed in the cap 269. The through-hole 267 and the through-hole 269A allow the valve chamber 261 to communicate with the exterior of the ink cartridge 230. Incidentally, the outer diameter of the ink needle 102 is slightly larger than a diameter of the through-hole 267 and slightly smaller than a diameter of the through-hole 269A.

<Sensor Arm 270>

As illustrated in FIGS. 21A through 23B, the sensor arm 270 (an example of a detector) is accommodated inside the ink chamber 236. The sensor arm 270 is pivotally movably supported by the pivot shaft 249. The sensor arm 270 is pivotally movable about the pivot shaft 249 between a non-detection position (see FIGS. 21A and 23A) and a detection position (see FIG. 22A). In the following description, the pivotally-moving direction of the sensor arm 270 will be denoted as clockwise or counterclockwise based on directions viewed in FIGS. 21A through 23B (i.e., when viewing the ink cartridge 230 in the leftward direction 56). As illustrated in FIG. 6, the sensor arm 270 includes a bearing part 271, a first arm 272, a second arm 273, a third arm 274, a shutter 275 (an example of a detection part), and the float 276.

The bearing part 271 has an annular shape for receiving the pivot shaft 249. By inserting the pivot shaft 249 into the bearing part 271, the sensor arm 270 can pivotally move about the pivot shaft 249. The first arm 272 extends approximately in the upward direction 54 from an outer surface of the bearing part 271. The second arm 273 extends approximately in the insertion direction 51 and the downward direction 53 from the outer surface of the bearing part 271. The third arm 274 extends approximately in the removal direction 52 and the downward direction 53 from the first arm 272. The second arm 273 has a length shorter than those of the first arm 272 and the third arm 274.

The shutter 275 is provided at a distal end (i.e. an end farthest from the bearing part 271) of the first arm 272. However, the shutter 275 may be provided at a location other than the distal end of the first arm 272. The shutter 275 is inserted into the interior space formed in the protruding part 237. When the sensor arm 270 is in the non-detection position, the shutter 275 is disposed in a non-detected position that is positioned offset relative to the path of light traveling from the light emitting part 104 to the light receiving part 105. When the sensor arm 270 is in the detection position, the shutter 275 is disposed in a detected position that is positioned higher than the non-detected position and that overlaps the path of light. The shutter 275 has a general flat plate shape that extends in the insertion direction 51, the removal direction 52, the downward direction 53, and the upward direction 54. The shutter 275 has a surface area larger than a diameter of the light outputted from the light emitting part 104.

When the shutter 275 is in the detected position, the light outputted from the light emitting part 104 is blocked by the shutter 275. Hence, the light outputted from the light emitting part 104 does not reach the light receiving part 105. The shutter 275 may prevent the light outputted from the light emitting part 104 from reaching the light receiving part 105 by absorbing, reflecting, or deflecting the light, for example. The shutter 275 may be a member formed of a resin containing a pigment, a member whose surface is coated with a reflective film such as an aluminum film, or a member formed of a transparent or translucent material having a different index of refraction from that of air. Hence, the light outputted from the light emitting part 104 is received by the light receiving part 105 when the sensor arm 270 is in the non-detection position and interrupted by the shutter 275 when the sensor arm 270 is in the detection position.

The float 276 is provided at a distal end of the third arm 274. However, the float 276 may be provided at a location other than the distal end of the third arm 274. The float 276 is disposed in the ink chamber 236 at a position between the rear wall 241 and the fifth inner wall 248. The third arm 274 extends through a space between the rear wall 241 and the fifth inner wall 248 and passes over the fifth inner wall 248, in order to connect the float 276 and the first arm 272. The float 276 is formed of a material having a smaller specific gravity than the ink stored in the ink chamber 236.

As illustrated in FIGS. 21A through 23B, when the sensor arm 270 pivotally moves counterclockwise from the position shown in FIG. 21A, the shutter 275 moves approximately in the insertion direction 51, the float 276 moves approximately in the upward direction 54, and the second arm 273 moves approximately in the downward direction 53. When the sensor arm 270 pivotally moves clockwise from the position shown in FIG. 22A, the shutter 275 moves approximately in the removal direction 52, the float 276 moves approximately in the downward direction 53, and the second arm 273 moves approximately in the upward direction 54.

<Valve 280, Second Sealing Member 285, Arm Locker 290, and Coil Spring 297>

As illustrated in FIGS. 21A through 23B, the valve 280, a second sealing member 285 (an example of a sealing member), the arm locker 290 (an example of a restricting member), and the coil spring 297 (an example of an urging member) are accommodated inside the ink cartridge 230. More specifically, the second sealing member 285 and the coil spring 297 are accommodated in the valve chamber 261. The valve 280 extends in the valve chamber 261 and the connecting channel 298, passing through the opening 263. The arm locker 290 is accommodated in the connecting channel 298 and the ink chamber 236, passing through the opening 299. The valve 280 and the arm locker 290 constitute an example of a movable member.

Figure 21B:
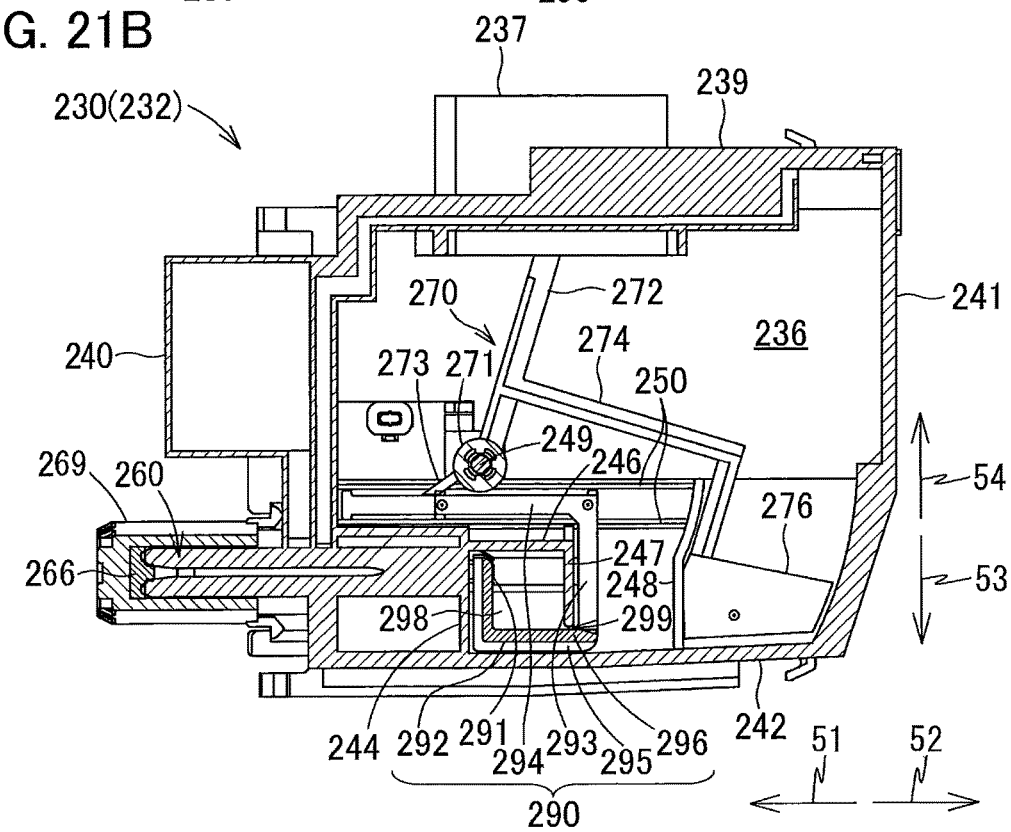

The valve 280, the second sealing member 285, and the arm locker 290 (hereinafter also referred to as the "movable member and the like") are configured to move integrally (i.e. as a unit) in the insertion direction 51 and the removal direction 52. A position of the movable member and the like (i.e. the valve 280, the second sealing member 285, and the arm locker 290) illustrated in FIGS. 21A and 21B is an example of a restricting position. A position of the movable member (i.e. the valve 280, the second sealing member 285, and the arm locker 290) and the like illustrated in FIGS. 22A through 23B is an example of a non-restricting position. The non-restricting position is positioned offset in the removal direction 52 relative to the restricting position. The movable member and the like move from the restricting position toward the non-restricting position when pushed by the ink needle 102 advancing into the valve chamber 261 through the through-holes 269A and 267. When the ink needle 102 is retracted from the valve chamber 261, the movable member and the like move from the non-restricting position toward the restricting position by an urging force of the coil spring 297.

As illustrated in FIG. 20A, the valve 280 is configured of the distal end part 281, a middle part 282, a proximal end part 283, a plurality of first protruding pieces 284A, and a plurality of second protruding pieces 284B. The distal end part 281 has a general disc shape. When the valve 280 is moved to the restricting position, the distal end part 281 is inserted into the cylindrical part 268 to close the through-hole 267. When the distal end part 281 is inserted into the cylindrical part 268, the cylindrical part 268 expands radially outward to form a liquid-tight seal with an outer circumferential surface of the distal end part 281. When the valve 280 is moved to the non-restricting position, the distal end part 281 is separated from the cylindrical part 268, opening the through-hole 267.

Figure 22A:
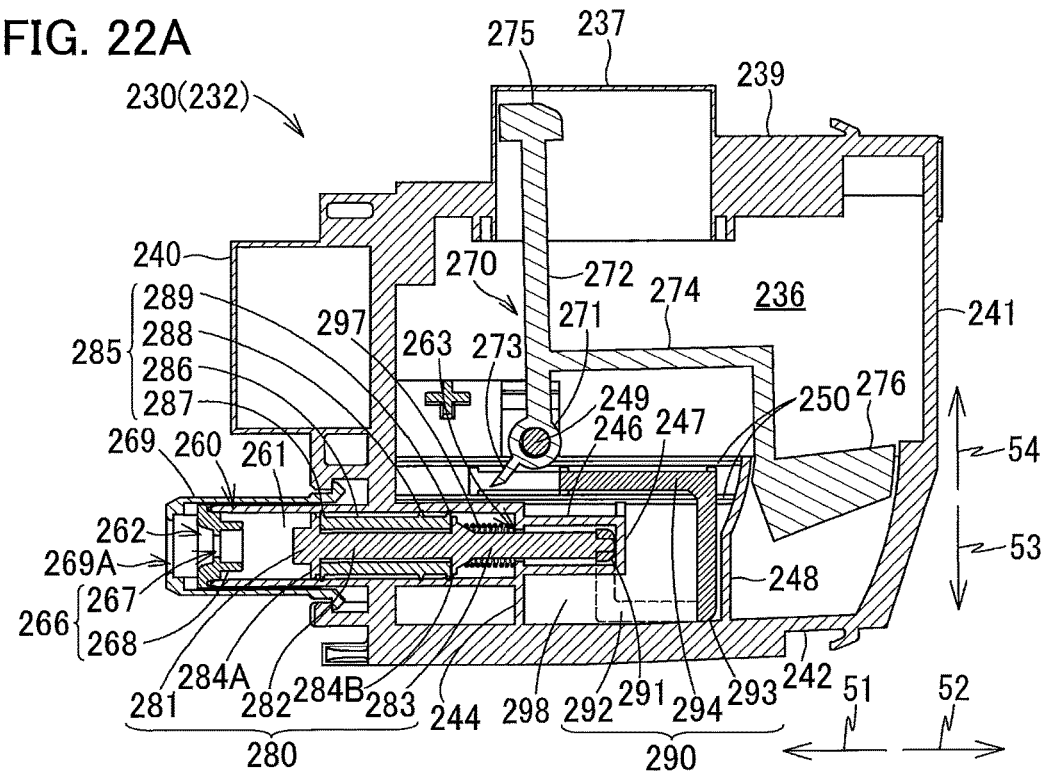
Figure 23A:
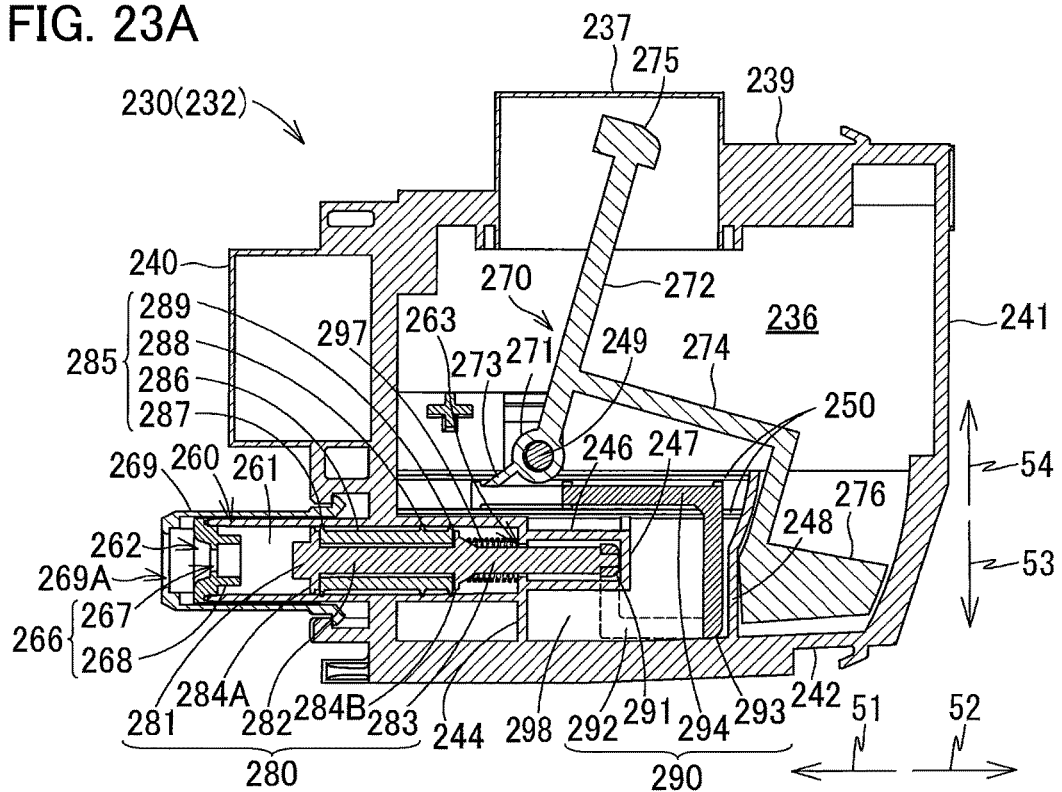
Figure 23B:
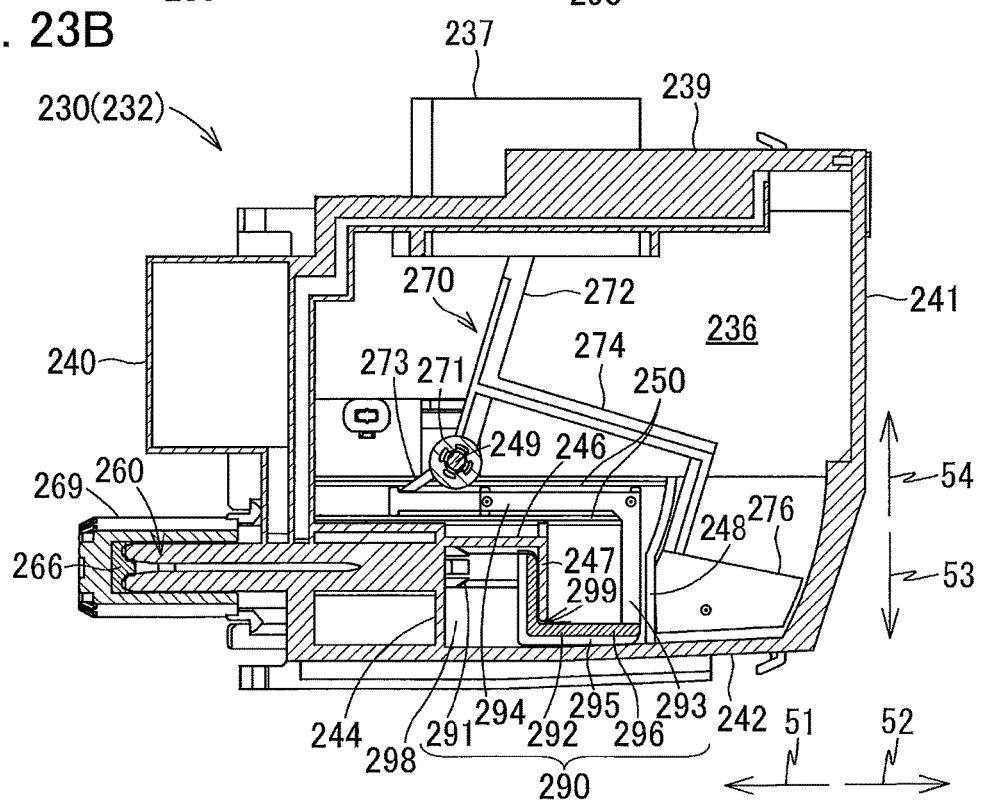

As illustrated in FIG. 20A, the middle part 282 has an external shape that is generally columnar. The middle part 282 extends in the removal direction 52 from a rear end of the distal end part 281. The middle part 282 is inserted into the second sealing member 285. The middle part 282 includes a portion whose diameter is smaller than an inner diameter of the second sealing member 285. Hence, a space extending in the insertion direction 51 and the removal direction 52 is formed in at least a part of a circumferential direction of the middle part 82 between an outer surface of the middle part 282 and an inner surface of the second sealing member 285, as illustrated in FIGS. 21A, 22A, and 23A.

As illustrated in FIG. 20A, the proximal end part 283 has an external shape that is generally columnar. The proximal end part 283 extends in the removal direction 52 from a rear end of the middle part 282. As illustrated in FIGS. 21A, 22A, and 23A, the proximal end part 283 extends in the valve chamber 261 and in the connecting channel 298 through the opening 263. The arm locker 290 is coupled to a rear end of the proximal end part 283. A diameter of the proximal end part 283 is smaller than a diameter of the opening 263. Hence, the proximal end part 283 does not slidingly contact against a wall surface defining the opening 263 when the valve 280 moves between the restricting position and the non-restricting position.

The first protruding pieces 284A protrude radially outward from an outer circumferential surface of the valve 280 at a position boundary between the distal end part 281 and the middle part 282. The second protruding pieces 284B protrude radially outward from the outer circumferential surface of the valve 280 at a position boundary between the middle part 282 and the proximal end part 283. The plurality of first protruding pieces 284A and the plurality of second protruding pieces 284B are respectively spaced at intervals in a circumferential direction of the valve 280. A diameter of an imaginary circle passing over distal ends of all of the first protruding pieces 284A is greater than the inner diameter of the second sealing member 285. Further, a diameter of an imaginary circle passing over distal ends of all of the second protruding pieces 284B is also greater than the inner diameter of the second sealing member 285. Hence, as the movable member and the like move between the restricting position and the non-restricting position, the first protruding pieces 284A and the second protruding pieces 284B restrain the second sealing member 285 from displacing from the middle part 282. Surfaces of the second protruding pieces 284B facing in the removal direction 52 function as a spring seat for supporting a front end of the coil spring 297. That is, the coil spring 297 is disposed between the second protruding pieces 284B and the first inner wall 244, and urges the valve 280 and the second sealing member 285 in the insertion direction 51.

The second sealing member 285 is formed of an elastic material, such as a rubber. The second sealing member 285 is configured of a tubular part 286 having an external shape that is generally cylindrical, and sealing parts 287, 288, and 289 formed on an outer circumferential surface of the tubular part 286. An outer diameter of the tubular part 286 is smaller than an inner diameter of the valve chamber 261. The sealing parts 287, 288, and 289 protrude radially outward from an outer circumferential surface of the tubular part 286 and extend continuously in a circumferential direction of the tubular part 286. The sealing parts 287, 288, and 289 are arranged spaced apart from each other in the insertion direction 51 and the removal direction 52. Outer diameters of the sealing parts 287, 288, and 289 prior to being inserted into the valve chamber 261 are larger than an inner diameter of the ink supply portion 260 (i.e., the inner diameter of the valve chamber 261). Thus, the sealing parts 287, 288, and 289 are diametrically compressed when disposed in the valve chamber 261 to make intimate contact with the inner surface of the ink supply portion 260 that is continuous in the circumferential direction. Accordingly, each of the sealing parts 287, 288, and 289 isolates a space on its opening 262 side from a space on its opening 263 side within an area formed between the inner surface of the ink supply portion 260 and the outer surface of the second sealing member 285. Although the second sealing member 285 includes three sealing parts 287, 288, and 289 in this embodiment, it is also possible to provide sealing parts at just one or two locations when the first and second air passages 264, 265 are configured as independent channels from the valve chamber 261, for example.

When the valve 280 is in the non-restricting position (i.e., when the through-hole 267 is open), ink flowing from the connecting channel 298 into the valve chamber 261 through the opening 263 passes a space between neighboring second protruding pieces 284B, the space between the outer surface of the middle part 282 and the inner surface of the second sealing member 285, and a space between neighboring first protruding pieces 284A, and flows out of the ink cartridge 230 through the opening 262 (i.e., the through-holes 267 and 269A). However, ink introduced into the valve chamber 261 cannot pass between the inner surface of the ink supply portion 260 and the outer surface of the second sealing member 285. Hence, in the second embodiment, an outflow path in the valve chamber 261 through which ink flows from the opening 263 to the opening 262 is formed primarily by a first space defined by the inner wall of the valve chamber 261 and the outer surface of the proximal end part 283 of the valve 280, and a second space defined by the inner wall of the second sealing member 285 and the outer surface of the middle part 282 of the valve 280.

The arm locker 290 moves integrally (as a unit) with the valve 280 in the insertion direction 51 and the removal direction 52. The arm locker 290 functions to reduce the volume of the connecting channel 298 and to maintain the sensor arm 270 in the non-detection position. As illustrated in FIG. 20A, the arm locker 290 is configured of a coupling part 291, a channel filling part 292, a connecting part 293, and a restricting part 294. As illustrated in FIGS. 21A through 23B, the coupling part 291 is disposed inside the connecting channel 298, the channel filling part 292 extends in the connecting channel 298 and the ink chamber 236, and the connecting part 293 and the restricting part 294 are disposed in the ink chamber 236.

As illustrated in FIGS. 21A, 22A, and 23A, the coupling part 291 is coupled to the rear end of the proximal end part 283. More specifically, the coupling part 291 has a hole 291A for receiving the rear end of the proximal end part 283, as illustrated in FIG. 20A. The valve 280 is coupled to the arm locker 290 by fixing the rear end of the proximal end part 283 that has passed through the hole 291A with a pin (not illustrated) or the like. Note that there are no particular limitations on the specific method of coupling the valve 280 to the arm locker 290. The valve 280 and the arm locker 290 may be affixed to each other with adhesive or the like.

As illustrated in FIGS. 21A through 23B, the channel filling part 292 extends in the connecting channel 298 and the ink chamber 236 through the opening 299. By positioning the channel filling part 292 in the connecting channel 298, the channel filling part 292 reduces the volume of the connecting channel 298. As illustrated in FIG. 20A, the channel filling part 292 includes a vertical part 292A extending in the downward direction 53 and the upward direction 54, and a horizontal part 292B extending in the insertion direction 51 and the removal direction 52. A top end of the vertical part 292A is connected to the coupling part 291, and a bottom end of the vertical part 292A is connected to the horizontal part 292B. The horizontal part 292B extends in the removal direction 52 from the bottom end of the vertical part 292A along the bottom wall 242.

The channel filling part 292 (each of the vertical part 292A and the horizontal part 292B) is configured of a first part 295 and a second part 296 that are neighbor each other in the rightward direction 55 and the leftward direction 56 (See FIG. 20B). That is, the connecting channel 298 is formed such that a part defined by the bottom wall 242 and the horizontal part 292B extends in the insertion direction 51 and the removal direction 52, and a part defined by the first inner wall 244 and the vertical part 292A extends in the downward direction 53 and the upward direction 54. Further, the channel filling part 292 is positioned offset in the rightward direction 55 relative to the coupling part 291, the connecting part 293, and the restricting part 294.

A dimension in the downward direction 53 and the upward direction 54 of the first part 295 of the horizontal part 292B (hereinafter referred to as a "height") is slightly smaller than the height of the opening 299. On the other hand, the second part 296 of the horizontal part 292B neighboring the first part 295 of the horizontal part 292B in the rightward direction 55 has a smaller height than that of the first part 295 of the horizontal part 292B. Thus, the second part 296 of the horizontal part 292B is biased toward the upward direction 54 side of the horizontal part 292B of the channel filling part 292. In other words, the second part 296 of the horizontal part 292B is located upward in the horizontal part 292B. Accordingly, the majority of ink flowing through the opening 299 from the ink chamber 236 to the connecting channel 298 passes through an area surrounded by the bottom wall 242, the film, the first part 295 of the horizontal part 292B, and the second part 296 of the horizontal part 292B (see FIG. 21B, for example). While gaps exist between the first part 295 of the horizontal part 292B and the left wall 243 and between the first part 295 of the horizontal part 292B and the fourth inner wall 247, these gaps are large enough that the two parts do not slidingly contact against each other and are sufficiently smaller than the gap between the bottom wall 242 and the second part 296 of the horizontal part 292B. Consequently, a liquid film is formed by ink between the first part 295 of the horizontal part 292B and the left wall 243 and between the first part 295 of the horizontal part 292B and the fourth inner wall 247, preventing the passage of ink therethrough.

The connecting part 293 extends in the downward direction 53 and the upward direction 54 at a position offset in the removal direction 52 relative to the fourth inner wall 247 and also at a position offset in the insertion direction 51 relative to the fifth inner wall 248. A bottom end of the connecting part 293 is connected to a rear end of the horizontal part 292B, and a top end of the connecting part 293 is connected to a rear end of the restricting part 294.

The restricting part 294 extends in the insertion direction 51 and the removal direction 52 at a position offset in the upward direction 54 relative to the third inner wall 246. In other words, the restricting part 294 extends in the insertion direction 51 from the top end of the connecting part 293. An edge portion of the restricting part 294 facing in the leftward direction 56 is disposed between the pair of guide rails 250. Thus, the restricting part 294 disposed between the pair of guide rails 250 restricts movement of the arm locker 290 in the downward direction 53 and the upward direction 54 and guides movement of the arm locker 290 in the insertion direction 51 and the removal direction 52.

Figure 22B:
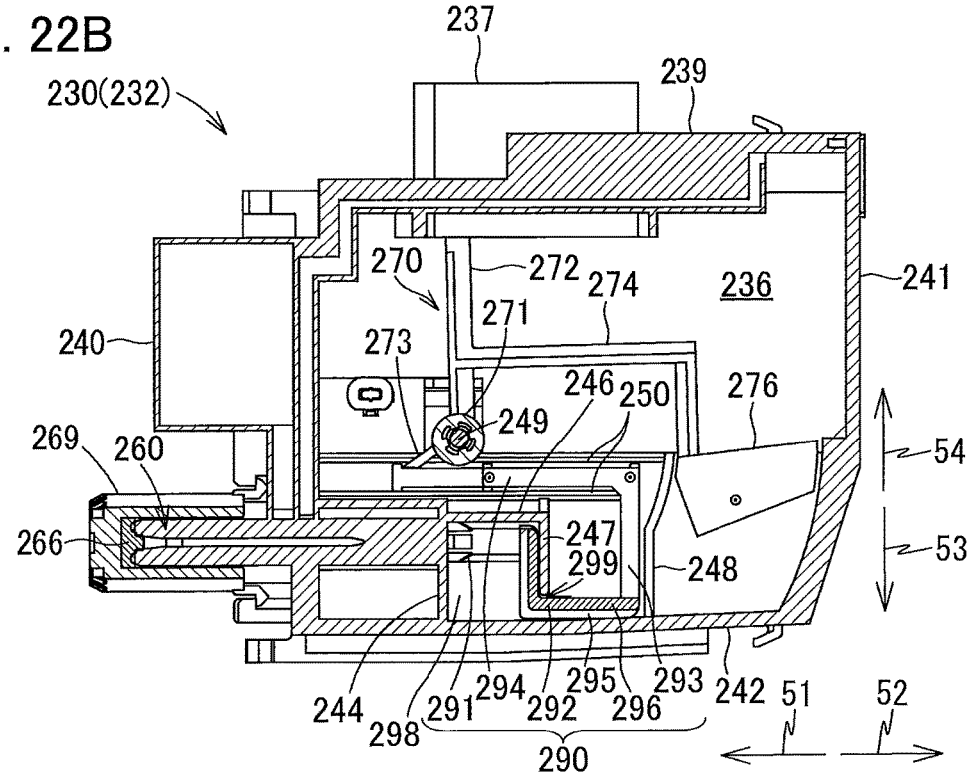

When the arm locker 290 is in the restricting position as illustrated in FIGS. 21A and 21B, the restricting part 294 contacts the second arm 273 of the sensor arm 270 in the non-detection position to maintain the sensor arm 270 in the non-detection position. More specifically, when the arm locker 290 is in the restricting position, the restricting part 294 is disposed below the second arm 273 of the sensor arm 270 in the non-detection position and restricts movement of the second arm 273 in the downward direction 53 (and thus restricts counterclockwise movement of the sensor arm 270). When the arm locker 290 is in the non-restricting position as illustrated in FIGS. 22A and 22B, the restricting part 294 is separated from the second arm 273 in the removal direction 52 and no longer restrains the sensor arm 270.

In other words, when the arm locker 290 is in the restricting position, the restricting part 294 is disposed at a position at which the second arm 273 should be present when the sensor arm 270 is in the detection position. However, when the arm locker 290 is in the non-restricting position, the restricting part 294 is positioned offset relative to the position at which the second arm 273 should be present when the sensor arm 270 is in the detection position.

When the arm locker 290 is in the non-restricting position, ink stored in the ink chamber 236 passes through an area of the opening 299 surrounded by the bottom wall 242, the film, the first part 295, and the second part 296 and flows out of the connecting channel 298 into the valve chamber 261. Further, when the arm locker 290 is in the non-restricting position, a gap between the horizontal part 292B and the fifth inner wall 248 in the insertion direction 51 and the removal direction 52 is smaller than a gap between the horizontal part 292B and the fifth inner wall 248 in the insertion direction 51 and the removal direction 52 when the arm locker 290 is in the restricting position, as illustrated in FIGS. 21A through 23B. However, the horizontal part 292B and the fifth inner wall 248 are separated by a sufficient distance to allow passage of ink even when the arm locker 290 is in the non-restricting position.

<Movement of Sensor Arm 270, Valve 280, Second Sealing Member 285, and Arm Locker 290>

Next, movements of the sensor arm 270, the valve 280, the second sealing member 285, and the arm locker 290 when the ink cartridge 230 is being attached to the cartridge attachment section 110 will be described. In the following description, it will be assumed that the amount of ink stored in the ink chamber 236 is greater than an amount considered to be the near-empty condition described earlier in the first embodiment. That is, the float 276 is submerged in the ink stored in the ink chamber 236 and receives a buoyant force from the ink that acts to pivotally move the sensor arm 270 counterclockwise.

Prior to the ink cartridge 230 being attached to the cartridge attachment section 110, the valve 280, the second sealing member 285, and the arm locker 290 are disposed in the restricting position illustrated in FIGS. 21A and 21B owing to the urging force of the coil spring 297. The valve 280 in the restricting position is inserted into the cylindrical part 268 of the first sealing member 266 and closes the through-hole 267. Further, when the second sealing member 285 is in the restricting position, the sealing part 288 of the second sealing member 285 is disposed between the hole 264A and the hole 265A, thereby interrupting communication between the first air passage 264 and the second air passage 265.

Further, the restricting part 294 of the arm locker 290 in the restricting position contacts the second arm 273 of the sensor arm 270 in the non-detection position and maintains the sensor arm 270 in the non-detection position. When the sensor arm 270 is restrained in the non-detection position, the shutter 275 is positioned offset relative to the detected position. Thus, when the ink cartridge 230 is in a state illustrated in FIGS. 21A and 22A, the sensor 103 outputs a high level signal to the control unit 130. Further, since the ink cartridge 230 illustrated in FIG. 21A has not yet been attached to the cartridge attachment section 110, the attachment sensor 107 outputs a low level signal to the control unit 130.

At this time, by opening the cover that covers the opening 112 in the cartridge attachment section 110, the user can insert the ink cartridge 230 into the cartridge attachment section 110. When the ink cartridge 230 is inserted to a position adjacent to the inner back surface 151 of the case 101 of the cartridge attachment section 110, the front wall 235 of the cartridge cover 233 of the ink cartridge 230 presses against the attachment sensor 107, causing the attachment sensor 107 to output a high level signal to the control unit 130. In other words, the detection signal outputted from the attachment sensor 107 switches from a low level signal to a high level signal in response to the ink cartridge 230 being attached to the cartridge attachment section 110.

In addition, when the ink cartridge 230 has been inserted to a position adjacent to the inner back surface 151 of the cartridge attachment section 110, the ink needle 102 is inserted into the valve chamber 261 through the through-holes 269A and 267 and contacts the distal end part 281 of the valve 280. When the ink cartridge 230 is further moved in the insertion direction 51 from this state, the valve 280 is pushed in the removal direction 52 by a reaction force received from the ink needle 102. Consequently, the valve 280, the second sealing member 285, and the arm locker 290 move in the removal direction 52 from the restricting position toward the non-restricting position against the urging force of the coil spring 297. The reaction force received from the ink needle 102 by the valve 280, the second sealing member 285, and the arm locker 290 is an example of an external force applied from outside the ink cartridge 230.

When the valve 280 is in the non-restricting position illustrated in FIG. 22A, the valve 280 is separated from the cylindrical part 268 of the first sealing member 266, opening the through-hole 267. Consequently, ink flowing from the connecting channel 298 to the valve chamber 261 through the opening 263 can pass through the space formed between the valve 280 and the second sealing member 285 and flow out through the opening 262 (i.e., the through-holes 267 and 269A). Further, when the second sealing member 285 is in the non-restricting position, the holes 264A and 265A are positioned between the sealing part 287 and the sealing part 288, enabling the ink chamber 236 to communicate with the ambient air through the first air passage 264 and the second air passage 265. Further, when the arm locker 290 is in the non-restricting position, the restricting part 294 of the arm locker 290 is separated from the second arm 273 of the sensor arm 270. Hence, the restricting part 294 no longer restrains the sensor arm 270 in the non-detection position. As a result, the sensor arm 270 pivotally moves counterclockwise due to the buoyant force applied by the ink to the float 276.

Due to the sensor arm 270 pivotally moving counterclockwise, the shutter 275 is moved to the detected position and blocks light outputted from the light emitting part 104 from reaching the light receiving part 105. As a result, the sensor 103 outputs a low level signal to the control unit 130. That is, the detection signal outputted from the sensor 103 switches from a high level signal to a low level signal when the shutter 275 is moved to the detected position. Through the process described above, the ink cartridge 230 is completely attached to the cartridge attachment section 110.

The shutter 275 of the sensor arm 270 may be defined in the following way that is similar to the shutter 75 in the first embodiment. Take two points A and B that face each other in the rightward direction 55 and the leftward direction 56, and assume that light emitted from Point A travels in either the rightward direction 55 or the leftward direction 56 toward Point B. The light may be visible or infrared light, for example. Here, the intensity of the light that reaches Point B will be represented by I. A light emitting part of the sensor 103 may be disposed at Point A, and a light receiving part of the sensor 103 may be disposed at Point B. If the light receiving part is configured of a phototransistor, a value C will denote a collector current in the phototransistor when the intensity of light reaching the phototransistor is I.

When the amount of ink in the ink chamber 236 is equal to or more than a prescribed amount, the shutter 275 is positioned between Point A and Point B in the rightward direction 55 and the leftward direction 56. Thus, light emitted from Point A traveling in the rightward direction 55 or the leftward direction 56 is incident on either one of a left surface and a right surface of the sensor arm 270. Consequently, the amount of light exiting the other of the left surface and the right surface of the sensor arm 270 and reaching Point B has an intensity less than half the intensity I, such as 0. At this time, the collector current in the phototransistor is less than half the value C, such as 0. When the amount of ink in the ink chamber 236 is less than the prescribed amount, the sensor arm 270 becomes offset from the position between Point A and Point B in the rightward direction 55 and the leftward direction 56. At this time, the light emitted from Point A that reaches Point B has an intensity equal to or more than half the intensity I, and the collector current in the phototransistor is equal to or more than half the value C.

Next, movements of the sensor arm 270, the valve 280, the second sealing member 285, and the arm locker 290 when the ink cartridge 230 is being removed from the cartridge attachment section 110 will be described. In the following description, it will be assumed that the amount of ink stored in the ink chamber 236 is greater than an amount considered to be the near-empty condition. That is, it will be assumed that the sensor arm 270 is disposed in its detection position at the time the ink cartridge 230 is about to be removed from the cartridge attachment section 110.

When the user starts to remove the ink cartridge 230 from the cartridge attachment section 110 (i.e., starts to move the ink cartridge 230 in the removal direction 52), the ink needle 102 is gradually retracted from the valve chamber 261 through the through-holes 267 and 269A. Consequently, the valve 280, the second sealing member 285, and the arm locker 290 are moved from the non-restricting position to the restricting position by the urging force of the coil spring 297. When the ink needle 102 has been completely removed from the valve chamber 261, the valve 280, the second sealing member 285, and the arm locker 290 are in the restricting position illustrated in FIG. 21A.

As described above, the valve 280 in the restricting position closes the through-hole 267. The sealing part 288 of the second sealing member 285 in the restricting position blocks communication between the first air passage 264 and the second air passage 265. Further, when the arm locker 290 moves from the non-restricting position to the restricting position, the restricting part 294 of the arm locker 290 contacts the second arm 273 of the sensor arm 270 in the detection position to push the second arm 273 upward. As a result of this contact from the arm locker 290, the sensor arm 270 pivotally moves clockwise from the detection position to the non-detection position. Hence, the sensor arm 270 is once again restrained in the non-detection position.

The shutter 275 is retracted from the detected position through this movement. Thus, light outputted from the light emitting part 104 is received by the light receiving part 105. As a result, the sensor 103 outputs a high level signal to the control unit 130. That is, the detection signal outputted from the sensor 103 switches from a low level signal to a high level signal as the shutter 275 is retracted from the detected position.

Further, the attachment sensor 107 outputs a low level signal to the control unit 130 in response to the ink cartridge 230 no longer pressing the attachment sensor 107. In other words, the detection signal outputted from the attachment sensor 107 switches from a high level signal to a low level signal in response to the ink cartridge 230 being removed from the cartridge attachment section 110.

Next, a movement of the sensor arm 270 will be described for a case in which the ink cartridge 230 is completely attached to the cartridge attachment section 110 and the ink stored in the ink chamber 236 of the ink cartridge 230 has been consumed through operations of the recording head 21. Note that the valve 280, the second sealing member 285, and the arm locker 290 do not move in response to a reduction of ink stored in the ink chamber 236.

The surface level of the ink stored in the ink chamber 236 drops as ink is ejected from the nozzles 29 of the recording head 21. When most part of the float 276 becomes exposed above the surface of the ink in the ink chamber 236 as the surface level drops, the buoyant force acting on the float 276 is lost, allowing the sensor arm 270 to pivotally move clockwise. Since the shutter 275 is retracted from the detected position as the sensor arm 270 pivotally moves clockwise, light outputted from the light emitting part 104 reaches the light receiving part 105. As a result, the sensor 103 outputs a high level signal to the control unit 130. In other words, the detection signal outputted from the sensor 103 switches from a low level signal to a high level signal when the amount of ink stored in the ink chamber 36 drops below a threshold value.

Figure 14:
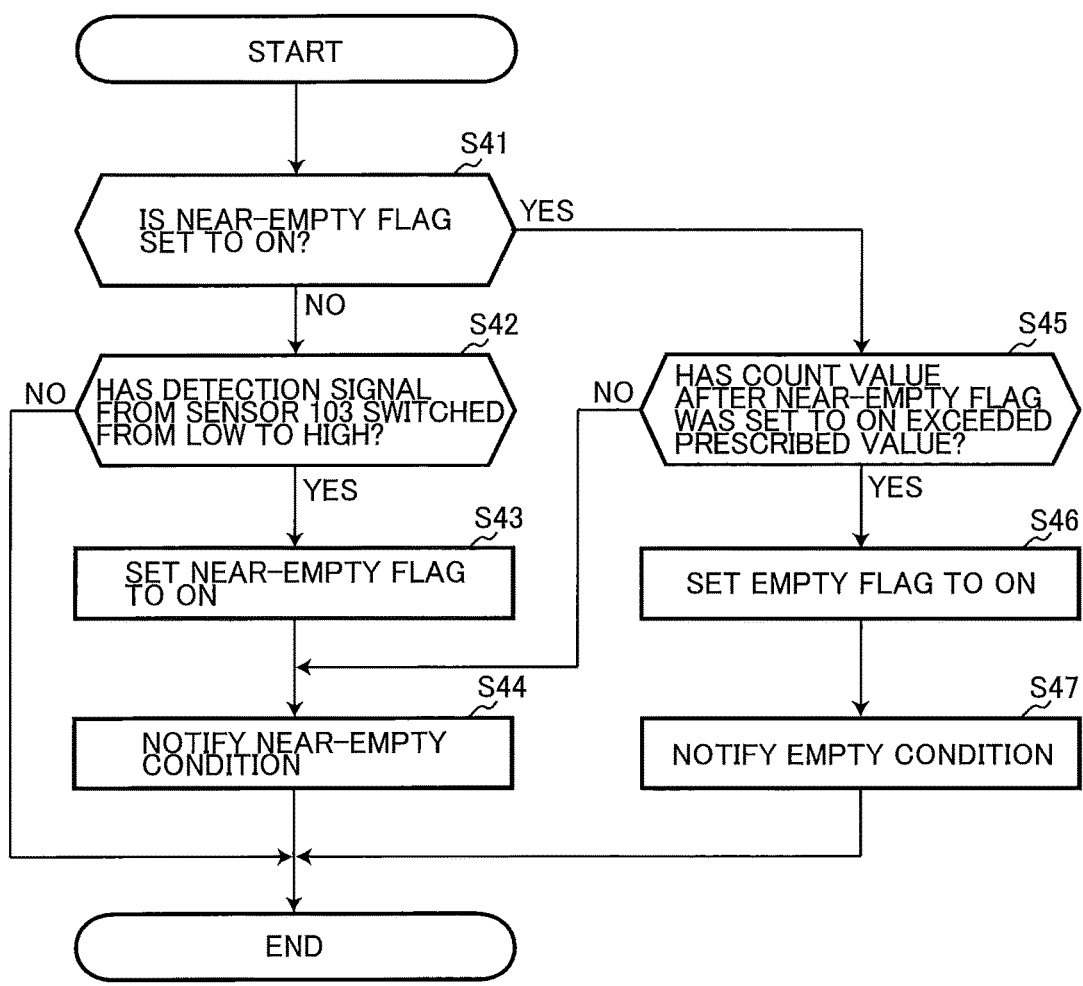
FIG. 14 is a flowchart illustrating steps in a process executed by the control unit 130 for determining an amount of ink remaining in the ink chamber 36.

Similar to the first embodiment, the control unit 130 determines whether the viscosity of ink stored in the ink chamber 236 is abnormal and whether the amount of ink remaining in the ink chamber 236 is in the near-empty condition or the empty condition by executing the processes illustrated in FIGS. 12 through 14.

Operational Advantages of Second Embodiment

According to the second embodiment described above, ink stored in the ink chamber 236 flows into the connecting channel 298 through the opening 299, flows into the valve chamber 261 through the opening 263, and flows out of the ink cartridge 230 through the opening 262. Since a portion of the connecting channel 298 (and specifically the opening 299) is arranged at a position lower than the opening 263 when the ink cartridge 230 is in the attached posture, air in the ink chamber 236 does not instantly enter the valve chamber 261, even when the surface level of ink in the ink chamber 236 is below the position of the opening 263. Thus, this arrangement allows for a lower surface level of ink in the ink chamber 236 before air in the ink chamber 236 is introduced into the valve chamber 261. Put another way, this arrangement can reduce the amount of ink remaining in a spent ink cartridge 230. Note that as long as a part of the connecting channel 298 is positioned lower than the opening 263, the remainder of the connecting channel 298 may be positioned higher than the opening 263. However, it is preferable that the connecting channel 298 is formed at the same height as the opening 263 and positioned to extend downward from the opening 263 and that the connecting channel 298 does not include any part higher than the opening 263.

More specifically, the prescribed value compared to the count value counted through a software program in S45 described above is preset so that the count value reaches the prescribed value when the surface level of ink stored in the ink chamber 236 reaches a position offset in the upward direction 54 relative to the bottom end of the fourth inner wall 247 (i.e. a top edge of the opening 299). Accordingly, air in the ink chamber 236 has not yet entered the connecting channel 298 when the empty condition is notified in S47. That is, the user can be prompted to replace the ink cartridge 230 before air in the ink chamber 236 enters the connecting channel 298. Hence, this configuration avoids degradation in image-recording quality caused by air becoming mixed in ink in the channels leading from the ink cartridge 230 to the nozzles 29.

Note that, similar to the first embodiment, the attached posture of the ink cartridge 230 implies a posture of the ink cartridge 230 when the ink cartridge 230 is completely attached to the cartridge attachment section 110 or a posture of the ink cartridge 230 when movement of the shutter 275 is inspected during a manufacturing process of the ink cartridge 230, for example.

Further, in the second embodiment described above, the volume of the connecting channel 298 is reduced by setting the width of the connecting channel 298 shorter than the width of the ink chamber 236 and placing part of the arm locker 290 in the connecting channel 298, thereby further reducing the amount of ink remaining in the ink cartridge 230. Further, by decreasing the height of the second part 296 in the horizontal part 292B of the channel filling part 292 and biasing the second part 296 in the upward direction 54 (i.e. locating the second part 296 upward), ink passes through the opening 299 in a region adjacent to the bottom wall 242. This arrangement reduces the potential for air becoming mixed with ink in the valve chamber 261 even when the above prescribed value is increased. Hence, this arrangement further reduces the amount of ink remaining in the ink cartridge 230.

Further, as described above in the second embodiment, the arm locker 290 may be supported by the guide rails 250. Hence, the channel filling part 292 can be upwardly located within the opening 299 against a force of gravity. Note that, while only the second part 296 in the horizontal part 292B of the channel filling part 292 and not the first part 295 (i.e., only a part of the channel filling part 292) is upwardly biased in the second embodiment, the entire channel filling part 292 may be upwardly biased instead.

Further as described above in the second embodiment, the sensor arm 270 may be pivotally movable between the non-detection position and the detection position. The restraining part 294 of the arm locker 290 may contact the second arm 273 of the sensor arm 270 when the arm locker 290 is in the restricting position, while the restraining part 294 may be separated from the second arm 273 when the arm locker 290 is in the non-restricting position. With this configuration, the arm locker 290 in the restricting position can appropriately restrain the sensor arm 270, and the arm locker 290 in the non-restricting position can reliably release the sensor arm 270.

Further, as described above in the second embodiment, the sensor arm 270 may be provided with the float 276 that is formed of a material having a specific gravity smaller than the ink stored in the ink chamber 236. Hence, the sensor arm 270 can be moved between the detection position and the non-detection position using the buoyant force applied by the ink to the float 276 when the arm locker 290 releases the sensor arm 270.

Further, as described above in the second embodiment, when the arm locker 290 is in the restricting position, the arm locker 290 may maintain the sensor arm 270 in the non-detection position and the valve 280 may close the opening 262. When the arm locker 290 is in the non-restricting position, the arm locker 290 may release restriction on the sensor arm 270 and the valve 280 may open the opening 262. With this configuration, the valve 280 can open and close the opening 262 in conjunction with the movement of the arm locker 290 between the non-restricting position and the restricting position.

Modifications of Second Embodiment

While the description has been made in detail with reference to the second embodiment thereof, it would be apparent to those skilled in the art that various changes and modifications may be made therein without departing from the spirit of the disclosure. The modifications of the first embodiment described above (except for the modification illustrated in FIGS. 15A and 15B) are also applicable to the second embodiment.

What is claimed is:

1. A liquid cartridge comprising:
a liquid container including a liquid storage chamber configured to store liquid therein;
a liquid supply portion including a liquid supply chamber, the liquid supply portion having a first opening and a second opening, the first opening providing communication between the liquid supply chamber and an exterior of the liquid cartridge, the second opening providing communication between the liquid supply chamber and the liquid storage chamber;
a connecting channel formed in the liquid container, the connecting channel providing communication between the liquid storage chamber and the second opening, the connecting channel having a part positioned further downward than the second opening when the liquid cartridge is in an attached posture;
a detector disposed in the liquid storage chamber and configured to move between a detection position at which the detector is detectable from the exterior of the ink cartridge and a non-detection position at which the detector is undetectable from the exterior of the ink cartridge; and
a movable member extending in the liquid storage chamber and the liquid supply chamber through the connecting channel and the second opening, the movable member being configured to move from a restricting position to a non-restricting position when an external force from the exterior of the ink cartridge is applied to the movable member, the movable member in the restricting position restricting the movement of the detector and maintaining the detector in the non-detection position, the movable member in the non-restricting position releasing restriction on the movement of the detector.

2. The liquid cartridge according to claim 1, wherein the liquid container has a bottom wall defining the part of the connecting channel, and
wherein the movable member has a portion disposed in the part of the connecting channel, the portion of the movable member being located upward in the part of the connecting channel when the liquid cartridge is in the attached posture.

3. The liquid cartridge according to claim 2, wherein a direction from the second opening to the first opening is a first direction, and a direction opposite to the first direction is a second direction,
wherein the part of the connecting channel extends in the first direction and the second direction,
wherein the non-restricting position is positioned offset in the second direction relative to the restricting position, and
wherein the movable member is further configured to move from the non-restricting position to the restricting position.

4. The liquid cartridge according to claim 3, wherein a direction perpendicular to the first direction, the second direction and a vertical direction is a third direction, and a direction opposite to the third direction is a fourth direction,
wherein the portion of the movable member disposed in the part of the connecting channel comprises a first part and a second part that are in proximity to each other in the third direction and the fourth direction, and
wherein the first part has a first length in the vertical direction when the liquid cartridge is in the attached posture, and the second part has a second length in the vertical direction when the liquid cartridge is in the attached posture, the second length being shorter than the first length, the second part being located upward in the part of the connecting channel when the liquid cartridge is in the attached posture.

5. The liquid cartridge according to claim 3, wherein the liquid container includes a support part extending in the first direction and the second direction, the support part being disposed in the liquid storage chamber, the support part supporting the movable member to guide movement of the movable member in the first direction and the second direction.

6. The liquid cartridge according to claim 3, wherein a direction perpendicular to the first direction, the second direction and a vertical direction is a third direction, and a direction opposite to the third direction is a fourth direction,
wherein the liquid storage chamber has a first dimension in the third direction and the fourth direction, and
wherein the part of the connecting channel has a second dimension in the third direction and the fourth direction, the second dimension being smaller than the first dimension.

7. The liquid cartridge according to claim 1, wherein the detector is configured to pivotally move between the detection position and the non-detection position, the detector comprising:
a detection part detected from the exterior of the ink cartridge when the detector is in the detection position;
a first arm extending from a pivot axis of the detector and supporting the detection part; and
a second arm extending from the pivot axis and having a length shorter than that of the first arm, and
wherein the movable member in the restricting position is in contact with the second arm, and the movable member in the non-restricting position is separated from the second arm.

8. The liquid cartridge according to claim 7, wherein the detector further comprises:
a float having a specific gravity smaller than that of the liquid stored in the liquid chamber; and
a third arm extending from the first arm and supporting the float.

9. The liquid cartridge according to claim 1, wherein the movable member comprises:

a restricting member disposed in the liquid storage chamber; and a valve disposed in the liquid supply chamber and connected to the restricting member, wherein when the movable member is in the restricting position, the restricting member restricts the movement of the detector and maintains the detector in the non-detection position and the valve closes the first opening, and wherein when the movable member is in the non-restricting position, the restricting member releases restriction on the movement of the detector and the valve opens the first opening.

10. The liquid cartridge according to claim 9, wherein a direction from the second opening to the first opening is a first direction, and a direction opposite to the first direction is a second direction, the liquid cartridge further comprising an urging member urging the valve in the first direction, wherein the non-restricting position is positioned offset in the second direction relative to the restriction position, and wherein the movable member is further configured to move from the non-restricting position to the restricting position.

* * * * *